(12) United States Patent
Hayata

(10) Patent No.: US 12,265,747 B2
(45) Date of Patent: Apr. 1, 2025

(54) METHOD AND MEDIUM FOR MULTIPLE USERS PARTICIPATING IN A COMMUNICATION SERVICE TO WATCH A SAME DISTRIBUTION IMAGE

(71) Applicant: GREE, Inc., Tokyo (JP)

(72) Inventor: Daiki Hayata, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/090,496

(22) Filed: Dec. 29, 2022

(65) Prior Publication Data

US 2023/0315370 A1   Oct. 5, 2023

(30) Foreign Application Priority Data

Mar. 31, 2022  (JP) .................................. 2022-060389

(51) Int. Cl.
*G06F 3/14* (2006.01)
*G06F 3/0482* (2013.01)
(Continued)

(52) U.S. Cl.
CPC .............. *G06F 3/14* (2013.01); *G06F 3/0482* (2013.01); *G06F 3/16* (2013.01); *G09G 5/377* (2013.01); *G09G 2340/04* (2013.01)

(58) Field of Classification Search
CPC ............ G09F 3/14; G09F 3/0482; G09F 3/16; G09G 5/377
See application file for complete search history.

(56) References Cited

U.S. PATENT DOCUMENTS

2018/0375676 A1\* 12/2018 Bader-Natal .......... H04L 65/403
2020/0183548 A1\* 6/2020 Anzures ................ G06F 3/0482
(Continued)

FOREIGN PATENT DOCUMENTS

| JP | 2019-036969 A | 3/2019 |
| JP | 2021-034900 A | 3/2021 |
| JP | 2022-013123 A | 1/2022 |

OTHER PUBLICATIONS

"Sharing your screen or desktop on Zoom", Zoom Support, Available Online On: https://support.zoom.us/hc/en-us/articles/201362153-Sharing-your-screen-or-desktop-on-Zoom, Jul. 14, 2022, 5 pages including English Translation.
(Continued)

*Primary Examiner* — Liliana Cerullo
(74) *Attorney, Agent, or Firm* — XSENSUS LLP

(57) ABSTRACT

A control method includes displaying, by a terminal device of a first user, a first image and a second image, the first image including a first object representing the first user, and the second image including a second object representing a second user that is different from the first user; transmitting, to a terminal device of the second user via a network, information relating to display of the first image; displaying the first image including the first object as being changed in accordance with an action or audio data of the first user; displaying the second image including the second object as being changed in accordance with an action or audio data of the second user; and displaying a third image, including a third object representing a distributing user, in accordance with a first instruction by the first user or the second user.

20 Claims, 19 Drawing Sheets

(51) Int. Cl.
*G06F 3/16* (2006.01)
*G09G 5/377* (2006.01)

(56) References Cited

U.S. PATENT DOCUMENTS

| | | | | |
|---|---|---|---|---|
| 2022/0365740 | A1* | 11/2022 | Chang | G06F 3/0481 |
| 2023/0004339 | A1* | 1/2023 | Chandrashekar | G06T 11/00 |
| 2023/0232068 | A1* | 7/2023 | Braun | H04N 21/44222 |
| | | | | 725/14 |

OTHER PUBLICATIONS

Office Action issued Dec. 10, 2024 in related Japanese Patent Application No. 2023-106842. (9 pgs).
Office Action issued Feb. 12, 2025 in corresponding Japanese Patent Application No. 2023-10684.

* cited by examiner

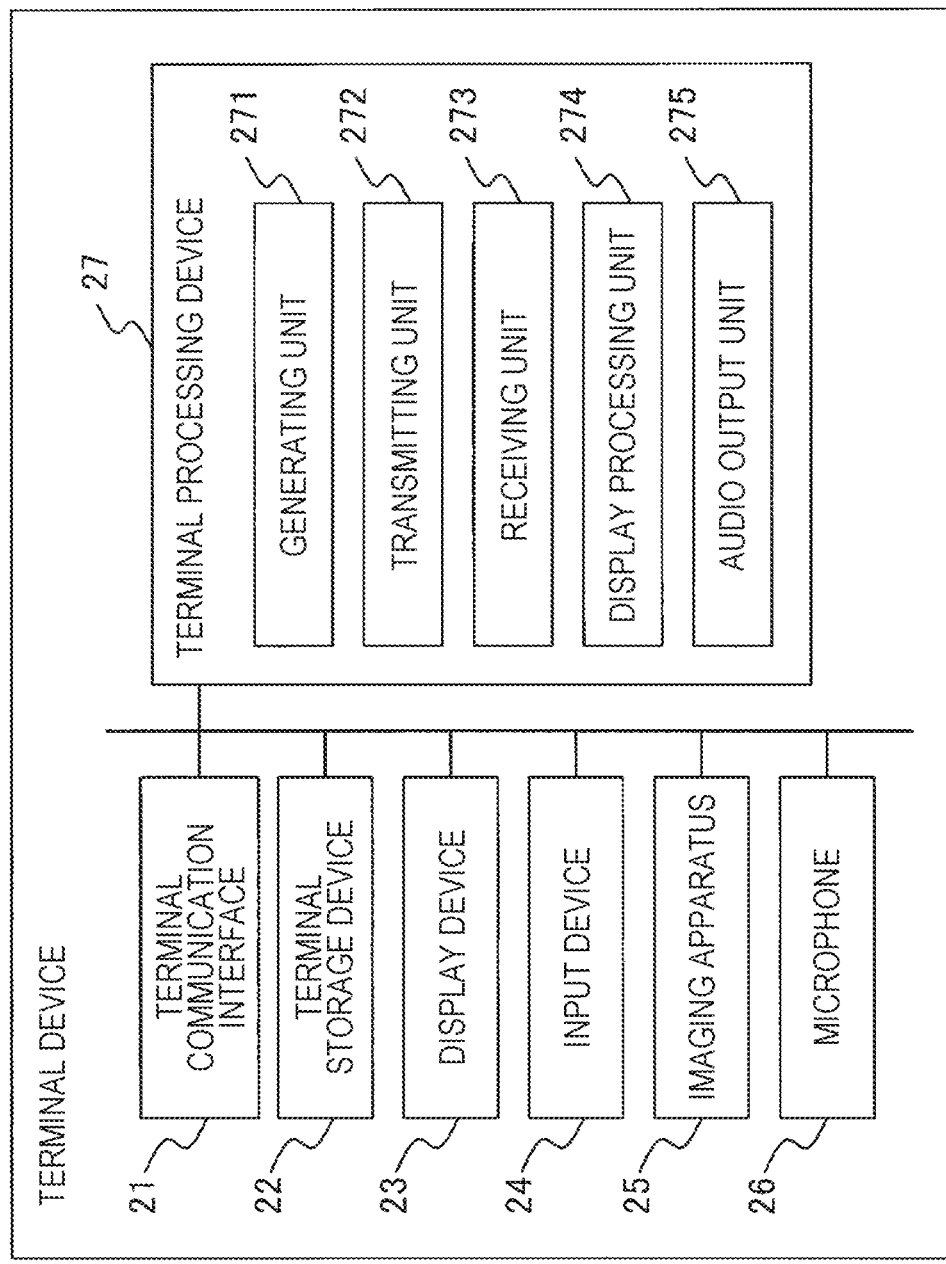

| USER ID | NAME | CHARACTER OBJECT | POSSESSED OBJECTS | USED OBJECTS | ... |
|---|---|---|---|---|---|
| U-00000001 | USER A | C-00000001 | Obj-0004, Obj-0028, ... | Obj-0123, Obj-0338, ... | ... |
| U-00000002 | USER B | C-00000002 | Obj-0021, Obj-0055, ... | Obj-0152, Obj-0311, ... | ... |
| ... | ... | ... | ... | ... | ... |

| OBJECT ID | NAME | IMAGE INFORMATION | RARITY | PLACEMENT LOCATION | ... |
|---|---|---|---|---|---|
| Obj-0001 | TEDDY BEAR | 0001.pmg | SR | SPACE | ... |
| Obj-0002 | KITTY EARS | 0002.pmg | R | HEAD | ... |
| ... | ... | ... | ... | ... | ... |

| GROUP ID | NAME | INCLUDED USERS | ... |
|---|---|---|---|
| G-0013 | GROUP Ga | U-00000001, U-00000012, U-00000025, ... | ... |
| G-0052 | GROUP Gb | U-00000001, U-00000004, U-00000047, ... | ... |
| ... | ... | ... | ... |

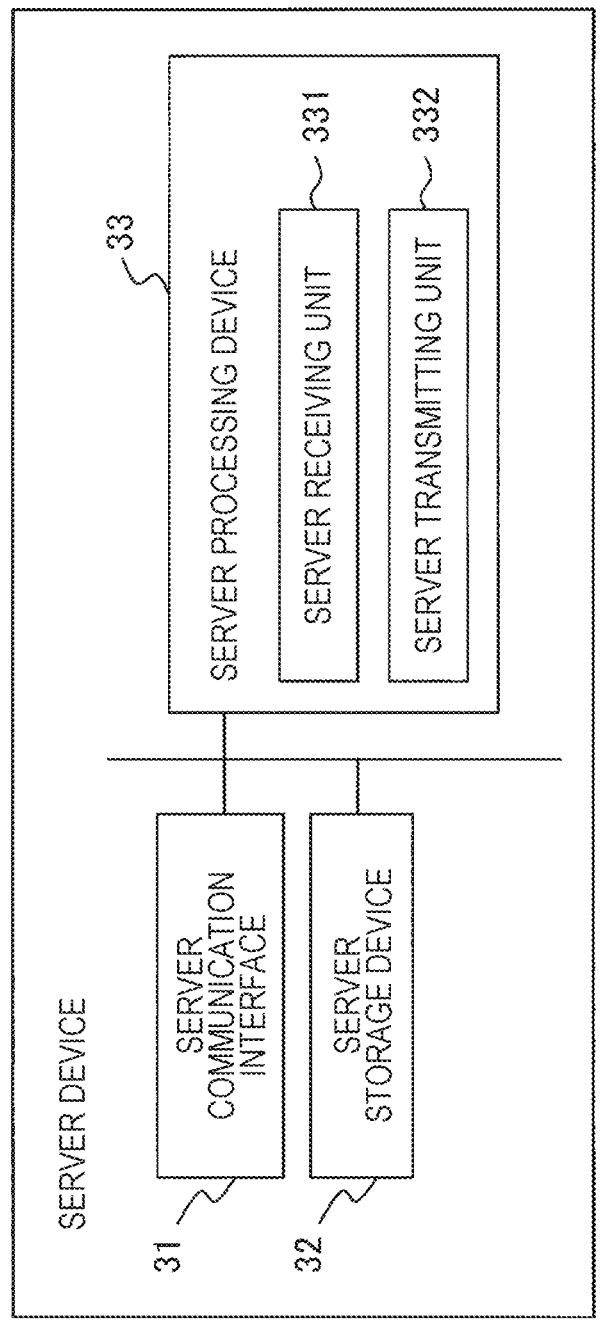

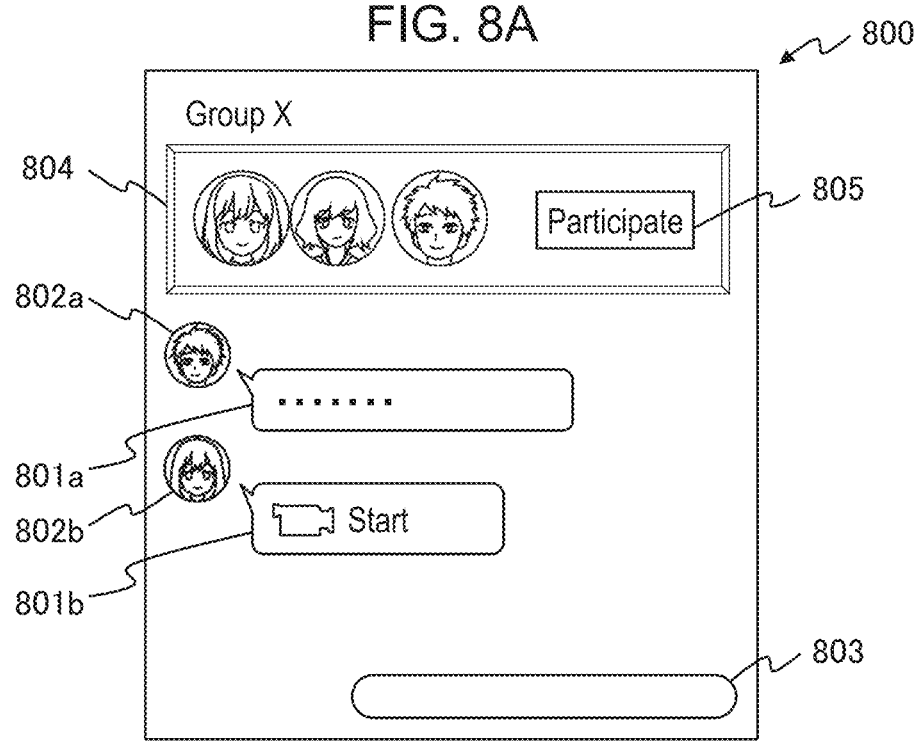
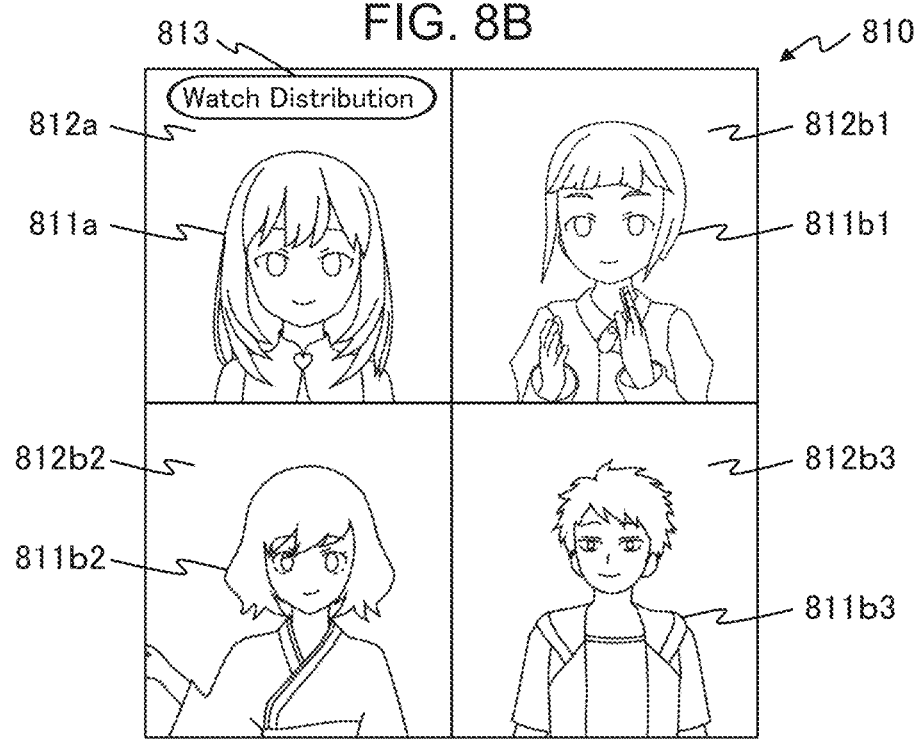

METHOD AND MEDIUM FOR MULTIPLE USERS PARTICIPATING IN A COMMUNICATION SERVICE TO WATCH A SAME DISTRIBUTION IMAGE

CROSS-REFERENCE TO RELATED APPLICATIONS

This application claims the benefit of priority to Japanese Application No. 2022-060389, filed Mar. 31, 2022, the entire content of which is incorporated by reference.

TECHNICAL FIELD

An embodiment disclosed in the present specification relates to a control program for a terminal device, a terminal device, a control method for a terminal device, a control program for a server device, a server device, and a control method for a server device.

BACKGROUND

Conventionally, there is an information system in which a plurality of users each use a terminal device, such as a personal computer (PC) or the like, to transmit various types of information such as images representing the users themselves and/or speech and so forth of the users to the terminal devices of each other, thereby realizing communication. For example, there is conventional technology of an information system in which users of PCs share images and speech of the users acquired from cameras and microphones provided to the PCs of the users connected to the Internet, thereby realizing speech chat among the users. Further, there is a technology of using a function called "screen sharing", in which a PC of one user participating in the speech chat acquires and shares video and so forth of a PC of another user.

SUMMARY

In an exemplary implementation of the present disclosure, a control method includes displaying, by a terminal device of a first user, a first image and a second image, the first image including a first object representing the first user, and the second image including a second object representing a second user that is different from the first user; transmitting, to a terminal device of the second user via a network, information relating to display of the first image; in a case that first audio data of the first user is obtained, transmitting the first audio data to the terminal device of the second user via the network; displaying the first image including the first object as being changed in accordance with an action of the first user or the first audio data; in a case that second audio data of the second user is received via the network, outputting the second audio data; displaying the second image including the second object as being changed in accordance with an action of the second user or the second audio data; and in accordance with a first instruction by the first user or the second user: receiving information, from a terminal device of a distributing user via the network, relating to display of a third image including a third object representing the distributing user; and displaying the third image.

BRIEF DESCRIPTION OF THE DRAWINGS

FIG. 3 illustrates a schematic configuration of a terminal device;

FIGS. 4A to 4C illustrate examples of data structures of various types of tables;

FIG. 5 illustrates a schematic configuration of a server device;

FIGS. 8A and 8B illustrate examples of screens displayed on the display device of the terminal device;

DETAILED DESCRIPTION

Figure 1A:
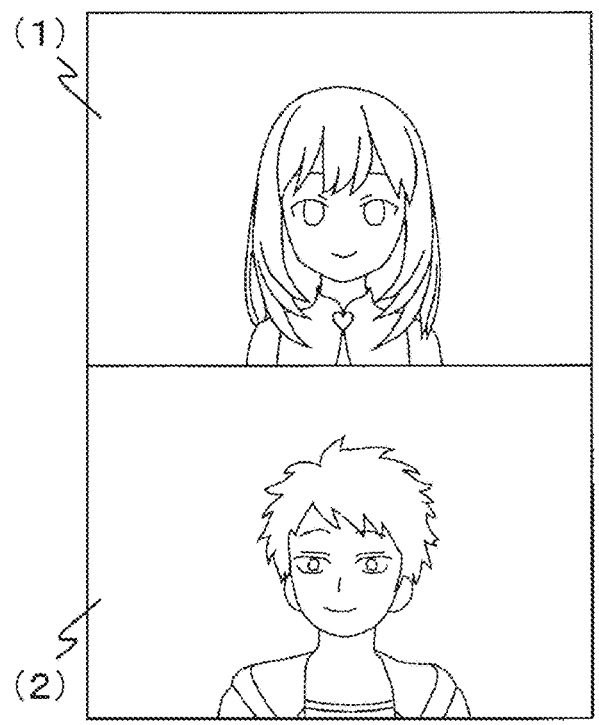
FIGS. 1A to 1C are schematic diagrams showing examples of an overview of an information system.

Various embodiments of the present disclosure will be described below with reference to the drawings. It should be understood, however, that the technical scope of the present disclosure is not limited to these embodiments, and covers features recited in the Claims and equivalencies thereof.

The inventors of the present disclosure have recognized a problem in which users of conventional information systems may become bored with communication with other users, since there is no diversity in output from terminal devices of users when users are communicating with other users. The inventors have developed technologies of the present disclosure, including a control program for a terminal device, a terminal device, a control method for a terminal device, a control program for a server device, a server device, and a control method for a server device which may motivate the users to continue the communication with other users.

A control program for a terminal device is a control program for a terminal device of a first user. The control program causes the terminal device of the first user to execute displaying at least a first image including a first object representing the first user, and a second image including a second object representing a second user that is different from the first user, transmitting information relating to display of the first image to a terminal device of the second user, in a case of acquiring first speech of the first user, transmitting the first speech to the terminal device of the second user, displaying the first image including the first object that changes in accordance with actions of the first user or the first speech, in a case of receiving second speech of the second user, outputting the second speech, displaying the second image including the second object that changes in accordance with actions of the second user or the second speech, and receiving information, from a terminal device of a distributing user, for displaying a third image including a third object representing the distributing user, and displaying the third image, in accordance with a first instruction by the first user or a first instruction by the second user.

Also, the control program for the terminal device preferably causes the terminal device of the first user, during display of the third image, to execute, in a case of receiving the second speech of the second user, outputting the second speech, and in a case of receiving third speech of the distributing user, outputting the third speech. The first speech that is preferably transmitted to the terminal device of the second user in a case of acquiring the first speech of the first user is not transmitted to the terminal device of the distributing user.

Also, the control program for the terminal device preferably causes the terminal device of the first user to execute altering display of the first image and the second image in accordance with display of the third image, and ending display of the third image in accordance with a second instruction by the first user or a second instruction by the second user, and returning display of the first image and the second image to display before the altering.

Also, in the control program for the terminal device, preferably, altering of the display of the first image and the second image is to alter a size or a position of the first image and the second image, or is to alter the first image and the second image into a fourth image including the first object and the second object.

Also, the control program for the terminal device preferably causes the terminal device of the first user, during display of the third image, to execute displaying the third image including a fourth object corresponding to a third instruction by the first user or a third instruction by the second user.

Also, the control program for the terminal device preferably causes the terminal device of the first user, during display of the third image, to execute, in a case of a condition relating to a display request of the third instruction by the first user and/or the third instruction by the second user being satisfied, displaying the third image including a fifth object.

Also, in the control program for the terminal device, preferably, the condition relating to the display request is that the fourth object corresponding to the third instruction by the first user and the fourth object corresponding to the third instruction by the second user are objects of a particular type that are different from each other, and that a time difference between timing of the third instruction by the first user and timing of the third instruction by the second user is within a predetermined time.

Also, the control program for the terminal device preferably causes the terminal device of the first user, during display of the third image including the fifth object, to execute, in a case in which the condition relating to the display request is satisfied, displaying the third image including the fifth object, without displaying the fourth object corresponding to the third instruction by the first user and the fourth object corresponding to the third instruction by the second user.

Also, the control program for the terminal device preferably causes the terminal device of the first user, during display of the third image including the fourth object, to execute including the fourth object, of which a display form is changed in accordance with a count of times of the third instruction by the first user and/or the second user, in the third image.

Also, the control program for the terminal device preferably causes the terminal device of the first user, during display of the third image, to execute, in a case in which a predetermined condition relating to a total of a count corresponding to a fourth instruction by the first user and/or the second user is satisfied, displaying the third image including a sixth object.

Also, the control program for the terminal device preferably causes the terminal device of the first user, during display of the third image including the sixth object, to execute displaying an image relating to the first user and the second user, the image being positioned near the sixth object or overlaid on the sixth object.

Also, the control program for the terminal device preferably causes the terminal device of the first user to execute displaying a first input object for the first user to select the sixth object, and in a case in which the first input object is specified by the first user, displaying a second input object for the first user to input the fourth instruction, and transmitting information relating to selection of the sixth object to the terminal device of the second user. The information relating to selection of the sixth object is preferably used for displaying a second input object for the second user to input the fourth instruction, at the terminal device of the second user that receives the information.

A control program for a server device is a control program for a server device that is communicable with each of a terminal device of a first user and a terminal device of a second user that is different from the first user. The control program causes the server device to execute receiving information relating to display of a first image including a first object representing the first user from the terminal device of the first user, and receiving information relating to display of a second image including a second object representing the second user from the terminal device of the second user, transmitting information for at least displaying the first image, to at least the terminal device of the second user, and transmitting information for at least displaying the second image, to at least the terminal device of the first user, in a case of receiving first speech of the first user, transmitting the first speech to the terminal device of the second user, transmitting information for displaying the first image including the first object that changes in accordance with actions of the first user or the first speech, to at least the terminal device of the second user, in a case of receiving second speech of the second user, transmitting the second speech to the terminal device of the first user, transmitting information for displaying the second image including the second object that changes in accordance with actions of the second user or the second speech, to at least the terminal device of the first user, and transmitting information, received from a terminal device of a distributing user, for displaying a third image including a third object representing the distributing user, to the terminal device of the first user and the terminal device of the second user, in accordance with a first instruction by the first user or a first instruction by the second user.

A terminal device is a terminal device of a first user. The terminal device includes a processing unit that displays at least a first image including a first object representing the first user, and a second image including a second object representing a second user that is different from the first user, transmits information relating to display of the first image to a terminal device of the second user, in a case of acquiring first speech of the first user, transmits the first speech to the terminal device of the second user, displays the first image including the first object that changes in accordance with actions of the first user or the first speech, in a case of receiving second speech of the second user, outputs the second speech, displays the second image including the second object that changes in accordance with actions of the second user or the second speech, and receives information, from a terminal device of a distributing user, for displaying a third image including a third object representing the distributing user, and displays the third image, in accordance with a first instruction by the first user or a first instruction by the second user.

A server device is a server device that is communicable with each of a terminal device of a first user and a terminal device of a second user that is different from the first user. The server device includes a processing unit that receives information relating to display of a first image including a first object representing the first user from the terminal device of the first user, and receives information relating to display of a second image including a second object representing the second user from the terminal device of the second user, transmits information for at least displaying the first image, to at least the terminal device of the second user, and transmits information for at least displaying the second image, to at least the terminal device of the first user, in a case of receiving first speech of the first user, transmits the first speech to the terminal device of the second user, transmits information for displaying the first image including the first object that changes in accordance with actions of the first user or the first speech, to at least the terminal device of the second user, in a case of receiving second speech of the second user, transmits the second speech to the terminal device of the first user, transmits information for displaying the second image including the second object that changes in accordance with actions of the second user or the second speech, to at least the terminal device of the first user, and transmits information, received from a terminal device of a distributing user, for displaying a third image including a third object representing the distributing user, to the terminal device of the first user and the terminal device of the second user, in accordance with a first instruction by the first user or a first instruction by the second user.

A control method of a terminal device is a control method of a terminal device of a first user. The control method includes the terminal device of the first user displaying at least a first image including a first object representing the first user, and a second image including a second object representing a second user that is different from the first user, transmitting information relating to display of the first image to a terminal device of the second user, in a case of acquiring first speech of the first user, transmitting the first speech to the terminal device of the second user, displaying the first image including the first object that changes in accordance with actions of the first user or the first speech, in a case of receiving second speech of the second user, outputting the second speech, displaying the second image including the second object that changes in accordance with actions of the second user or the second speech, and receiving information, from a terminal device of a distributing user, for displaying a third image including a third object representing the distributing user, and displaying the third image, in accordance with a first instruction by the first user or a first instruction by the second user.

A control method of a server device is a control method of a server device that is communicable with each of a terminal device of a first user and a terminal device of a second user that is different from the first user. The control method includes receiving information relating to display of a first image including a first object representing the first user from the terminal device of the first user, and receiving information relating to display of a second image including a second object representing the second user from the terminal device of the second user, transmitting information for at least displaying the first image, to at least the terminal device of the second user, and transmitting information for at least displaying the second image, to at least the terminal device of the first user, in a case of receiving first speech of the first user, transmitting the first speech to the terminal device of the second user, transmitting information for displaying the first image including the first object that changes in accordance with actions of the first user or the first speech, to at least the terminal device of the second user, in a case of receiving second speech of the second user, transmitting the second speech to the terminal device of the first user, transmitting information for displaying the second image including the second object that changes in accordance with actions of the second user or the second speech, to at least the terminal device of the first user, and transmitting information, received from a terminal device of a distributing user, for displaying a third image including a third object representing the distributing user, to the terminal device of the first user and the terminal device of the second user, in accordance with a first instruction by the first user or a first instruction by the second user.

Overview of Information System

Figure 1B:
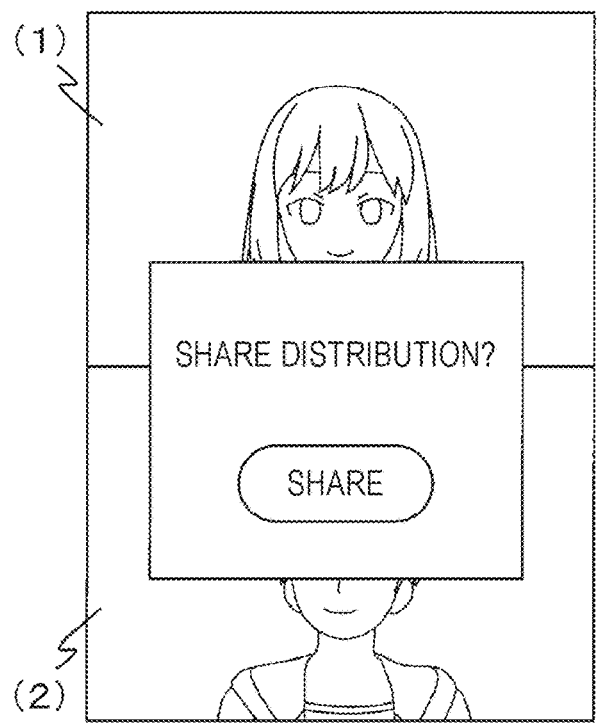
Figure 1C:
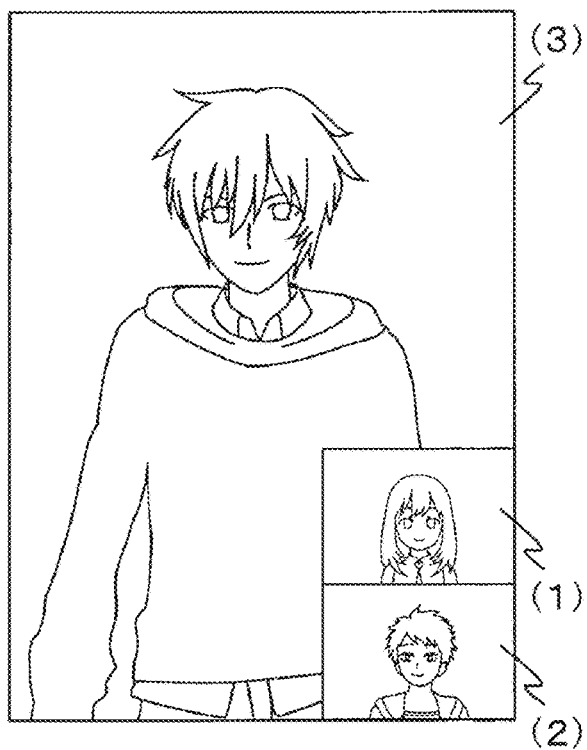

FIGS. 1A to 1C show examples of an overview of an information system. The information system includes terminal devices that a plurality of users each operate, and a server device. An example of a terminal device is an information processing device such as a multifunction mobile telephone (a so-called "smartphone") or the like that a user owns. An example of a server device is a computer that provides a communication service between terminal devices via a communication network.

The terminal device stores control programs such as application programs and so forth. The control programs are loaded to memory in accordance with start operations performed by the user, and the communication service is started by executing commands included in the control programs that are loaded. Upon the communication service being started, the terminal device realizes a plurality of functions by executing commands included in the control programs.

For example, the terminal device of the user realizes a generating function of generating output information including character video data that includes motion data based on various types of input data input by the user. For example, the input data is a plurality of pieces of imaged data acquired at predetermined sampling time intervals by an imaging apparatus that the terminal device of the user includes, and in this case, the user is in the imaged data. Character video data is an example of information relating to displaying user output images including a character object that represents the user. Output information is generated every predetermined amount of time during the communication service.

Also, for example, the terminal device of the user realizes an output function of transmitting the output information to the server device every predetermined amount of time, in order to display the user output image on the basis of character video data and to transmit the generated output information to terminal devices of other users via the server device. Also, the terminal device of the user realizes a function of displaying other user output images including character objects representing other users, on the basis of output information of other users transmitted from the server device every predetermined amount of time, for example.

Upon the communication service being started, the terminal device of the user displays, for example, a user output image (1) and an other-user output image (2), as illustrated in FIG. 1A. In a case in which no other users are participating in the communication service when the communication service is started, just the user output image (1) is displayed on the terminal device of the user. When the user is not participating in the communication service when the communication service is started, just the other-user output image (2) is displayed at the terminal device of the other user.

The user output image (1) includes a character object of the user that acts in accordance with motion data of the user included in the character video data. Also, the other-user output image (2) includes a character object of the other user that acts in accordance with motion data of the other user included in the output information of the other user that is received. Thus, the terminal device of the user displays the user output image (1) that includes the character object of the user that changes in accordance with actions of the user, and displays the other-user output image (2) that includes the character object of the other user that changes in accordance with actions of the other user.

Both the terminal device of the user and the terminal device of the other user are equipped with a microphone, and accordingly the terminal device of the user acquires speech uttered by the user, and the terminal device of the other user acquires speech uttered by the other user. The terminal device of the user includes speech data of the user that has been acquired in the output information, and transmits this output information to the server device in order to transmit the output information including the speech data of the user to the terminal device of the other user via the server device. The terminal device of the user also receives output information including speech data of the other user transmitted to the server device by the terminal device of the other user, from the server device.

For example, when speech is uttered by the user, motion data of the user that is included in the character video data includes face motion data representing the movement of the lips of the user. In this case, the user output image (1) that includes the character object of the user with the lips moving so as to substantially be synchronized with the speech that the user is uttering is displayed at the terminal device of the user. There are cases in which speech data of the other user is included in the output information of the other user received by the terminal device of the user, along with the motion data of the other user. In this case, the speech of the other user is output at the terminal device of the user, as well as the other-user output image (2) including the character object of the other user with the lips moving so as to substantially be synchronized with the speech that the other user is uttering being displayed.

Besides the above-described functions, the terminal device of the user realizes a function of displaying a distribution image based on output information distributed in a particular distribution event, in accordance with instruction by the user or instruction by another user. The distribution image is a user output image based on character video data of a distributing user. An example of a particular distribution event by a distributing user will be described below.

In order for the distributing user to start the particular distribution event, the terminal device of the distributing user loads a video distribution application program to memory, and executes commands included in the video distribution application program that has been loaded, in accordance with execution start operations performed by the distributing user. The video distribution application program is an element program that is part of the control programs stored in the terminal device of the distributing user. The video distribution program may be a program that is different from the control programs. In the particular distribution event, the terminal device of the distributing user has a function of transmitting output information including game video data of character video data or the like, including motion data input by the distributing user, to the server device.

In order for an audience user to watch the distribution image of the distributing user, the terminal device of the audience user loads the video distribution application program to memory, and executes commands included in the video distribution application program that has been loaded, in accordance with execution start operations performed by the audience user. In a particular distribution event, the terminal device of the audience user transmits to the server device a watching instruction of a distribution image regarding which watching is desired, out of distribution images being distributed, in accordance with a watching start operation performed by the audience user. The server device transmits output information relating to the distribution image regarding which the audience user desires to watch, in accordance with the watching instruction from the terminal device of the audience user, to the terminal device of the audience user. Upon receiving the output information transmitted by the server device, the terminal device of the audience user displays the distribution image including the character object of the distributing user on the basis of the character video data or the like of the distributing user included in the output information. Thus, the distributing user can carry out a distribution event in which a distribution image relating to the distributing user is provided to one or a plurality of terminal devices of watching users via the server device.

In a case in which a watching start operation has been performed by the user during the communication service, the terminal device of the user participating in the communication service displays a screen querying the user whether or not to display a distribution image at the terminal device of the other user (FIG. 1B). Upon receiving an instruction to display the distribution image at the terminal device of the other user as well, the terminal device of the user transmits a watching instruction of the distribution image to the server device in accordance with the operation performed by the user with regard to the screen (FIG. 1B) that is displayed. In a case in which a plurality of distribution images are being distributed, information relating one distribution image in accordance with a selection instruction performed by the user may be transmitted to the server device along with the watching instruction.

Upon receiving the watching instruction transmitted from the terminal device of the user, the server device transmits output information for displaying the distribution image corresponding to the watching instruction of the user to the terminal device of the user and the terminal device of the other user. In a case in which a watching instruction is transmitted from the terminal device of the user, the terminal device of the user and the terminal device of the other user display a distribution image (3) on the basis of the output information transmitted from the server device (FIG. 1C).

Upon receiving the watching instruction transmitted from the terminal device of the other user, the server device transmits output information for displaying the distribution image corresponding to the watching instruction of the other user on the terminal device of the user and the terminal device of the other user. In a case in which a watching instruction is transmitted from the terminal device of the other user, the terminal device of the user and the terminal device of the other user can display the distribution image (3) on the basis of the output information transmitted from the server device, in the same way as with the case in which the watching instruction is transmitted from the terminal device of the user (FIG. 1C).

Note that in a case in which speech data of the distributing user is included in the output information, the terminal device of the user and the terminal device of the other user display the distribution image (3) including the character object of the distributing user in which the lips move so as to be substantially synchronized with the speech that the distributing user is uttering.

In a case of displaying the distribution image (3), the terminal device of the user and the terminal device of the other user display the user output image (1) and the other-user output image (2) with the size thereof reduced, as illustrated in FIG. 1C. Also, in a case of displaying the distribution image (3) the terminal device of the user and the terminal device of the other user may end display of the user output image (1) and the other-user output image (2).

Thus, as described with reference to FIG. 1, in the control program for the terminal device of the user, the terminal device of the user, the control method for the terminal device of the user, the control program for the server device, the server device, and the control method for the server device, the terminal device of the user receives information for displaying a distribution image including a character object representing the distributing user transmitted by the terminal device of the distributing user via the server, and displays the distribution image in accordance with instruction by the user or another user. In this way, according to the control program for the terminal device of the user, the terminal device of the user, the control method for the terminal device of the user, the control program for the server device, the server device, and the control method for the server device, output from the terminal device of the user is altered during the communication service by the user or the other user, and accordingly motivation of users to continue communication can be raised.

Also, with conventional information systems, when communication is being performed by a user with another user via a character object such as an avatar or the like that represents the user, the user needs to interrupt or end the communication service in order to start another service during this communication. Thereafter, the user and the other user can receive provision of the other service by instructing the server device or the like to start the other service. In this way, in a conventional information system, in a case of the user and another user receiving provision of another service while receiving provision of a service, there is communication relating to interruption or ending of the service, and communication relating to starting of the other service. Thus, there has been a problem in that the processing load on the terminal devices and/or the load of communication between the terminal devices and the server device increase in a case of the user and another user receiving provision of another service while receiving provision of a service. In contrast with this, in the control program for the terminal device of the user, the terminal device of the user, the control method for the terminal device of the user, the control program for the server device, the server device, and the control method for the server device, disclosed in the embodiments, the user and the other user can receive provision of a distribution service just by communication relating to starting of the distribution service, and accordingly the processing load on the terminal devices and/or the load of communication between the terminal devices and the server device can be reduced.

In the example illustrated in FIG. 1, out of a plurality of users capable of using the communication service, the user and the other user are users belonging to a predetermined communication group. The predetermined communication group is a group created by one of the user and the other user, or the like. In the example illustrated in FIG. 1, the character objects of the two users are displayed, but a configuration may be made in which the character objects of three or more users belonging to the predetermined communication group are displayed, and communication can be carried out by three or more users.

Also, in the example illustrated in FIG. 1, the user and the other user may have a predetermined relation. The other user having a predetermined relation with the user is a follower of the user, for example. Note that in a case in which the user follows the other user, and the other user also follows the user (the user and the other user are mutually following), the user and the other user are mutual followers. Also, the other user having a predetermined relation with the user may be another user that is in a mutual following relation with a predetermined user that the user is mutually following. Also, the other user having a predetermined relation with the user may be another user that is in a friend relation with the user, or may be another user regarding which identifying information (telephone number, email address, predetermined identification (ID) or the like) is stored in the terminal device of the user. Also, in a case in which the terminal device of the user has a function of distributing a user output image including a character object of the user to terminal devices of one or a plurality of other users via the server device, the other user having a predetermined relation with the user is another user that watched a user output image distributed by the user. In this case, when the user and another user having a predetermined relation perform communication such as illustrated in FIG. 1, a predetermined communication group made up of the user and the other user may be temporarily created by the terminal device of the user or the other user, or by the server device.

Note that the above description made with reference to FIG. 1 is only description for facilitating understanding of the contents of the present disclosure. The present disclosure specifically is carried out according to the embodiments which will be described below, and various modifications may be made thereto without substantially departing from the principle of the present disclosure. Such modifications are all encompassed by the present disclosure.

Information System 1

Figure 2:
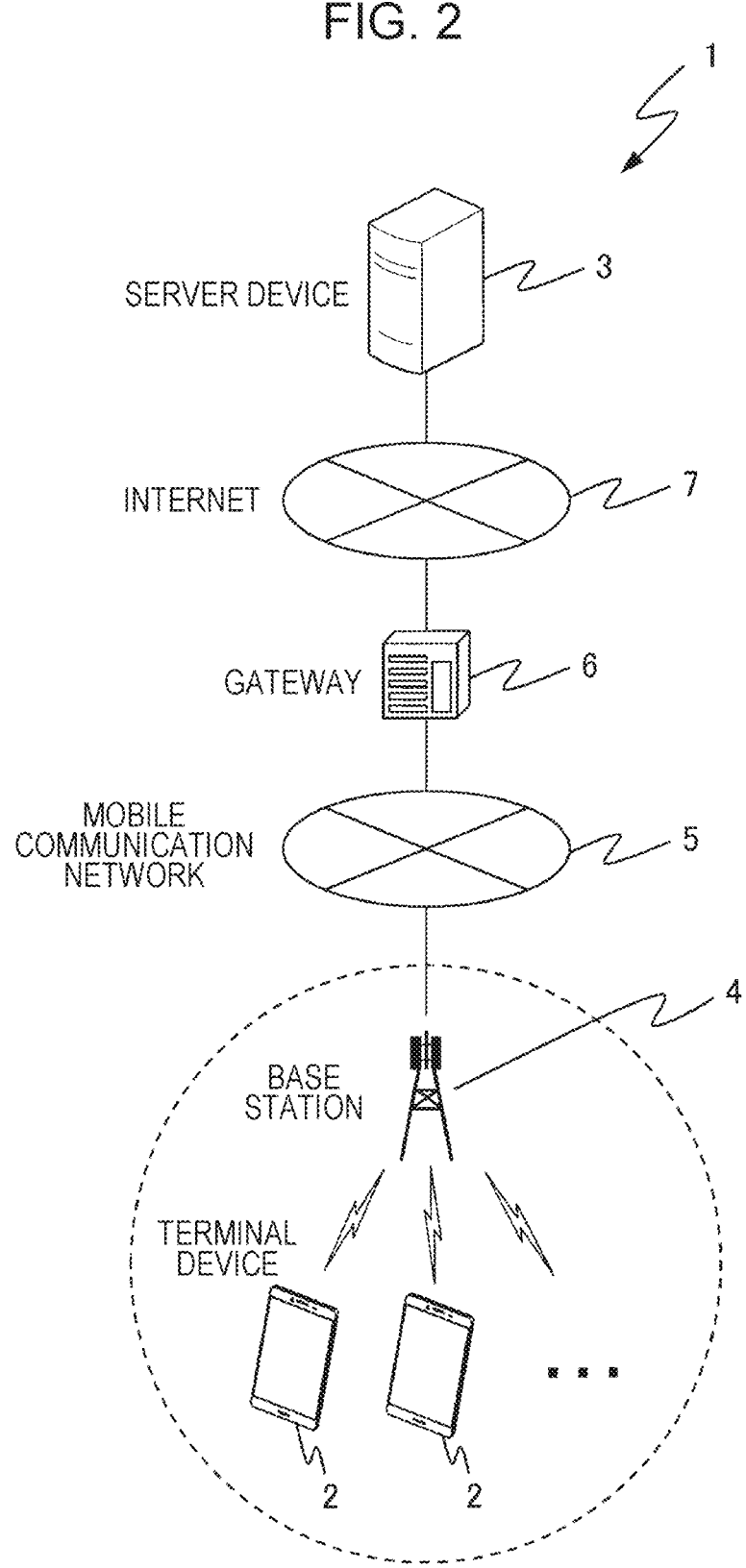
FIG. 2 illustrates a schematic configuration of the information system.

FIG. 2 illustrates an example of a schematic configuration of the information system 1. The information system 1 includes terminal devices 2 that each of a plurality of users operate, and a server device 3. The terminal devices 2 and the server device 3 are mutually connected via a base station 4, a mobile communication network 5, a gateway 6, and a communication network such as the Internet 7 or the like. Communication between the terminal devices 2 and the server device 3 is performed on the basis of a communication protocol such as Hypertext Transfer Protocol (HTTP) or the like. Also, an arrangement may be made in which a connection is established first between the terminal devices 2 and the server device 3 by HTTP communication, following which bidirectional communication is performed on the basis of WebSocket which is low-cost (communication load and processing load is small) as compared to HTTP communication. Note that the communication format between the terminal devices 2 and the server device 3 is not limited to the above-described format, and that any sort of communication format technology may be used between the terminal devices 2 and the server device 3, as long as the present embodiment can be carried out.

The terminal device 2 is an information processing device such as a smartphone or the like. The terminal device 2 may be a mobile telephone, a laptop PC, a tablet terminal, a tablet PC, a head-mounted display (HMD), an e-book reader, a wearable computer, or the like. The terminal device 2 may be a portable gaming device, a gaming console, or the like. The terminal device 2 may be any sort of information processing device, as long as it is capable of display output of character objects of the user and the other user, and capable of output of speech of the user and the other user.

In the example illustrated in FIG. 2, one server device 3 is illustrated as a component of the information system 1, but the server device 3 may be an aggregation of a plurality of server devices 3 that are physically separate. In this case, the plurality of server devices 3 may each have the same functions, or the functions of one server device 3 may be distributed among the plurality of server devices 3.

Terminal Device 2

FIG. 3 illustrates an example of a schematic configuration of the terminal device 2. The terminal device 2 connects to the server device 3 via the base station 4, the mobile communication network 5, the gateway 6, and the communication network such as the Internet 7 or the like, and performs communication with the server device 3. The terminal device 2 generates character video data including motion data, in accordance with various types of data (imaged data, etc.) input by the user, and transmits output information including the generated character video data and/or speech data of the user to the server device 3. Also, the terminal device 2 receives output information of the other user that is transmitted from the server device 3, and on the basis of the received output information, displays the character object of the other user and/or outputs speech of the other user. In order to realize such functions, the terminal device 2 includes a terminal communication interface 21, a terminal storage device 22, a display device 23, an input device 24, an imaging apparatus 25, a microphone 26, and a terminal processing device 27.

The terminal communication interface 21 is implemented by hardware, firmware, communication software such as a Transmission Control Protocol/Internet Protocol (TCP/IP) driver or a Point-to-Point Protocol (PPP) driver or the like, or a combination thereof. The terminal device 2 can transmit data to other devices such as the server device 3 or the like, and receive data from the other devices, via the terminal communication interface 21.

The terminal storage device 22 is, for example, a semiconductor memory device such as read-only memory (ROM), random-access memory (RAM), or the like. The terminal storage device 22 stores operating system programs, driver programs, control programs, data, and so forth, which is used in processing by the terminal processing device 27. The driver programs stored in the terminal storage device 22 are output device driver programs for controlling the display device 23, input device driver programs for controlling the input device 24, and so forth. The control programs stored in the terminal storage device 22 are application programs for realizing various types of functions relating to the communication service, for example. Note that control programs may be transmitted from the server device 3 or from another device.

The terminal storage device 22 stores, as data, identification information (e.g., user ID) or the like, for uniquely identifying the user operating the terminal device 2. The terminal storage device 22 also stores, as data, background data, model data, and so forth. The terminal storage device 22 further stores, as data, a user table T1, an object table T2, and a group table T3. The terminal storage device 22 may also temporarily store data relating to predetermined processing.

Background data is asset data for constructing virtual space in which the character objects of the user and the distributing user exist, in user output images and distribution images. The background data includes data for drawing the background of the virtual space, data for drawing various types of things included in user output images and distribution images, and data for drawing various types of background objects displayed in user output images and distribution images other than these. Background data may include object position information indicating positions of various types of background objects in the virtual space.

The display device 23 is a liquid crystal display. Note that the display device 23 may be an organic electroluminescent (EL) display or the like. The display device 23 displays moving images in accordance with moving image data, and/or still images in accordance with still image data, and so forth, supplied from the terminal processing device 27, on the display screen. Also, the display device 23 does not have to be a component of the terminal device 2, and in this case, the display device 23 may be an HMD type display that is capable of communicating with the server device 3, a projector device for projection mapping that is capable of wired or wireless communication with the terminal device 2, a retinal projector type projecting device, or the like.

The input device 24 is a pointing device such as a touch panel or the like. In a case in which the input device 24 is a touch panel, the input device 24 can detect various types of touch operations performed by the user, such as tapping, double-tapping, dragging, and so forth. The touch panel may include a capacitive proximity sensor, and be configured to be capable of detection of non-contact operations performed by the user. Note that the input device 24 may be input keys or the like. The user can input characters, numerals, symbols, position on the display screen of the display device 23, and so forth, using the input device 24. When operated by the user, the input device 24 generates signals in accordance with the operation thereof. The input device 24 then supplies the generated signals to the terminal processing device 27 as user instructions.

The imaging apparatus 25 is a camera that has an image-forming optical system, an imaging device, an image processing unit, and so forth. The image-forming optical system is an optical lens for example, and forms an image on an imaging face of the imaging device out of a light flux from a subject. The imaging device is a charge coupled device (CCD), a complementary metal oxide semiconductor (CMOS), or the like, and outputs images of subject images image-formed on the imaging face. The image processing unit creates, from images consecutively generated by the imaging device, moving image data of a predetermined file format every predetermined period, and outputs the created moving image data as imaged data. Alternatively, the image processing unit generates still image data of a predetermined file format from images generated by the imaging device which is output as imaged data.

The microphone 26 is a sound-collecting device that is configured to acquire speech uttered by the user, and convert the speech into speech data. The microphone 26 is configured to be able to acquire speech input of the user, the speech input of the user acquired by the microphone 26 is converted into speech data, and the speech data is output to the terminal processing device 27.

The terminal processing device 27 is a processor that loads the operating system programs, the driver programs, and the control programs, which are stored in the terminal storage device 22, into memory, and executes commands included in the loaded programs. Examples of the terminal processing device 27 include electronic circuits such as a central processing unit (CPU), a microprocessor unit (MPU), a digital signal processor (DSP), a graphics processing unit (GPU), and so forth, or a combination of various types of electronic circuits. The terminal processing device 27 may be realized by an integrated circuit such as an application-specific integrated circuit (ASIC), a programmable logic device (PLD), a field-programmable gate array (FPGA), a microcontroller unit (MCU), or the like. Although the terminal processing device 27 is illustrated as a single component in FIG. 3, the terminal processing device 27 may be an aggregation of a plurality of processors that are physically separate.

The terminal processing device 27 functions as a generating unit 271, a transmitting unit 272, a receiving unit 273, a display processing unit 274, and an audio output unit 275, by executing various types of commands included in the control programs. Functions of the generating unit 271, the transmitting unit 272, the receiving unit 273, the display processing unit 274, and the audio output unit 275 will be described later.

Various Types of Tables

FIGS. 4A to 4C illustrates examples of data structures of the user table T1, the object table T2, and the group table T3, which are stored in the terminal storage device 22. Note that at least one of the user table T1, the object table T2, and the group table T3 may be stored in a server storage device 32 of the server device 3. In this case, the terminal device 2 may receive the newest table stored in the server storage device 32 and perform storing thereof in the terminal storage device 22, at a predetermined timing.

User Table T1

FIG. 4A is an example of a data structure of the user table T1 that manages users participating in the communication service. In the user table T1, a user ID, the name of the user, a character object of the user, possessed objects of the user, used objects, and so forth, for each user, are stored in a mutually-associated manner. In the user table T1, possessed coins of the user (information indicating the total amount of "coins" that is a virtual currency value possessed by the user) and/or user points or the like may be stored associated with the user ID of the user. The user ID is an example of identification data for uniquely identifying each user. The name is an example of data that indicates the name of each user.

The character object is a model ID for identifying model data for generating animation of the character object, for example. The model data is stored in the terminal storage device 22 in a manner associated with the model ID. The model data may be three-dimensional model data for generating three-dimensional animation, or may be two-dimensional model data for generating two-dimensional animation. The model data includes rig data indicating the framework of the face and portions other than the face of the character object (so-called "skeleton data"), and surface data indicating the shape and texture of the surface of the character object, for example. A plurality of pieces of model data that are different from each other may be included in the model data. Each of the plurality of pieces of model data may have rig data different from each other, or may have the same rig data. Each of the plurality of pieces of model data may have surface data different from each other, or may have the same surface data.

Possessed objects are object IDs indicating objects that the user possesses. A possessed object is a worn object that can be associated with a particular part of the character object, a wallpaper object or the like that is placed in the background of the user and the character object of the distributing user, in user output images and distribution images. Details of worn objects and wallpaper objects will be described later. A possessed object is an object selected in a drawing game carried out by the terminal device 2 of the user or by the server device 3, in accordance with user operations. Also, a possessed object may be an object that the user has come to possess by the user spending the virtual currency value "coins" in a purchasing function in the information system 1.

Used objects are object IDs indicating objects being used in the user output image being displayed on the terminal device 2 of the user. For example, in a case in which an alteration instruction is input by the user during the communication service, a worn object possessed by the user as a possessed object is worn by the character object of the user included in the user output image that is being displayed. In this case, the object ID of the worn object that is worn by the character object of the user is stored in the user table T1, in association with the user ID, as a used object. Also, in a case in which an alteration instruction is input by the user during the communication service, for example, a wallpaper object possessed by the user as a possessed object is placed on the background of the character object of the user included in the user output image that is being displayed. In this case, the object ID of the wallpaper object placed in the user output image is stored in the user table T1, in association with the user ID, as a used object.

Object Table T2

FIG. 4B is an example of the data structure of the object table T2 that manages objects selected as additional objects. Additional objects are gift objects that users send to other users, for example. In the object table T2, the object ID, the name, image information, rarity, placement location, and so forth, for each additional object, are stored in a mutually-associated manner.

The object ID is an example of identification data for uniquely identifying each additional object. The image information is one or a plurality of still images corresponding to each additional object. The image information may be one or more types of moving images corresponding to each additional object. The rarity is information indicating the degree of rarity of each additional object. The placement location is information indicating the location that the image information of each additional object will be displayed. Note that in a case in which a display position and a display range are set for a character object, information indicating a relative position as to this character object may be stored as the placement location.

Additional objects are classified into a plurality of types (categories). For example, additional objects include effect objects that are used as effect gifts, normal objects used as normal gifts, worn objects used as worn gifts, and message objects used as message gifts. Wallpaper objects placed in the backgrounds of character objects in user output images and distribution images may be included in additional objects. Note that information indicating the types (categories) of additional objects may be stored in the object table T2 in a manner associated with object IDs of the additional objects. Image information and placement locations will be described below in accordance with types of additional objects.

Effect objects are objects that affect the overall impression of user output images and/or other-user output images. Also, effect objects are objects that affect the overall impression of distribution images. Effect objects are objects replicating confetti, for example. In a case in which an effect object is an object replicating confetti, an image representing a plurality of pieces of paper is stored as image information.

Information indicating "space" is stored as the placement location of an effect object. For example, an effect object replicating confetti is displayed over the entirety of user output images and/or other-user output images. Note that an effect object may be displayed over the entirety of a screen including a user output image and an other-user output image (a later-described communication screen) in accordance with user instructions. Also, an effect object may be displayed only in an output image selected by the user from a user output image and an other-user output image. Also, an effect object may be displayed overlaying a character object included in a user output image and/or an other-user output image. Unlike worn objects which will be described later, effect objects are displayed with no association to particular parts of characters. Thus, the terminal device 2 of the information system 1 can change the overall impression of user output images and/or other-user output images by displaying effect objects in accordance with user instructions, in comparison with before displaying the effect objects. Note that the above-described effect objects are displayed in the same way in distribution images as well.

Examples of normal objects include objects representing stuffed toys, bouquets, accessories, and items suitable for gifts or presents. Information indicating "space" is stored as the placement location of a normal object. For example, information relating to a predetermined movement route is associated with a normal object, and a normal object moving along the predetermined movement route is displayed in a user output image, in an other-user output image, or in a distribution image. Information indicating "space" that is stored as the placement location of a "normal object" may be classified into a plurality of types. The plurality of types of "space" are, for example, a "middle space" (a region at the middle of an image in a case of laterally dividing a user output image or other-user output image into three), a "left-side space" (a region at the left of an image in a case of laterally dividing a user output image or other-user output image into three), and a "right-side space" (a region at the right of an image in a case of laterally dividing a user output image or other-user output image into three). Also, the plurality of types of "space" may be a "middle space" (a region at the middle of an image in a case of vertically dividing a user output image or other-user output image into three), an "upper space" (a region at the top of an image in a case of vertically dividing a user output image or other-user output image into three), and a "lower space" (a region at the bottom of an image in a case of vertically dividing a user output image or other-user output image into three). In this case, the movement route associated with the normal object is set within the type of "space" associated as the placement location of the normal object. For example, in a case in which information indicating "right-side space" is stored for the normal object, information relating to the movement route of moving through a region in the right side of the image in a case of laterally dividing a user output image or other-user output image into three is associated with the normal object. Also, a normal object may be displayed moving in accordance with a predetermined movement rule, from a position that is set in a user output image or an other-user output image for each normal object, or from an automatically and randomly decided position. A predetermined movement rule is, for example, a movement rule set so that the normal object moves as if free-falling. Note that a normal object may be displayed overlaying a character object. In this case, the normal object is displayed with no association to particular parts of character objects, unlike latter-described normal objects. Also, normal objects may be displayed so as to perform movement of bouncing away at a timing of coming into contact with the character object. Note that the above-described normal objects are displayed in the same way in distribution images as well.

In a case of displaying a normal object overlaid on a character object, the normal object may be displayed overlaying a "part other than the 'head' including the 'face'" of the character object, for example. In this case, the normal object is displayed so as not to overlay the "head" of the character object. Also, the normal object may be displayed overlaying a "part other than the 'upper body' including the 'face'" of the character object. In this case, the normal object is displayed so as not to overlay the "upper body" of the character object.

Worn objects are objects displayed in user output images, other-user output images, or distribution images, in association with particular parts (wearing locations) of character objects. Examples of particular parts include the front left side of the head of the character object, the front right side, the rear left side, the rear right side, the middle of the front side, and the middle of the rear side thereof, the left eye, the right eye, the left ear, the right ear, all of the hair, and so forth. Other examples of particular parts may include the thumb, the ring finger, the wrist, the elbow, the shoulder, the upper arm, the entire hand, the entire arm, and so forth.

A worn object associated with a particular part of a character object is displayed in user output images, other-user output images, or distribution images, in contact with the particular part of the character object. Also, a worn object associated with a particular part of a character object may be displayed in user output images, other-user output images, or distribution images, covering part or all of the particular part of the character object. The particular part may be identified by three-dimensional position information indicating a position in three-dimensional coordinates space, or may be associated with position information in three-dimensional coordinates space.

Image information of worn objects is image information replicating accessories (Alice band, necklace, earrings, etc.), clothing (T-shirt, dress, etc.) costume, and other such items that can be worn by the character objects.

Information indicating the wearing part, indicating with which part of the character object the character object the worn object is associated, is stored as the placement location of the worn object. For example, in a case in which the worn object is an "Alice band", information indicating the "head" of the character object is stored as the placement location of the worn object. Also, in a case in which the worn object is a "T-shirt", information indicating the "torso" of the character object is stored as the placement location of the worn object.

Information indicating a plurality of wearing parts in three-dimensional coordinates space may be stored as the placement location of the worn object. For example, in a case in which the worn object is an "Alice band", information indicating the two parts of "front left side of head" and "front right side of head" of the character object may be stored as the placement locations of the worn object. Thus, the worn object replicating an "Alice band" is displayed as being worn on both the "front left side of head" and the "front right side of head" of the character object.

In a case of a plurality of types of worn objects common to a wearing location of the character object are worn, these plurality of types of worn objects are worn by the character object over time. Accordingly, a plurality of types of worn objects common to a wearing part are not worn by the character object at the same time. For example, in a case of "head" being stored as the worn location of both a worn object representing "Alice band" and a worn object representing "hat", the worn object representing "Alice band" and the worn object representing "hat" are not displayed on the head of the character object at the same time.

A display time corresponding to the type of additional object may be stored in the object table T2 in association with the object ID of this additional object. For example, a longer display time of a worn object may be stored in comparison with the display time of an effect object and the display time of a normal object. For example, in a case in which the display time of a worn object is stored as "60 seconds", the display time of an effect object may be stored as "5 seconds", and the display time of a normal object as "10 seconds".

Group Table T3

FIG. 4C is an example of a data structure of the group table T3 that manages groups to which users belong (groups of users in friend relations, groups with other users that are mutual followers, groups optionally created by users or other users, etc.). The group table T3 is provided separately for each user, the group table T3 illustrated in FIG. 4C being a group table T3 of the user that operates the terminal device 2 in which this group table T3 is stored.

In the group table T3, a group ID of the group, the name of the group, included users belonging to the group, and so forth, for each group, are stored in a mutually-associated manner. The group ID is an example of identification data for uniquely identifying each group. The name is an example of data indicating the name of each group. The included users are user IDs of each user belonging to the group.

Returning to FIG. 3, the functions of the generating unit 271, the transmitting unit 272, the receiving unit 273, the display processing unit 274, and the audio output unit 275 will be described.

Generating Unit 271

The generating unit 271 acquires, from the imaging apparatus 25, imaged data that is consecutively output from the imaging apparatus 25. For example, the imaging apparatus 25 of the terminal device 2 that is held by the user is provided in the terminal device 2 such that the direction of shooting is toward the face of the user viewing the display screen of the display device 23. The imaging apparatus 25 consecutively performs imaging of the face of the user in the shooting direction, acquiring imaged data of the face of the user, which is output to the generating unit 271 of the terminal processing device 27. The imaging apparatus may image parts of the than the face of the user, such as for example, the head, the arm, the hands (including fingers), the chest, the torso, the legs, or other parts, and acquire imaged data. Also, the imaging apparatus 25 may be a 3D camera that is capable of detecting depth of people's faces.

The generating unit 271 consecutively generates face motion data, which is a digital expression of movement of the face of the user, over time, on the basis of the imaged data that is consecutively acquired. The face motion data may be generated at each predetermined sampling time interval. Thus, the face motion data generated by the generating unit 271 can digitally express the movement of the face of the user (change in expressions) in time sequence.

The generating unit 271 may generate body motion data that is a digital expression of the position and orientation of each part of the user (the head, the arm, the hands (including fingers), the chest, the torso, the legs, or other parts) along with the face motion data, or separately from the face motion data.

The body motion data may be generated on the basis of detection information from a known motion sensor worn by the user. In this case, the terminal communication interface 21 of the terminal device 2 has a predetermined communication circuit for acquiring detection information from the motion sensor that the user is wearing, by wireless communication. The generating unit 271 then generates body motion data on the basis of the detection information that is acquired by the terminal communication interface 21. The body motion data may be generated each predetermined sampling time interval. Thus, the body motion data generated by the generating unit 271 can digitally express body movement of the user in time sequence.

Generating body motion data on the basis of detection information from a motion sensor worn by the user may be performed at a movie studio, for example. In this case, the movie studio may be equipped with a base station, a tracking sensor, and a display. The base station is, for example, a multi-axis laser emitter. The motion sensor that is worn by the user may be Vive Tracker provided by HTC Corporation, for example, and the base station may be a base station provided by HTC Corporation, for example.

A supporter computer may be installed in a separate room adjacent to the movie studio. The display in the movie studio may be configured to display information received from the supporter computer. The server device 3 may be installed in the same room that the supporter computer is installed. The room in which the supporter computer is installed may be separated from the movie studio by a glass window. In this case, an operator of the supporter computer can visually recognize the user. The supporter computer may be configured to be capable of altering settings of various types of devices that the movie studio is equipped with, in accordance with operations performed at the supporter computer. The supporter computer can alter settings of scanning interval by the base station, settings of the tracking sensor, and various types of settings of various types of other equipment, for example. The operator may enter a message to the supporter computer and the input message may be displayed on the display in the movie studio.

The generating unit 271 generates character video data including the continuously-generated face motion data and/or body motion data, and outputs the generated character video data to the display processing unit 274. Hereinafter, face motion data and body motion data may be collectively referred to as "motion data". The generating unit 271 also generates output information including the generated character video data and the user ID stored in the terminal storage device 22, and outputs the generated output information to the transmitting unit 272. Note that in a case in which speech data of the user output from the microphone 26 is acquired, the generating unit 271 generates output information including the generated character video data, the acquired speech data, and the user ID stored in the terminal storage device 22, and outputs the generated output information to the transmitting unit 272.

Transmitting Unit 272

The transmitting unit 272 transmits the output information output from the generating unit 271, along with transmission destination information, to the server device 3 via the terminal communication interface 21. The transmission destination information includes user IDs of one or a plurality of other users participating in the communication service with the user. Also, user IDs included in the output information may be used as the transmission destination information. For example, the server device 3 stores the user IDs of the one or plurality of other users participating in the communication service with the user, and upon acquiring the output information, identifies the user IDs of the one or plurality of other users participating in the communication service with the user of the user ID included in the output information, and transmits the received output information to the terminal devices 2 of the other users indicated by the user IDs that are identified.

Also, the transmitting unit 272 transmits information indicating various types of instructions input by the user operating the input device 24, along with the user ID stored in the terminal storage device 22 and the transmission destination information, to the server device 3 via the terminal communication interface 21. The transmission destination information does not have to be transmitted along with the information indicating various types of instructions, and other information may be transmitted along with the information indicating various types of instructions. The various types of instructions by the user include an addition instruction and so forth. For example, and addition instruction is transmitted to the server device 3 via the terminal communication interface 21, along with the object ID of the additional object to be included in a distribution image, and the user ID of the user.

Also, the transmitting unit 272 transmits information relating to a distribution start instruction that instructs starting of a distribution event by the user, to the server device 3 via the terminal communication interface 21, along with the user ID of the user stored in the terminal storage device 22, in accordance with a start instruction for distribution by the user. Hereinafter, the user that has performed the start instruction for distribution may be referred to as "distributing user", and the user ID of the distributing user as "distributing user ID".

Also, the transmitting unit 272 (of the terminal device 2 of the distributing user) transmits the output information of the distributing user output from the generating unit 271, along with the user ID of the distributing user (distributing user ID) stored in the terminal storage device 22, to the server device 3 via the terminal communication interface 21, as output information for displaying the distribution image of the distributing user in the distribution event.

Also, the transmitting unit 272 (of the terminal device 2 of the distributing user) transmits information relating to a distribution end instruction for instructing ending of the distribution event by the distributing user, along with the user ID of the distributing user (distributing user ID) stored in the terminal storage device 22, to the server device 3 via the terminal communication interface 21, in accordance with an end instruction of distribution performed by the distributing user.

Also, in accordance with a watching start instruction of a distribution image, performed by the user, the transmitting unit 272 transmits information relating to the watching start instruction, along with information relating to the distribution image and the user ID of the user stored in the terminal storage device 22, to the server device 3 via the terminal communication interface 21. The information relating to the distribution image is information for identifying the distribution image regarding which the user has instructed starting of watching, and is, for example, identification information of the distribution image (distribution image ID), the user ID of the distributing user distributing the distribution image, or the like. Hereinafter, the user that performed the watching start instruction of the distribution image may be referred to as "watching user", and the user ID of the watching user as "watching user ID".

Receiving Unit 273

The receiving unit 273 receives output information of other users, information indicating various types of instructions of other users, and so forth, transmitted from the server device 3 via the terminal communication interface 21. The receiving unit 273 outputs information, which is received, to the terminal processing device 27. Output information of another user that is transmitted from the server device 3 is information generated by the generating unit 271 of the terminal device 2 of the other user, and transmitted to the server device 3 by the transmitting unit 272 of the terminal device 2 of the other user. The output information of the other user includes character video data of the other user, speech data of the other user, the user ID of the other user, and so forth. There may be cases in which no speech data of the other user is included in the output information of the other user, and there may be cases in which no character video data of the other user is included in the output information of the other user.

Also, the receiving unit 273 receives output information of a distributing user transmitted from the server device 3 via the terminal communication interface 21. The receiving unit 273 outputs the output information of the distributing user, which is received, to the terminal processing device 27.

Display Processing Unit 274

The display processing unit 274 (of the terminal device 2 of the user) displays an image, drawn on the basis of motion data (character video data) of the user that is generated by the generating unit 271, on the display device 23 as a user output image. Also, the display processing unit 274 (of the terminal device 2 of the user) displays an image, drawn on the basis of motion data (character video data) included in output information of another user received by the receiving unit 273, on the display device 23 as an other-user output image.

Also, the display processing unit 274 (of the terminal device 2 of the user) displays an image, drawn on the basis of motion data (character video data) included in output information of a distributing user received by the receiving unit 273, on the display device 23 as a distribution image of a distributing user. The output information of the distributing user that is received by the receiving unit 273 (of the terminal device 2 of the user) is output information for displaying a distribution image of the distributing user that is distributing, which is transmitted from the server device 3 in accordance with information relating to a watching start instruction transmitted from the terminal device 2 of the user. Also, the output information of the distributing user that is received by the receiving unit 273 (of the terminal device 2 of the user) is output information for displaying a distribution image of the distributing user that is distributing, which is transmitted from the server device 3 in accordance with information relating to a watching start instruction transmitted from the terminal device 2 of another user participating in the same communication service as the user.

Hereinafter, drawing processing of images based on motion data will be described. In drawing processing of images based on motion data of the user (the user operating the terminal device 2), the user ID stored in the terminal storage device 22 is used, and in drawing processing of images based on motion data included in output information of another user and a distributing user that is received by the receiving unit 273, the user ID included in the output information is used.

First, the display processing unit 274 extracts the model ID of the character object associated with the user ID, and the object IDs of used objects, from the user table T1. Next, the display processing unit 274 reads out model data associated with the model ID that is extracted, and image information and placement locations associated with the object IDs of the used objects that are extracted, from the terminal storage device 22. The display processing unit 274 then generates an animation of the character object with the used objects worn at the placement locations, on the basis of the model data that is read out, the image information and placement locations of the used objects, and the motion data. In a case in which face motion data is included in the motion data, the display processing unit 274 generates an animation of the character object such that the expressions of the character object change on the basis of the face motion data. Accordingly, the display processing unit 274 can generate an animation of the character object that moves synchronously with the movement of expressions of the user, on the basis of the model data and face motion data that are read out. In a case in which face motion data and body motion data are included in the motion data, the display processing unit 274 generates an animation of the character object that moves synchronously with the expressions and body movement of the user, on the basis of the model data, face motion data, and body motion data, which are read out.

Next, the display processing unit 274 draws an image including the animation (moving image) of the character object that is generated, and a background image representing the background generated using the background data stored in the terminal storage device 22. Note that the display processing unit 274 may use a wallpaper object stored in the terminal storage device 22 in a manner associated with the communication group in advance, as a background image. In this case, the same wallpaper object may be applied as the background image of all users within the communication group. The display processing unit 274 then outputs drawing data representing the drawn image, and ends the drawing processing of the image based on motion data. Note that an image drawn on the basis of the character object associated with the user ID stored in the terminal storage device 22 is the user output image of the user. Also, an image drawn on the basis of the character object associated with the user ID included in output information of another user that is received is the other-user output image of this other user. Further, an image drawn on the basis of the character object associated with the user ID included in output information of a distributing user that is received is the distribution image of this distributing user.

Also, in accordance with an addition instruction to display the additional object in the distribution image from the user, the display processing unit 274 displays the distribution image including the additional object. Also, in accordance with an addition instruction regarding an additional object to a distribution image from another user, the display processing unit 274 displays the distribution image including the additional object.

In a case in which the object ID included in the addition instruction of the additional object from the user or other user is an object ID of one of the effect objects, the display processing unit 274 references the object table T2, extracts a still image or a moving image (image information) of the effect object associated with the object ID included in the addition instruction from the terminal storage device 22, and generates a distribution image including the extracted still image or moving image. For example, in a case in which an addition instruction for an effect object representing confetti or fireworks is made, the display processing unit 274 generates a distribution image including a moving image of an effect object replicating confetti or fireworks.

In a case in which the object ID included in the additional instruction of the additional object from the user or other user is an object ID for a normal object, the display processing unit 274 references the object table T2 and extracts the placement location of a still image or a moving image (image information) of a normal object associated with the object ID of the normal object. Next, the display processing unit 274 generates a distribution image including the still image or moving image of the normal of the normal object placed at the position indicated by the placement location.

The display processing unit 274 may generate a distribution image including a moving image of a normal object that moves through the display region of the distribution image. Hereinafter, for example, the display processing unit 274 may generate a distribution image including a moving image of a normal object that falls from above toward below in the distribution image. In this case, the normal object may be displayed within the display region of the distribution image while falling from starting to fall to a lower end of the distribution image, and may disappear from the distribution image after falling to the lower end of the distribution image. Note that the moving route of the normal object may be a direction from left to right of the distribution image, a direction from right to left, a direction from upper left to lower left, or a route of a direction other than these, and may be a straight path, a circular path, an elliptic path, a spiral path, or a route following a path other than these.

In a case in which the object ID included in the additional instruction of the additional object from the user or other user is an object ID for a worn object, the display processing unit 274 displays notification information relating to a wearing instruction in the distribution image. The display processing unit 274 references the object table T2 in accordance with the wearing instruction from the distributing user, and extracts the image information and placement location of the worn object associated with the object ID included in the additional instruction. Next, the display processing unit 274 generates a distribution image including the character object wearing the worn object at the wearing part indicated by the placement location, on the basis of the extracted image information a placement location.

Audio Output Unit 275

In a case in which speech data of another user is included in the output information of the other user, the audio output unit 275 displays an other-user output image from the display processing unit 274, and also speech output of the speech of the other user that is generated on the basis of the speech data is performed from a speaker. Accordingly, speech of the other user is output during movement of the lips of the character object of the other user included in the other-user output image, and accordingly the user can watch the other-user output image including the character object of the other user that appears to be uttering speech.

Also, in a case in which speech data of a distributing user is included in the output information of the distributing user, the audio output unit 275 displays a distribution image from the display processing unit 274, and also speech output of the speech of the distributing user that is generated on the basis of the speech data is performed from a speaker. Accordingly, speech of the distributing user is output during movement of the lips of the character object of the distributing user included in the distribution image, and accordingly the user can watch the distribution image including the character object of the distributing user, which appears to be uttering speech.

Server Device 3

FIG. 5 illustrates an example of a schematic configuration of the server device 3. The server device 3 that provides the communication service to each terminal device 2 of the plurality of users transmits output information and information indicating various types of instructions, transmitted from the terminal device 2 of one user, to the terminal device 2 of another user that is different from the one user. Accordingly, the server device 3 includes a server communication interface 31, the server storage device 32, and a server processing device 33. For example, the terminal device 2 that is the transmission destination of information by the terminal device 2 of the one user is the terminal device 2 of the user indicated by the user ID included in the transmission destination information that is received.

The server communication interface 31 is implemented by hardware, firmware, communication software such as a TCP/IP driver or a PPP driver or the like, or a combination thereof. The server device 3 can transmit information to other devices, and receive information from the other devices, via the server communication interface 31.

The server storage device 32 is a semiconductor memory device such as ROM, RAM, or the like, for example. The server storage device 32 may be, for example, a magnetic disk, an optical disc, or various types of storage devices other than the above, which are capable of storing data. The server storage device 32 stores operating system programs, driver programs, application programs, data, and so forth, which are used in processing in the server processing device 33. Note that the server storage device 32 stores the distributing user ID of a distributing user that is distributing, and stores the user ID of a watching user (watching user ID) that is watching the distribution image of this distributing user, as data, in a manner associated with the distributing user ID of the distributing user. Note that the distributing user ID is a type of information relating to distribution images. The information relating to a distribution image may be identification information (distribution image ID) of the distribution image. For example, the distribution image ID, the distributing user ID, and the watching user ID may be stored in a manner associated with each other. Also, the server storage device may store the user table T1, the object table T2, and the group table T3.

The server processing device 33 is a processor that loads the operating system programs, the driver programs, and the control programs, which are stored in the server storage device 32, into memory, and executes commands included in the loaded programs. Examples of the server processing device 33 include electronic circuits such as a CPU, an MPU, a DSP, a GPU, or the like, or a combination of various types of electronic circuits. The server processing device 33 may be realized by an integrated circuit such as an ASIC, a PLD, an FPGA, an MCU, or the like. Although the server processing device 33 is illustrated as a single component in FIG. 5, the server processing device 33 may be an aggregation of a plurality of processors that are physically separate. The server processing device 33 functions as a server receiving unit 331 and a server transmitting unit 332 by executing various types of commands included in the control programs.

Server Receiving Unit 331

The server receiving unit 331 receives output information and information and so forth indicating various types of instructions transmitted from the terminal device 2 of one of the plurality of users, via the server communication interface 31. Note that the server receiving unit 331 may receive transmission destination information along with output information and information indicating various types of instructions, which are transmitted from the terminal device 2.

Also, the server receiving unit 331 receives information related to the distribution start instruction and the user ID transmitted from the terminal device 2 of the user, via the server communication interface 31. The server receiving unit 331 stores the received user ID as a distributing user ID indicating a distributing user that is distributing, in the server storage device 32. Hereinafter, the user of the terminal device 2 that has transmitted a distribution start instruction will be referred to as a distributing user. The server receiving unit 331 also receives output information of the distributing user transmitted from the terminal device 2 of the distributing user along with the distributing user ID, via the server communication interface 31. Note that at a predetermined timing (e.g., immediately following reception of a distribution start instruction or a predetermined amount of time following the distribution start instruction), the server receiving unit 331 extracts a model ID of a character object associated with the distributing user ID, and object IDs of used objects, from the user table T1. Next, the server receiving unit 331 generates a thumbnail image of the character object of the distributing user, on the basis of model data associated with the extracted model ID, and image information and placement locations associated with the object IDs of the extracted used objects. The server receiving unit 331 stores the thumbnail image that is generated in the server storage device 32 as a selection image, in a manner associated with information relating to the distribution image. The information relating to the distribution image is information for identifying the distribution image that the user has instructed for starting to watch, and is identification information of the distribution image (distribution image ID), a user ID of a distributing user that is distributing the distribution image, or the like, for example. Also, in a case in which a so-called room or world is set for the watching user to watch the distribution image, the information relating to the distribution image may be a room ID for identifying the room, or a world ID. Any image will suffice as the thumbnail image stored as a selection image, as long as it is an image representing the character object of the distributing user, created in advance. For example, a profile image of the character object of the distributing user may be stored as a thumbnail image.

Also, the server receiving unit 331 receives information relating to a distribution end instruction and the distributing user ID, transmitted from the terminal device 2 of the distributing user, via the server communication interface 31. The server receiving unit 331 deletes from among the distributing user IDs stored in the server storage device 32, the distributing user ID that is received, and the watching user ID associated with this distributing user ID.

Also, the server receiving unit 331 receives information relating to a watching start instruction transmitted from the terminal device 2 of the user, information relating to the distribution image, and the user ID of the user, via the server communication interface 31. The server receiving unit 331 determines whether or not information relating to the distribution image that is received is information relating to the distribution image that is being distributed. In a case in which the information relating to the received distribution image is information relating to the distribution image being distributed, the server receiving unit 331 stores the user ID of the user that is received in the server storage device 32 in a manner associated with information related to the distribution image. Thus, the user ID of the user that is received is stored as a watching user ID of the watching user of the distribution image identified by the information relating to the distribution image.

Also, in a case of receiving transmission destination information along with a watching start instruction from the terminal device 2 of the user, the server receiving unit 331 stores the user ID of another user belonging to the same communication group as the user (another user participating in the communication service and communicating with the user), in the server storage device 32 in a manner associated with the information relating to the distribution image that is received, on the basis of the received transmission destination information. For example, in a case in which a user ID of another user belonging to the same communication group as the user is included in the transmission destination information, the server receiving unit 331 extracts the user ID of the other user from the transmission destination information, and stores the extracted user ID in a manner associated with the information related to the distribution image. In a case in which a group ID for identifying the communication group that the user belongs to is included in the transmission destination information, the server receiving unit 331 references the group table T3 and so forth stored in the server storage device 32, extracts the user IDs associated with the group ID, and stores the user IDs that are extracted in a manner associated with the information relating to the distribution image. Thus, the user IDs of other users belonging to the same communication group as the user are stored as watching user IDs of watching users of the distribution image identified by the information relating to the distribution image.

Thus, output information for displaying the distribution image of the distributing user is transmitted to the terminal device 2 of the user and to the terminal devices 2 of the other users belonging to the same communication group as the user, by the watching start instruction performed by the user participating in the communication service.

Also, upon receiving information relating to a watching end instruction and a watching user ID transmitted from the terminal device 2 of a watching user, the server receiving unit 331 deletes the watching user ID, which is the same as the watching user ID that is received, from storage in the server storage device 32.

Server Transmitting Unit 332

The server transmitting unit 332 transmits the output information and information indicating various types of instructions, received by the server receiving unit 331, to the terminal devices 2 of other users indicated by user IDs included in the transmission destination information received at the same time, via the server communication interface 31. The server transmitting unit 332 may also transmit information indicating various types of instructions received by the server receiving unit 331 to the terminal devices 2 of one or a plurality of other users specified by the user transmitting the information, via the server communication interface 31.

Also, the server transmitting unit 332 transmits output information of the distributing user received by the server receiving unit 331 to the terminal devices 2 of watching users indicated by the watching user IDs associated with the distributing user ID of the distributing user and stored in the server storage device 32, via the server communication interface 31. The server transmitting unit 332 also transmits, for example, information indicating various types of instructions of watching users received by the server receiving unit 331, to the terminal device 2 of the distributing user indicated by the distributing user ID associated with the user ID of the watching user, and to the terminal devices 2 of the watching users indicated by user IDs of other watching users associated with the user ID of the distributing user, via the server communication interface 31.

Examples of Various Types of Screens

Examples of various types of screens displayed on the display device 23 of the terminal device 2 of a user will be described below with reference to FIGS. 6A to 15. In FIGS. 6A to 15, multiple components denoted by the same reference symbols are components having equivalent functions as each other.

Figure 6A:
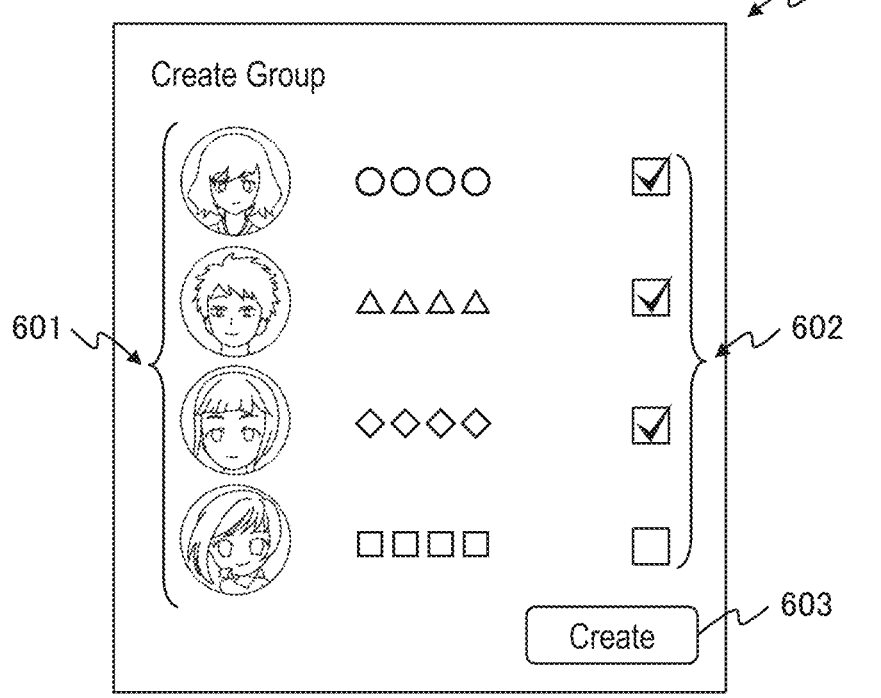
FIGS. 6A and 6B illustrate examples of screens displayed on a display device of the terminal device.

FIG. 6A is a diagram illustrating an example of a group creating screen 600 displayed on the display device 23 of the terminal device 2 of the user. The group creating screen 600 includes an other-user display region 601, selection objects 602, and a create button 603. The group creating screen 600 is displayed in a case that a group creating object or the like, in a home screen displayed in accordance with execution of a control program stored in the terminal storage device 22, is selected by the user operating the input device 24, for example.

Other-user information representing each of other users having a predetermined relation with the user is displayed in the other-user display region 601. In the example illustrated in FIG. 6A, the display processing unit 274 of the terminal device 2 of the user displays thumbnail images of character objects of other users, and the names of the other users, as other-user information.

The selection objects 602 are operation objects for selecting the other users represented by the other-user information. In the example illustrated in FIG. 6A, the display processing unit 274 of the terminal device 2 of the user displays checkbox objects corresponding each other-user information as the selection objects 602. For example, upon a selection object 602 being selected by the user operating the input device 24, the selection object 602 changes to a display including a checkmark. In this case, the other user of the other-user information corresponding to the selection object 602 displayed including the checkmark is in a selected state. Also, upon the selection object 602 displayed including the checkmark being selected by the user operating the input device 24, the selection object 602 changes to a display not including the checkmark. In this case, the other user of the other-user information corresponding to the selection object 602 displayed not including the checkmark is in a non-selected state. Each selection object 602 is associated with a user ID of the other user relating to the corresponding other-user information.

The create button 603 is a button object or the like for the user to create a new communication group. Upon the create button 603 being selected by the user operating the input device 24, a new group having the user operating the terminal device 2 and the other users in a selected state in the selection objects 602 as included users is created. For example, the display processing unit 274 of the terminal device 2 of the user identifies the user ID of the user stored in the terminal storage device 22, and the user IDs of the other users associated with the selection objects 602 relating to the other users in a state of being selected at the selection objects 602. The display processing unit 274 then stores the user ID of the user and the user IDs of the other users that are identified in the group table T3 as included users, in a manner associated with a newly-created group ID. At this time, the display processing unit 274 may correlate the newly-created group ID with an automatically created group name, or with a group name input by the user.

Figure 7A:
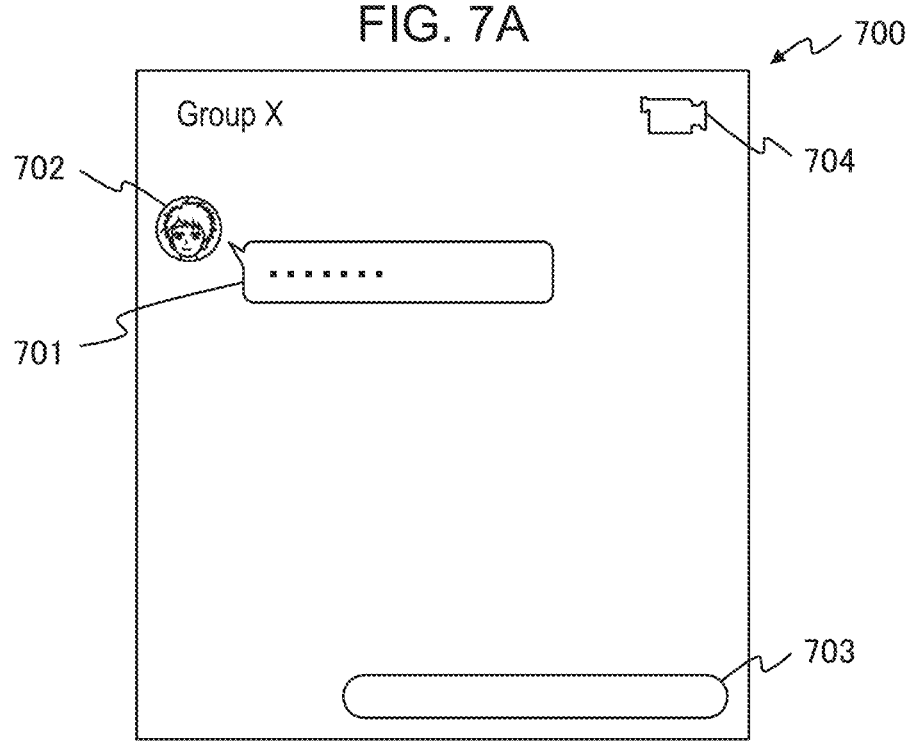
FIGS. 7A and 7B illustrate examples of screens displayed on the display device of the terminal device.

Upon a new group being created in accordance with selection of the create button 603, the display processing unit 274 displays an information exchange screen 700 regarding included users of the new group. FIG. 7A is a diagram illustrating an example of the information exchange screen 700 displayed on the display device 23 of the terminal device 2 of the user. The information exchange screen 700 includes a display region 701 displaying information such as text input by each of the included users of the new group, images thereof, or the like, information (thumbnail image of character object, etc.) 702 representing the included user that has input the information displayed in the display region 701, an input object 703 for the user to input text or images to be displayed in a new display region 701, and a start object 704 for starting the communication service.

Upon the information exchange screen 700 being displayed, the transmitting unit 272 of the terminal device 2 of the user transmits a display instruction for the information exchange screen, along with information relating to the new group and transmission destination information, to the server device 3 via the terminal communication interface 21. The information relating to the new group is the group ID of the new group, the name thereof, and user IDs of each of the included users. The transmission destination information includes the user IDs of each of the other users excluding the user operating the terminal device 2, out of the included users in the new group. The server receiving unit 331 of the server device 3 receives the display instruction for the information exchange screen, the information relating to the new group, and the transmission destination information, via the server communication interface 31. Note that the server receiving unit 331 may store the transmission destination information that is received in the server storage device 32. The server transmitting unit 332 of the server device 3 transmits the display instruction for the information exchange screen and the information relating to the new group to the terminal devices 2 of the other users indicated by the user IDs included in the transmission destination information, via the server communication interface 31. Upon receiving the display instruction for the information exchange screen, transmitted from the terminal device 2 of the user via the server device 3, the terminal devices 2 of the other users can display the information exchange screen 700 on which information can be exchanged by included users of the new group.

Returning to FIG. 7A, upon new information being input to the input object 703 by operation by any of the included members, for example, a display region 701 displaying new information is added to the information exchange screen 700 displayed by the terminal device 2 of the user that input the information. Also, the transmitting unit 272 of the terminal device 2 of the user that input the information transmits the new information that is input to the terminal devices 2 of included users other than the user that input the information, via the server device 3. Accordingly, the display region 701 displaying new information is added to the information exchange screen 700 displayed on the terminal devices 2 of the other users that are included users other than the user that input the information.

The start object 704 is a button object or the like for starting a communication service in which each of the included users of the new group can participate. Upon the start object 704 being selected by the user operating the input device 24, starting processing is executed for the communication service of which a group that can exchange information through the information exchange screen 700 is a communication group. An example of starting processing in accordance with the user selecting the start object 704 will be described below.

First, the display processing unit 274 of the terminal device 2 of the user displays a communication screen 810 (FIG. 8B) that can be displayed by the terminal devices 2 of the users belonging to the communication group. Also, the display processing unit 274 stores the group ID of the communication group in the terminal storage device 22 as the group ID of the group that has started the communication service. Further, the display processing unit 274, stores the user ID of the user in the terminal storage device 22 as the user ID of a user participating in the communication service. Note that in a case in which not all other users belonging to the communication group have yet participated in the communication service, only the user output information of the user is displayed in the communication screen 810. Next, the transmitting unit 272 of the terminal device 2 of the user transmits a start instruction of the communication service, along with the user ID of the user stored in the terminal storage device 22, and information relating to the communication group and/or transmission destination information, to the server device 3 via the terminal communication interface 21. Information relating to the communication group is the group ID of the communication group, the name thereof, and the user IDs of each of the included users. The transmission destination information includes the user IDs of each of the other users excluding the user operating the terminal device 2, out of the included users in the communication group. Note that in a case in which the transmission destination information is stored in the server storage device 32, the transmission destination information does not have to be transmitted. The server receiving unit 331 of the server device 3 receives the start instruction, user ID, information relating to the communication group, and/or the transmission destination information, via the server communication interface 31. The server transmitting unit 332 of the server device 3 transmits the start instruction, user ID, and information relating to the communication group, to the terminal devices 2 of the other users indicated by the user IDs included in the transmission destination information, via the server communication interface 31.

The receiving units 273 of the terminal devices 2 of the other users receive the start instruction, the user IDs, and information relating to the communication group, transmitted from the terminal device 2 of the user, from the server device 3. The receiving units 273 store the group ID out of the information relating to the communication group, in the terminal storage devices 22, as the group ID of the group that has started the communication service. Further, the display processing units 274 store the transmitted user IDs in the terminal storage devices 22 as user IDs of users participating in the communication service. The display processing units 274 of the terminal devices 2 of the other users display a notification screen on the basis of information relating to the communication group that is received. The display processing units 274 display a group selection screen 710 (FIG. 7B) for participating in the communication service on the display devices 23, in accordance with selection of a predetermined object in the notification screen by the user. This ends the starting processing. Note that the display processing units 274 of the terminal devices 2 of the other users may include a participation button 805, which will be described later, in the notification screen. Thus, the other user can immediately participate in the communication service without displaying the group selection screen 710.

The starting processing may be executed in a case in which the create button 603 of the group creating screen 600 is selected by the user operating the input device 24. That is to say, starting processing of the communication service, of which the new group created in the group creating screen 600 is the communication group, may be executed in accordance with the user selecting the create button 603. In this case, the information exchange screen 700 is not displayed.

Figure 6B:
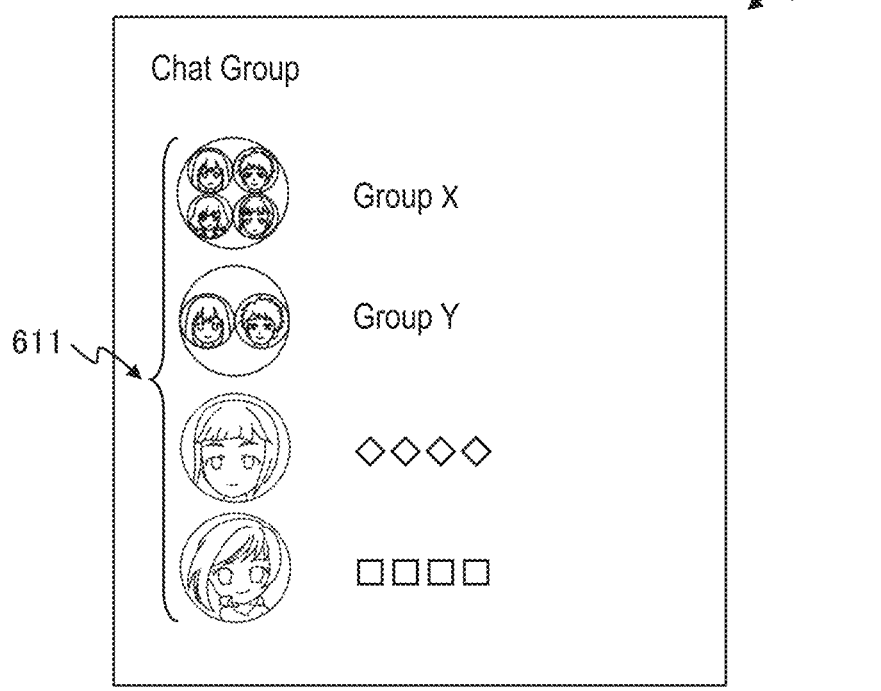

Also, the starting processing is not limited to starting processing of the communication service of which of which a new group created in the group creating screen 600 is the communication group. For example, starting processing of the communication service, of which an already-created group is the communication group, may be executed. For example, FIG. 6B is a diagram illustrating an example of a group selection screen 610 for selecting a communication group created by one of the users. For example, the group selection screen 610 is displayed in a case in which a group selection object or the like in a home screen displayed in accordance with execution of a control program stored in the terminal storage device 22 is selected by the user operating the input device 24.

The group selection screen 610 displayed on the terminal device 2 of the user includes a group display region 611 for selecting one of a plurality of communication groups. Group information indicating each of the communication groups that are already created, and to which the user belongs, is displayed in the group display region 611. In the example displayed in FIG. 6B, the display processing unit 274 of the terminal device 2 of the user displays the thumbnail image of each included user of the communication group, and the name of the group, as group information. In the example illustrated in FIG. 6B, the display processing unit 274 of the terminal device 2 of the user displays thumbnail images of each of the other users out of the included users, but thumbnail images may be displayed of each of all included users. Note that in a case in which only one other user is included in the communication group besides the user, the name of this one other user may be displayed instead of the group name, as illustrated in FIG. 6B.

When group information of one group included in the group display region 611 is selected by the user operating the input device 24, an information exchange screen 700 for included users of the communication group corresponding to the selected group information is displayed. The information exchange screen 700 includes information of text, images, or the like, input by each of the included users of the communication group. In this case as well, the display instruction of the information exchange screen, and information relating to the communication group, are transmitted to the terminal device 2 of the other users out of the included users of the communication group via the server device 3, and the information exchange screen 700 is displayed at the terminal devices 2 of the other users as well.

In a case in which the start object 704 is selected by the user in the information exchange screen 700, starting processing of the communication service by the communication group that exchanges information in the information exchange screen 700 is executed. Upon starting processing being executed, the display processing unit 274 of the terminal device 2 of the user displays the communication screen 810 (FIG. 8B) that can be displayed by the terminal devices 2 of each of the users belonging to the communication group. Also, the display processing units 274 of the terminal devices 2 of the other users display the notification screen, and display the group selection screen 710 (FIG. 7B) for participating in the communication service on the display device 23, in accordance with operations of the other users performed with respect to the notification screen. Note that in this case as well, the display processing units 274 of the terminal devices 2 of the other users may include the participation button 805, which will be described later, in the notification screen.

Note that in this case as well, starting processing may be executed in a case in which group information of one group is selected in the group selection screen 610 by the user operating the input device 24. That is to say, starting processing of the communication service by the communication group corresponding to the selected group information may be executed in accordance with the user selecting the group information of one group. In this case, the information exchange screen 700 is not displayed.

Figure 7B:
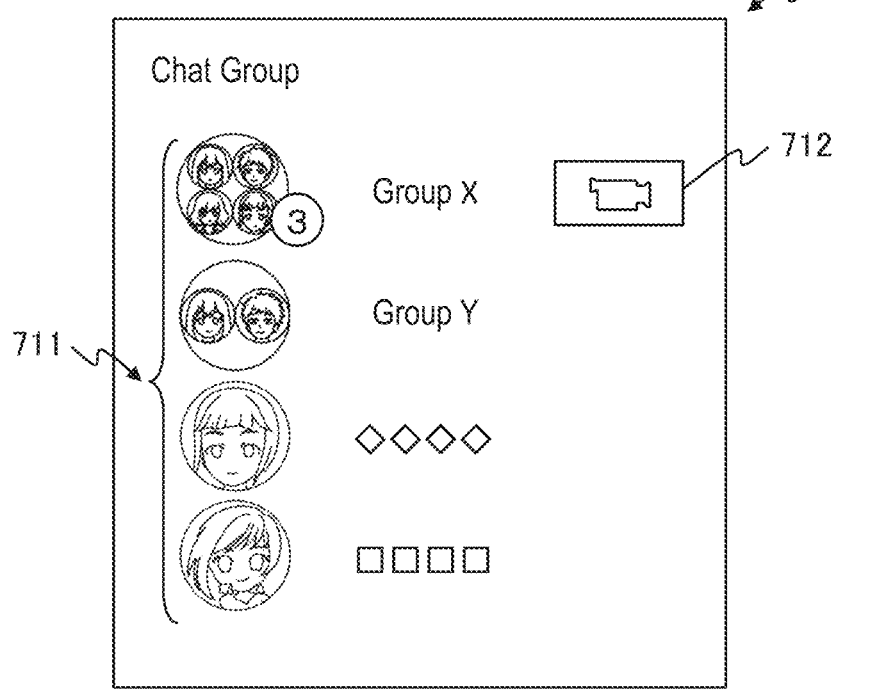

Next, a participation method of a user not participating in the already-started communication service will be described. FIG. 7B is a diagram illustrating an example of the group selection screen 710 displayed on the display device 23 of the terminal device 2 of the user. For example, the group selection screen 710 is displayed in accordance with a predetermined object in a displayed notification screen being selected. Also, the group selection screen 710 may be displayed in a case in which a group selection object or the like in a home screen displayed in accordance with execution of a control program stored in the terminal storage device 22 being selected by the user operating the input device 24.

In a group display region 711 of the group selection screen 710, group information indicating a communication group regarding which the communication service is started is displayed so as to be distinguishable from other group information. In the example illustrated in FIG. 7B, the group information displayed at the top indicates the communication group that has started the communication service. For example, information indicating the count of included users participating in the communication service is displayed overlaid on or near the thumbnail image of each of the included users of the communication group. Also, a mark image 712 indicating the communication service is displayed near the name of the communication group.

Upon group information indicating the communication group that has started the communication service out of the group information included in the group display region 711 being selected by the user operating the input device 24, an information exchange screen 800 for included users of the communication group corresponding to the selected group information is displayed.

FIG. 8A is a diagram illustrating an example of the information exchange screen 800 displayed on the display device 23 of the terminal device 2 of the user. The information exchange screen 800 includes display regions 801a and 801b displaying information of text, images, or the like, input by each of the included users of the communication group that has started the communication service, information 802a and 802b indicating the included user that input the information displayed in each of the display regions 801a and 801b (a thumbnail image or the like of a character object), an input object 803 for the user to input text or an image to be displayed in a new display region 801, a service display region 804 indicating the communication service that has already started, and the participation button 805 for participating in the communication service that has already started.

In the service display region 804 illustrated in FIG. 8A, thumbnail images of character objects of three users participating in the communication service are displayed. Information indicating that the communication service has started is displayed in the display region 801b illustrated in FIG. 8A. Participation processing is executed by the user selecting the participation button 805. An example of the participation processing will be described below.

Upon the participation button 805 being selected by the user operating the input device 24, first, the display processing unit 274 of the terminal device 2 of the user stores the user ID of the user, stored in the terminal storage device 22, in the terminal storage device 22 as the user ID of the user participating in the communication service relating to the service display region 804. Next, the display processing unit 274 displays the communication screen 810 (FIG. 8B) including the user output images of all users participating in the communication service.

Next, the transmitting unit 272 of the terminal device 2 of the user transmits a participation instruction for the communication service, along with the user ID of the user stored in the terminal storage device 22, and information relating to the communication group and/or transmission destination information, to the server device 3 via the terminal communication interface 21. The information relating to the communication group is the group ID of the communication group, the name, and the user ID of each included user. The transmission destination information includes the user ID of each other user excluding the user operating the terminal device 2, out of the included users of the communication group. The server receiving unit 331 of the server device 3 receives the participation instruction, the user ID, and the information relating to the communication group and/or the transmission destination information via the server communication interface 31. The server transmitting unit 332 of the server device 3 transmits the participation instruction, the user ID, and the information relating to the communication group to the terminal devices 2 of the other users indicated by the user IDs included in the transmission destination information, via the server communication interface 31.

The receiving units 273 of the terminal devices 2 of the other users receive the participation instruction, the user IDs, and the information relating to the communication group, transmitted from the terminal device 2 of the user, from the server device 3. The receiving units 273 store the received user IDs in the terminal storage device 22 as user IDs of the users participating in the communication service. In a case in which the communication screen 810 is displayed on the terminal device, the display processing units 274 of the terminal devices 2 of the other users display the communication screen 810 including the user output images of all users participating in the communication service. Thus, the participation processing ends.

Selection processing may be executed in a case in which group information is selected in the group selection screen 710 by the user operating the input device 24. That is to say, participation processing in a communication service that the communication group corresponding to the group information can participate may be executed in accordance with selection of group information by the user. In this case, the information exchange screen 800 is not displayed.

The form of starting or participating in the communication service is not limited to the above-described example. For example, other starting processing that is different from the starting processing performed in accordance with selection of the start object 704 by the user may be executed. Other starting processing is executed in a case in which a predetermined display object for specifying starting of the communication service is selected by the user in a predetermined screen such as a home screen or the like. Note that the predetermined display object may be displayed in a case in which the thumbnail image or the like of the character object of the user is selected, or may be included in a menu item in a predetermined screen. Other starting processing may be automatically executed in a case in which predetermined starting conditions are satisfied. For example, the predetermined starting conditions are that the current clock time is a clock time set in advance, a predetermined amount of time has elapsed since the previous communication service ended, the count of mutual followers of the user exceeded a predetermined count, and so forth. An example of other starting processing will be described below.

First, the transmitting unit 272 of the terminal device 2 of the user transmits a start instruction of the communication service, along with the user ID of the user stored in the terminal storage device 22 and/or transmission destination information, to the server device 3 via the terminal communication interface 21. The transmitting unit 272 also stores the user ID of the user in the terminal storage device 22 as a user ID of the user that is participating in the communication service. The transmission destination information includes user IDs of each of one or a plurality of other users that have a predetermined relation with the user. For example, the transmission destination information may include user IDs of one or a plurality of other users that are mutual followers with the user. Also, the transmission destination information may include user IDs of other users that are in a mutual follower relation with a predetermined user that is a mutual follower with the user, instead of or in addition to the user IDs of one or a plurality of other users that are mutual followers with the user.

The server receiving unit 331 of the server device 3 receives the start instruction, and the user ID and/or transmission destination information via the server communication interface 31. The server transmitting unit 332 of the server device 3 transmits the start instruction, the user ID, and the transmission destination information to the terminal devices 2 of the other users indicated by the user IDs included in the transmission destination information, via the server communication interface 31. The receiving units 273 of the terminal devices 2 of the other users receive the start instruction transmitted from the terminal device 2 of the user, the user ID, and the transmission destination information, from the server device 3. The receiving units 273 store the transmitted user IDs in the terminal storage devices 22, as user IDs of users participating in the communication service. The display processing units 274 of the terminal devices 2 of the other users display the notification screen on the display devices 23, on the basis of the received user ID. The notification screen includes information prompting participation in the communication service from the user indicated by the received user ID, and a participation button or the like.

Upon the participation button within the notification screen being selected by the other user operating the input device 24, the display processing unit 274 of the other terminal device 2 stores the user ID of the other user stored in the terminal storage device 22, in the terminal storage device 22 as a user ID of a user participating in the communication service relating to the service display region 804. Next, the display processing unit 274 displays the communication screen 810 (FIG. 8B) including the output images of all users participating in the communication service.

Next, the transmitting units 272 of the terminal devices 2 of the other users transmits the participation instruction for the communication service, along with the user IDs of the other users stored in the terminal storage devices 22 and/or transmission destination information, to the server device 3 via the terminal communication interfaces 21. The transmission destination information is obtained by deleting, from the user IDs included in the transmission destination information that was received earlier by the receiving units 273, the user ID of the other user of the terminal device 2 transmitting the transmission destination information, and at the same time adding the user ID received by the receiving units 273. The server receiving unit 331 of the server device 3 receives the participation instruction, and the user ID and/or the transmission destination information via the server communication interface 31. The server transmitting unit 332 of the server device 3 transmits the participation instruction, the user ID, and the transmission destination information, to the terminal device 2 of the other user indicated by the user ID included in the transmission destination information, via the server communication interface 31.

The receiving unit 273 of the terminal device 2 of the user that is the transmission destination of the participation instruction receives the participation instruction, the user ID and the transmission destination information transmitted from the terminal device 2 of the user, from the server device 3. The receiving unit 273 stores the received user ID in the terminal storage device 22 as a user ID of the user participating in the communication service. In a case in which the communication screen 810 is displayed at this terminal device 2, the display processing unit 274 of the terminal device 2 displays the communication screen 810 including the user output images of all users participating in the communication service. Thus, the series of participation processing ends.

Note that the form of starting or participating in the communication service with other users having a predetermined relation with the user is not limited to the above-described example. For example, in a case in which a predetermined display object for the user to specify starting of the communication service is selected by the user, a selection screen including information indicating other users that are mutual followers with one or a plurality of users may be displayed. In this case, upon information indicating one of the other users being selected by the user, other starting processing based on a start instruction for starting communication with the other user that is selected may be executed. Further, in this case, an arrangement may be made in which the information exchange screen for information exchange with the selected other users is displayed, and other starting processing based on a start instruction for starting communication with other users is executed by a start button within the information exchange screen being selected.

In a conventional information system, a user was not able to perform starting and/or participation instruction for communication with other users having a predetermined relation with the user, such as a mutual following with the user or the like, using a simple interface. In the information system 1 disclosed in the present embodiment, by executing the above-described other starting processing, the user interface relating to starting and/or participation instruction for communication can be improved, and the communication load between the server device 3 and the terminal devices 2 can be reduced.

FIG. 8B is a diagram illustrating an example of the communication screen 810 displayed on the display device 23 of the terminal device 2. The communication screen 810 is a communication screen of a communication group including the user operating the terminal device 2 as an included user. Hereinafter, the user operating the terminal device 2 will be referred to as user A, and users other than the user A that are participating in the communication service corresponding to the communication screen 810 will be referred to as user B1, user B2, user B3, and so on. Note that the user B1, user B2, user B3, and so on may be collectively referred to as "user B".

The communication screen 810 includes at least a user output image 812a including a character object 811a of the user A. In the example illustrated in FIG. 8B, there are three users (user B1, user B2, and user B3) participating in the communication service, other than the user A. That is to say, user output images 812b1, 812b2, and 812b3, including respective character objects 811b1, 811b2, and 811b3, of the user B1, user B2, and user B3 are included in the communication screen 810. Hereinafter, the character objects 811b1, 811b2, and 811b3 may collectively be referred to as character objects 811b, and the user output images 812b1, 812b2, and 812b3 may collectively be referred to as user output images 812b. Note that the user B is another user as to the user A, and the user output image 812b of the user B displayed on the terminal device 2 of the user A is an other-user output image.

In a case in which there are no users participating in the communication service other than the user A, only the user output image 812a is included in the communication screen 810, and each time a user B participates in the communication service, the user output image 812b of the user B is newly included in the communication screen 810. There is no upper limit in the count of users that can participate in the communication service, and in a case in which nine users B are participating in the communication service other than the user A, for example, the user output images 812b1, 812b2, 812b3, and so on through 812b9, of each of the nine users B, are included in the communication screen 810, along with the user output image 812a of the user A.

The character object 811a is an animation (moving image) of the character object of the user A generated by the display processing unit 274 on the basis of the motion data of the user A generated by the generating unit 271 and the character object and the used object that are associated with the user ID of the user A in the user table T1. Note that the motion data of the user A generated by the generating unit 271 is the same as the motion data included in the output information transmitted to the terminal devices 2 of the users B. Speech data of the user A is included in the output information of the user A, along with the motion data of the user A. In a case in which face motion data of the user A is included in the motion data of the user A generated by the generating unit 271, a user output image 812*a* including the character object 811*a* of which the expressions change synchronously with the movement of the expressions of the user A is displayed. For example, when the user A is uttering speech, a user output image 812*a* including the character object 811*a* with the lips in movement is displayed. Also, in a case in which body motion data of the user A is included in the motion data of the user A generated by the generating unit 271, a user output image 812*a* including the character object 811*a* with the corresponding part in action synchronously with the body movement of the user A is displayed.

Note that the transmitting unit 272 of the terminal device 2 of the user A transmits the output information of the user A, along with the transmission destination information (user IDs of the users B (user B1 to user B3) included in the communication group) to the server device 3, via the terminal communication interface 21. Next, the server receiving unit 331 of the server device 3 receives output information of the user A transmitted from the terminal device 2 of the user A, via the server communication interface 31. Next, the server transmitting unit 332 of the server device 3 references the user IDs of the users B (user B1 to user B3) that are received, and transmits the output information of the user A to the terminal devices 2 of the users B (user B1 to user B3), via the server communication interface 31. Upon the output information being received by the receiving units 273 of the terminal devices 2 of the users B, via the terminal communication interface 21, the display processing units 274 of the terminal devices 2 of the users B display the user output image 812*a* including the character object 811*a* based on the motion data of the user A indicated by the user ID included in the output information.

The character objects 811*b* are animation (moving images) of character objects of the users B generated by the display processing unit 274 on the basis of the motion data included in the output information of the users B received by the receiving unit 273, and the character object associated with the user IDs of the users B in the user table T1. In a case in which face motion data of the users B is included in the motion data of the users B received by the receiving unit 273, user output images 812*b* including the character objects 811*b* with expressions changing synchronously with movement of expressions of the users B are displayed. For example, in a case in which the users B utter speech, user output images 812*b* including the character objects 811*b* with the lips in movement are displayed. Also, in a case in which body motion data of the users B is included in the motion data of the users B generated by the generating unit 271, user output images 812*b* including the character objects 811*b* with the corresponding parts in action synchronously with body motion of the users B are displayed. In a case in which speech data of the users B is included in the output information of the users B received by the receiving unit 273, the user output images 812*b* are displayed by the display processing unit 274, and also speech output of the speech of the users B generated by the audio output unit 275 on the basis of speech data is performed.

Thus, by the communication screen 810 including the user output image 812*a* and the user output images 812*b* being displayed, the user A can listen to the speech of the users B while viewing the character objects 811*b* of the user B that appears to be uttering speech. Also, the character object and the speech data of the user A is output by the terminal devices 2 of the users B. Accordingly, the user A and the users B participating in the communication service can have communication through the character objects.

A start-watching button 813 is included in the communication screen 810. In the example illustrated in FIG. 8B, the start-watching button 813 is placed within the display region of the user output image 812*a*, but may be displayed outside of the display region of the user output image 812*a*. Also, display control may be performed by the display processing unit 274 such that the start-watching button 813 is displayed for a predetermined amount of time in a case in which predetermined display conditions are satisfied.

The start-watching button 813 is an object image, such as a button object or the like, for instructing display of a selection screen 900 for selecting a distribution image out of distribution images currently being distributed to be displayed on the terminal device 2 of the user A and the terminal devices 2 of the users B (user B1 to user B3). Upon the start-watching button 813 being selected by the user A operating the input device 24, the selection screen 900 is displayed. The communication screen 810 is also displayed on each of the terminal devices 2 of the users B1 to B3 performing communication with the user A as well. Accordingly, the start-watching button 813 is displayed not only on the terminal device 2 of the user A, but on the terminal devices 2 of each of the users B1 to B3 as well.

Figure 9A:
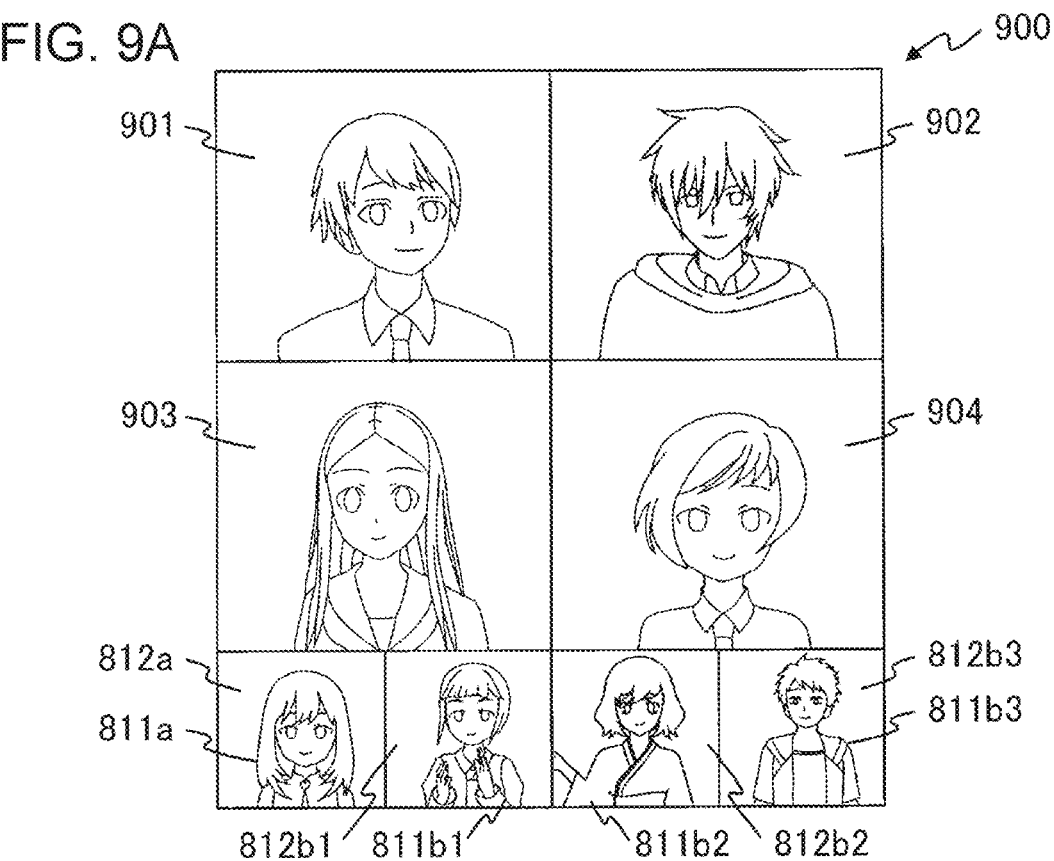
FIGS. 9A and 9B illustrate examples of screens displayed on the display device of the terminal device.

FIG. 9A is a diagram illustrating an example of the selection screen 900 displayed on the display device 23 of the terminal device 2. The selection screen 900 is displayed in a case of the start-watching button 813 included in the communication screen 810 (FIG. 8B) being selected by the user A operating the input device 24. Note that in a case in which a distribution list button is selected by the user A operating the input device 24, a selection screen 1000, which will be described later, may be selected without the selection screen 900 being displayed.

Selection images 901, 902, 903, and 904, relating to distribution images currently being distributed, are displayed in the selection screen 900. Thumbnail images of character objects included in the respective distribution images are displayed in each of the selection images 901, 902, 903, and 904. The count of selection images displayed in the selection screen 900 is not limited to four. In a case in which the display processing unit 274 of the terminal device 2 is not able to include the selection images relating to the distribution images currently being distributed within the selection screen 900, the selection images corresponding to the distribution images may be displayed in a scrollable manner. In this case, selection images not currently displayed in the selection screen 900 are displayed by scrolling within the selection screen 900 in accordance with a swipe operation (e.g., an operation of a finger in contact with the screen moving upward from the bottom of the screen) performed by the user A.

Further, the selection screen 900 includes the user output images 812*a*, 812*b*1, 812*b*2, and 812*b*3, including respective character objects 811*a*, 811*b*1, 811*b*2, and 811*b*3. The user output images 812*a*, 812*b*1, 812*b*2, and 812*b*3 included in the selection screen 900 are alterations of display of the user output images 812*a*, 812*b*1, 812*b*2, and 812*b*3 included in the communication screen 810. Alteration of display includes at least one of alteration of display form, alteration of display content, and alteration of display method, for example.

Alternation in display form includes, for example, at least one of alteration of display size of the user output images 812*a*, 812*b*1, 812*b*2, and 812*b*3, alteration of the display position of the user output images 812*a*, 812*b*1, 812*b*2, and 812*b*3, alteration of at least one of the brightness, brilliance, and chromaticity of the user output images 812*a*, 812*b*1, 812*b*2, and 812*b*3, alteration of the transmissivity of the user output images 812*a*, 812*b*1, 812*b*2, and 812*b*3, alteration of the shape of the display frames of the user output images 812*a*, 812*b*1, 812*b*2, and 812*b*3 (e.g., altering from a rectangular shape to a rounded shape), setting whether or not a display frame is provided for the user output images 812*a*, 812*b*1, 812*b*2, and 812*b*3, blinking display of the user output images 812*a*, 812*b*1, 812*b*2, and 812*b*3, automatically moving the user output images 812*a*, 812*b*1, 812*b*2, and 812*b*3, in display, and so forth. For example, the user output images 812*a*, 812*b*1, 812*b*2, and 812*b*3, included in the selection screen 900 illustrated in FIG. 9A are the user output images 812*a*, 812*b*1, 812*b*2, and 812*b*3 included in the communication screen 810 that have been reduced in size and the display position altered.

Alteration of display content is at least one of, for example, alteration of the character objects 811*a*, 811*b*1, 811*b*2, and 811*b*3 (included in the user output images 812*a*, 812*b*1, 812*b*2, and 812*b*3) to still images, alteration of the character objects 811*a*, 811*b*1, 811*b*2, and 811*b*3 to deformed images, altering the character objects 811*a*, 811*b*1, 811*b*2, and 811*b*3 to the names of the corresponding users, and so forth. Note that the still images may be profile images of the users, icon images, or the like. The speech data of the users B1 to B3 may be output on the basis of each piece of output information of the users B1 to B3 received every predetermined time interval, even when the images in the user output images 812*a*, 812*b*1, 812*b*2, and 812*b*3 are still images and user names. Thus, communication between the user A and the users B1 to B3 by speech can be continued, while reducing the processing load of the terminal devices 2 by not using motion data.

Alteration of the display method is, for example, displaying the user output images 812*a*, 812*b*1, 812*b*2, and 812*b*3 in a case in which predetermined display conditions are satisfied. Also, alteration of the display method is, for example, ending display of the user output images 812*a*, 812*b*1, 812*b*2, and 812*b*3 in a case in which predetermined display conditions are satisfied. Examples of alteration of the display method include displaying the user output image 812 corresponding to speech data being output only while the speech data of the user is being output, displaying the user output images 812*a*, 812*b*1, 812*b*2, and 812*b*3 for a predetermined amount of time (e.g., 10 seconds) after detecting a predetermined operation (e.g., a swipe operation a flick operation, etc.) by the user of the terminal device 2, displaying the user output images 812*a*, 812*b*1, 812*b*2, and 812*b*3 after a predetermined amount of time (e.g., 10 seconds) elapsing after detecting an operation by the user of the terminal device 2 (in this case, the display of the user output images 812*a*, 812*b*1, 812*b*2, and 812*b*3 ends upon detection of some sort of operation by the user of the terminal device 2), or the like. For example, alteration of the display method may be ending display of the user output images 812*b*1, 812*b*2, and 812*b*3 of the users B1 to B3 other than the user A operating the terminal device 2.

In the selection screen 900 illustrated in FIG. 9A, the user output image 812*a*, including the character object 811*a* of which corresponding parts act synchronously with facial expressions and body movement of the user A, is displayed. Also, the user output images 812*b*1 to 812*b*3, including the character objects 811*b*1 to 811*b*3 of which corresponding parts act synchronously with facial expressions and body movement of the users B1 to B3 are displayed. Also, the user A can hear the speech of the users B1 to B3 while viewing the character objects 811*b*1 to 811*b*3 of the users B1 to B3 that appear to be uttering speech, in the selection screen 900.

Hereinafter, an example of display processing of the selection screen 900 will be described. In a case in which the start-watching button 813 included in the communication screen 810 (FIG. 8B) is selected by the user A operating the input device 24, the input device 24 inputs a confirmation instruction to the terminal processing device 27. The transmitting unit 272 of the terminal device 2 of the user A transmits the information indicating the confirmation instruction input from the input device 24, along with the user ID of the user A stored in the terminal storage device 22, to the server device 3 via the terminal communication interface 21. Next, the server receiving unit 331 of the server device 3 receives the information indicating the confirmation instruction and the user ID of the user A, via the server communication interface 31.

Next, the server transmitting unit 332 of the server device 3 extracts information relating to all or part of distribution images stored in the server storage device 32, and extracts selection images associated with information relating to the extracted distribution images. The server transmitting unit 332 transmits the information related to the extracted distribution images and the selection images to the terminal device 2 of the user A via the server communication interface 31. Next, the receiving unit 273 of the terminal device 2 of the user A receives information relating to one or a plurality of distribution images, and selection images, via the terminal communication interface 21. The display processing unit 274 of the terminal device 2 of the user A then performs display output of the selection screen 900 including the received selection images on the display device 23. Note that information relating to the corresponding distribution images is associated with the selection images included in the selection screen 900. Thus, display processing of the selection screen 900 ends.

Upon one of a plurality of selection screens 901, 902, 903, and 904 being selected by the user A operating the input device 24, the input device 24 inputs a watching start instruction to the terminal processing device 27. The input device 24 inputs information relating to the distribution image associated with the selected selection image, along with the watching start instruction, to the terminal processing device 27. The display processing unit 274 of the terminal device 2 of the user A displays a confirmation screen 910 overlaid on the selection screen 900, on the basis of the selection image associated with the information related to the distribution image input by the input device 24.

Figure 9B:
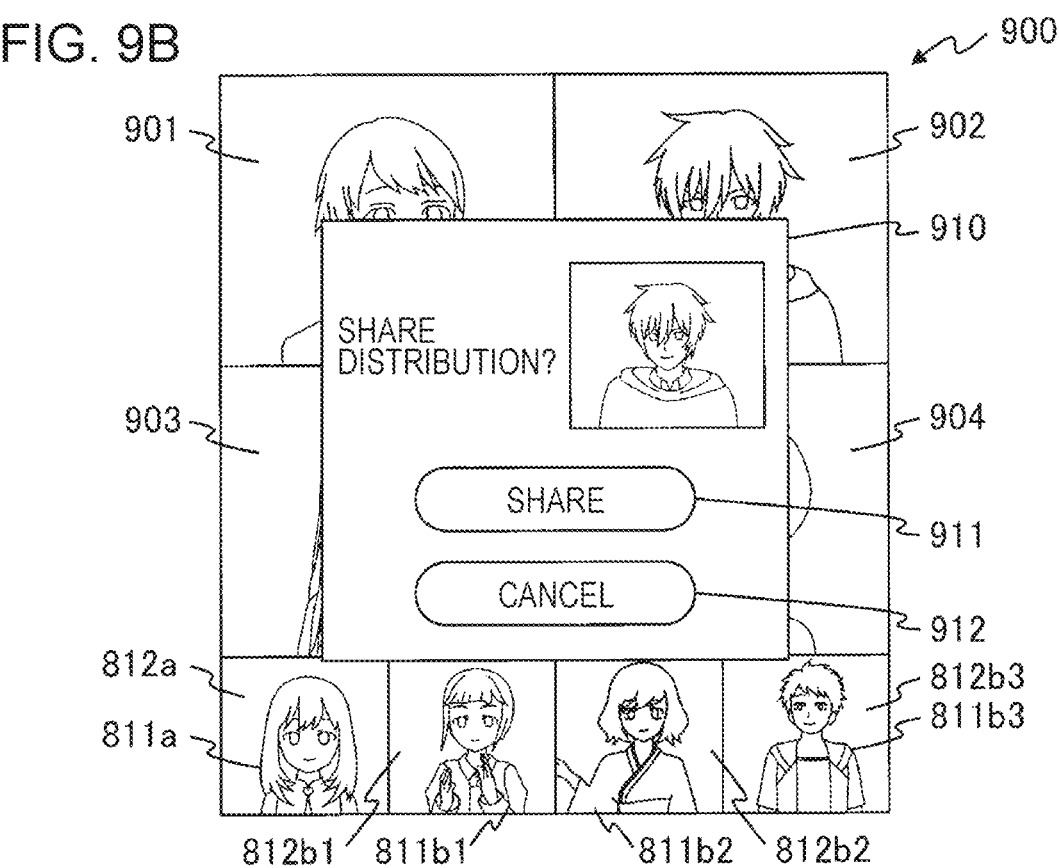

FIG. 9B is a diagram illustrating an example of the confirmation screen 910 displayed on the display device 23 of the terminal device 2. The confirmation screen 910 includes the selection image selected by the user A in the selection screen 900, a confirmation button 911, and a cancel button 912. The confirmation button 911 is an object image such as a button object or the like for instructing execution of transmission of a watching start instruction. The cancel button 912 is an object image such as a button object or the like, for ending display of the confirmation screen 910.

Upon the confirmation button 911 being selected by the user A operating the input device 24, the transmitting unit 272 of the terminal device 2 of the user A transmits information indicating the watching start instruction and information relating to the distribution image, input in accordance with operation of the selection screen 900, and the user ID of the user A stored in the terminal storage device 22 and the transmission destination information, to the server device 3 via the terminal communication interface 21.

Next, the server receiving unit 331 of the server device 3 receives information indicating the watching start instruction, the information relating to the distribution image, the user ID of the user A, and the transmission destination information, via the server communication interface 31. Next, the server receiving unit 331 determines whether or not the information relating to the distribution image that is received is information relating to a distribution image that is being distributed.

In a case in which the information relating to the distribution image that is received is information relating to a distribution image that is being distributed, the server receiving unit 331 stores the user ID of the user A that is received in the server storage device 32 in a manner associated with information related to the received distribution image. In the same way, the server receiving unit 331 stores the user IDs of the users B1 to B3 in the server storage device 32, in a manner associated with information relating to the distribution image that is received, on the basis of the received transmission destination information. For example, in a case in which the respective user IDs of the users B1 to B3 are included in the transmission destination information, the server receiving unit 331 extracts the respective user IDs of the users B1 to B3 from the transmission destination information, and stores the extracted user IDs, in a manner associated with information related to the distribution image. In a case in which a group ID for identifying the communication group that the user A belongs to is included in the transmission destination information, the server receiving unit 331 references the group table T3 and so forth stored in the server storage device 32, extracts the user IDs of the users B1 to B3 associated with the group ID, and stores the user IDs of the users B1 to B3 that are extracted in a manner associated with the distribution image. Accordingly, the user A and the users B1 to B3 participating in the communication service are registered as watching users of the distribution image of the distributing user selected by the user A. Henceforth, the user A, the user B1, the user B2, and the user B3, which are participating in the communication service, can watch the distribution image of the distributing user selected by the user A.

The server receiving unit 331 of the server device 3 transmits the names of the user A and the users B1 to B3 newly registered as watching users, or the name of the communication group that the user A and the users B1 to B3 belong to, to the terminal device 2 of the distributing user. The terminal device 2 of the distributing user may display the names of the users or the name of the communication group that has been received, and display information to the effect that watching users have been newly registered. Note that in a case in which the tables T1 to T3 are stored in the terminal storage device 22, the server receiving unit 331 may transmit each of the user IDs of the user A and the users B1 to B3 newly registered as watching users thereto. In this case, the terminal device 2 of the distributing user references the user table T1 or the group table T3 stored in the terminal device 2 of the distributing user, and extracts and displays the names of the users corresponding to the user IDs that are received, or the name of the communication group.

Figure 10A:
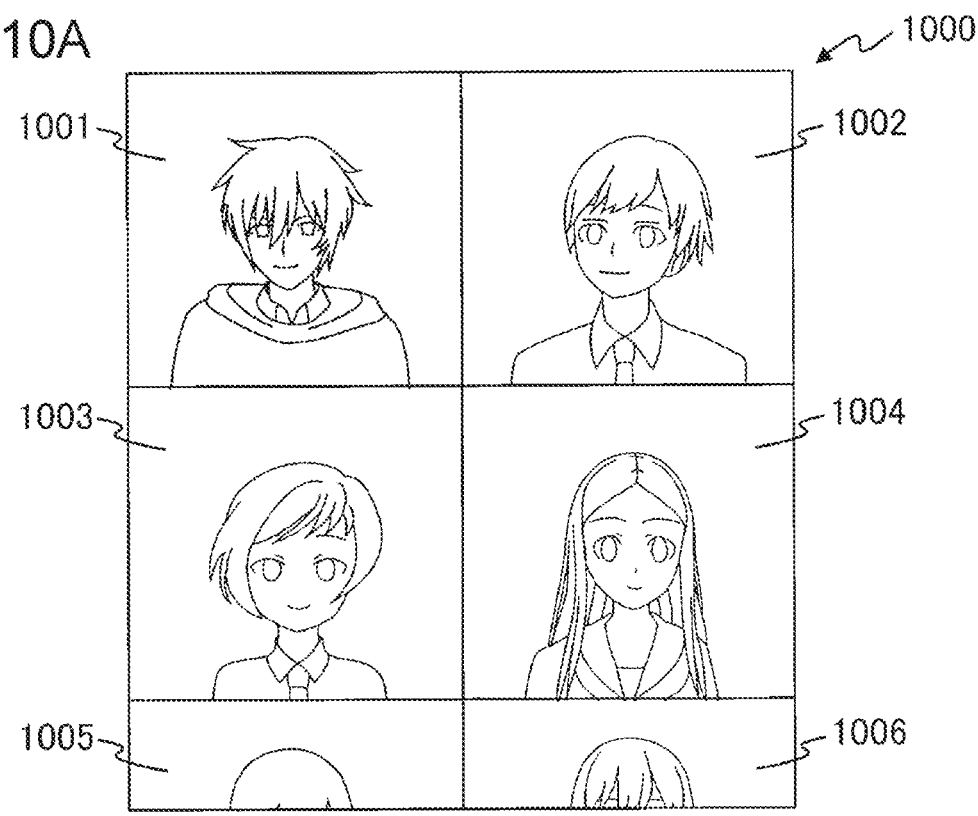
FIGS. 10A and 10B illustrate examples of screens displayed on the display device of the terminal device.

FIG. 10A is a diagram illustrating another example of the selection screen 1000 displayed on the display device 23 of the terminal device 2. Unlike the selection screen 900, the selection screen 1000 does not include the user output images 812a, 812b1, 812b2, and 812b3, including respective character objects 811a, 811b1, 811b2, and 811b3. The selection screen 1000 includes selection images 1001, 1002, 1003, 1004, 1005, and 1006. The selection images 1001, 1002, 1003, 1004, 1005, and 1006 are each images for selecting a distribution image to watch, in the same way as the selection images 901, 902, 903, and 904. Note that in a case in which the selection screen 1000 illustrated in FIG. 10A is displayed on the display device 23 of the terminal device 2 of the user A, speech data of the users B1 to B3 may be output on the basis of output information of each of the users B1 to B3 received every predetermined time interval. Accordingly, even in a case in which the selection screen 1000 illustrated in FIG. 10A is displayed, communication by speech can be continued among the user A and the users B1 to B3, in the same way as in a case in which the selection screen 900 illustrated in FIG. 9A is displayed. Also, a switching object may be included each of the selection screens 900 and 1000. For example, upon the switching object within the selection screen 900 being selected in accordance with the user A operating the input device 24, the display processing unit 274 of the terminal device 2 of the user A ends display of the selection screen 900, and displays the selection screen 1000. Also, upon the switching object within the selection screen 1000 being selected in accordance with the user A operating the input device 24, the display processing unit 274 of the terminal device 2 of the user A ends display of the selection screen 1000, and displays the selection screen 900. Thus, the user can switch between the selection screens 900 and 1000 in accordance the preference of the user of the terminal device 2 on which the selection screens 900 and 1000 are displayed.

Figure 10B:
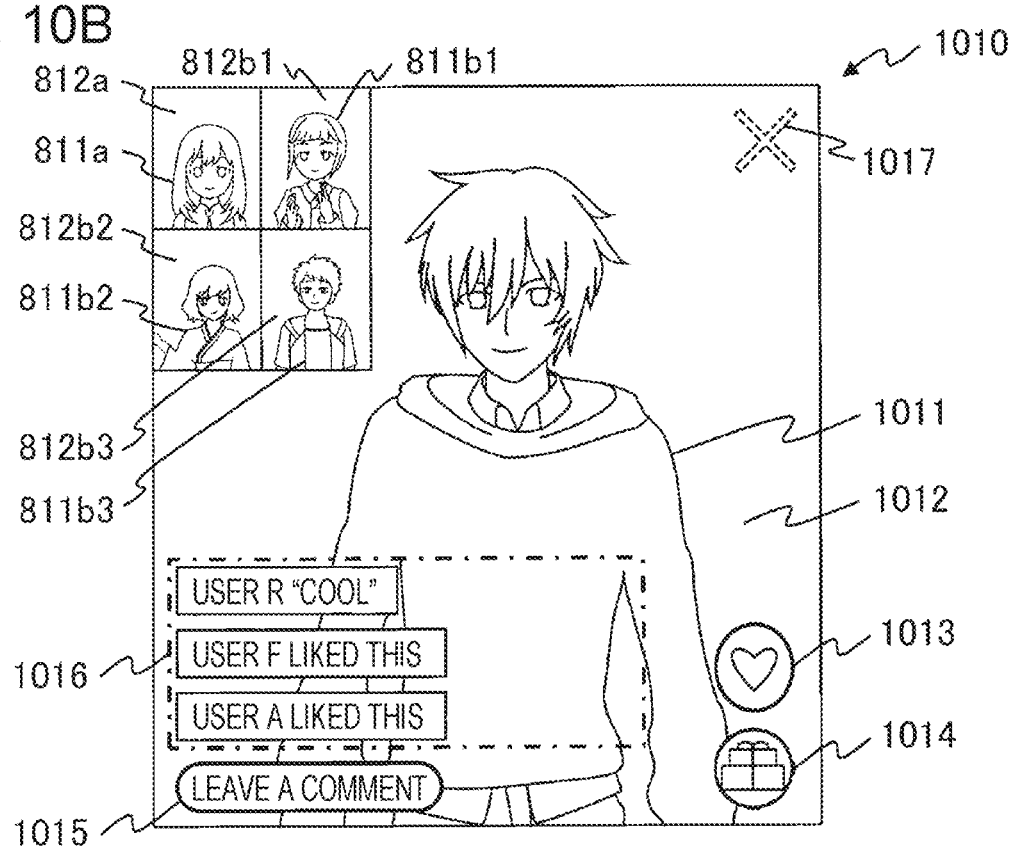

FIG. 10B is a diagram illustrating an example of a distribution screen 1010 display on the display device 23 of the terminal device 2. The distribution screen 1010 includes a distribution image 1012 including a character object 1011, an evaluation button 1013, an addition button 1014, a comment button 1015, a response information display region 1016, and an end-watching button 1017. Also, the distribution screen 1010 includes the user output images 812a, 812b1, 812b2, and 812b3, including respective character objects 811a, 811b1, 811b2, and 811b3.

The character object 1011 is an animation (moving image) of a character object of the distributing user that is generated by the display processing unit 274, on the basis of motion data included in output information of the distributing user that is received by the receiving unit 273, and the character object associated with the user ID of the distributing user in the user table T1. An example of display processing of the distribution image 1012 including the character object 1011 will be described below.

The server device 3 has the user ID of the user A and the user IDs of the users B1 to B3 stored in an associated manner with the distributing user ID associated with the selection image selected by the user A in the selection screen 900 or the selection screen 1000, in accordance with a watching start instruction by the user A. The server transmitting unit 332 of the server device 3 transmits output information of the distributing user of the distributing user ID associated with the user ID of the user A and the user IDs of the users B1 to B3 to the respective terminal devices 2 of the user A and the users B1 to B3, via the server communication interface 31. The receiving units 273 of the respective terminal devices 2 of the user A and the users B1 to B3 receive the output information of the distributing user that is transmitted from the server device 3, via the terminal communication interface 21.

In a case in which face motion data of the distributing user is included in the motion data of the distributing user included in the output information received by the receiving unit 273, the distribution image 1012 including the character object 1011 of which the expressions change synchronously with the movement of expressions of the distributing user is displayed. For example, in a case in which the distributing user utters speech, the distribution image 1012 including the character object 1011 of which the lips are in movement is displayed. Also, in a case in which body motion data of the distributing user is included in the motion data of the distributing user included in the output information received by the receiving unit 273, the distribution image 1012 including the character object 1011 of which the corresponding parts are in action synchronously with the body movement of the distributing user is displayed. In a case in which speech data of the distributing user is included in the output information of the distributing user received by the receiving unit 273, the distribution image 1012 is displayed by the display processing unit 274, and also speech output of the speech of the distributing user generated by the audio output unit 275 on the basis of the speech data is performed. Thus, the user A can listen to the speech of the distributing user while viewing the character object 1011 of the distributing user making movements as if uttering speech. This ends the display processing of the distribution image 1012. The display processing of the distribution image 1012 is executed each time output information of the distributing user is received a predetermined time intervals (e.g., every two seconds).

The evaluation button 1013 is an object image for instructing transmission of evaluation data relating to the character object 1011 included in the distribution image 1012 or evaluation data relating to the distributing user of the character object 1011. Upon the evaluation button 1013 being selected in accordance with the user A operating the input device 24, the transmitting unit 272 of the terminal device 2 creates evaluation data indicating that "a positive evaluation of the character object 1011 included in the distribution image 1012" has been made or evaluation information indicating that "a positive evaluation of the distributing user of the character object 1011 included in the distribution image 1012" has been made. Evaluation information is a type of response information. Details of display and transmission processing of evaluation information (response information) will be described later.

Note that the evaluation button 1013 may create evaluation data indicating that "a negative evaluation of the character object 1011 included in the distribution image 1012" has been made or evaluation information indicating that "a negative evaluation of the distributing user of the character object 1011 included in the distribution image 1012" has been made. Also, the distribution screen 1010 may include a plurality of types of evaluation buttons 1013 (e.g., two types of buttons, which are an evaluation button for creating positive evaluation information and an evaluation button for creating negative evaluation information).

The addition button 1014 is an object image for instructing display of a selection screen 1100 for selecting an additional object to include in the distribution screen 1010. Upon the addition button 1014 being selected in accordance with the user A operating the input device 24, the selection screen 1100 is displayed. Details of the selection screen 1100 will be described later.

The comment button 1015 is an object image for instructing display of a comment input window to input a comment (text string) to be displayed in the distribution screen 1010. Upon the comment button 1015 being selected in accordance with the user A operating the input device 24, the comment input window is displayed overlaid on the distribution screen 1010. The comment input window is only displayed on the display device 23 of the terminal device 2 of the user that has selected the comment button 1015, and the comment input window and the text string being input to the comment input window are not displayed on the display devices 23 of the other terminal devices 2. For example, the display processing unit 274 creates comment information representing the comment (text string) input to the comment input window in accordance with the user A operating the input device 24.

Comment information is a type of response information. Details of display and transmission processing of comment information (response information) will be described later.

The response information display region 1016 includes response information created in accordance with operations performed by the user A (comment data, evaluation data, and/or information relating to additional objects (which will be described later)), and response information transmitted from each terminal device 2 displaying the distribution screen 1010 (the terminal device 2 of each user watching the distribution image 1012 of the same distributing user).

The example of the response information display region 1016 illustrated in FIG. 10B shows that comment information representing a comment (text string) of "cool" has been transmitted from the terminal device 2 of a watching user of a name "user R". Also illustrated is that evaluation information has been transmitted from the terminal device 2 of a watching user of a name "user F". Further illustrated is that evaluation information created by the terminal device 2 of the user A operating this terminal device 2 has been transmitted.

Each time response information is created, the display processing unit 274 of the terminal device 2 displaying the distribution screen 1010 displays the created response information and the names of the users arrayed in time sequence in the response information display region 1016. Also, each time response information is created, the transmitting unit 272 of each terminal device 2 displaying the distribution screen 1010 transmits a display request for response information, along with the created response information and the user ID stored in the terminal storage device 22 of the terminal device 2, to the server device 3 via the terminal communication interface 21. The server receiving unit 331 of the server device 3 receives the display request for response information transmitted from the terminal device 2 displaying the distribution screen 1010, along with the response information and the user ID. In a case in which the received user ID is a watching user ID, the server transmitting unit 332 of the server device 3 extracts the distributing user ID stored in association with the received user ID from the server storage device 32. The server transmitting unit 332 extracts, out of the watching user IDs associated with the extracted distributing user ID, watching user IDs other than the received user ID. The server transmitting unit 332 then transmits the received response information and the user ID to the terminal device 2 of the distributing user indicated by the extracted distributing user ID and the terminal devices 2 of the watching users indicated by the watching user IDs that are extracted. The receiving units 273 of the terminal devices 2 displaying the distribution screen 1010 receive the response information and the user ID transmitted from the server device 3, via the terminal communication interfaces 21. The display processing units 274 of the terminal devices 2 displaying the distribution screen 1010 display the distribution screen 1010 including the response information and the names of users arrayed in time sequence therein, in the response information display region 1016, on the basis of the response information that is received, and the names associated with the received user IDs (user table T1).

An upper limit may be set for the count of pieces of response information displayable in the response information display region 1016. In the example of the response information display region 1016 illustrated in FIG. 10B, the upper limit count of response information that can be displayed is "three". In a case in which the count of pieces of response information displayed at the terminal devices 2 exceeds the upper limit count that is set, the display processing unit 274 of each terminal device 2 displays the distribution screen 1010 with the newly-received three pieces of response information included in the response information display region 1016 in sequence.

Note that the response information within the response information display region 1016 may be displayed so as to be scrollable. In this case, response information currently not included in the response information display region 1016 is displayed by scrolling within the response information display region 1016, in accordance with a swipe operation (e.g., an operation of a finger in contact with the screen moving upward from the bottom of the screen) performed by the user.

The end-watching button 1017 is an object image such as a button object or the like, for ending display of the distribution screen 1010, and ending watching of the distribution image 1012. Upon the end-watching button 1017 being selected by the user A operating the input device 24, the display processing unit 274 ends display of the distribution screen 1010, and displays the communication screen 810 (FIG. 8B) again. The transmitting unit 272 of the terminal device 2 transmits information relating to a watching end instruction along with the user ID stored in the terminal storage device 22 and the transmission destination information, to the server device 3 via the terminal communication interface 21. Upon receiving the information relating to the watching end instruction and the user ID transmitted from the terminal device 2 of the user, the server receiving unit 331 of the server device 3 deletes the received user ID that is stored in the server storage device 32 as a watching user ID. Thus, watching of the distribution image by the user that has selected the end-watching button 1017 ends. Also, the server transmitting unit 332 may transmit information relating to the watching end instruction to the terminal devices 2 of the users B1 to B3 indicated by the user IDs included in the transmission destination information. In this case, upon the terminal devices 2 of the users B1 to B3 receiving the watching end instruction, display of the distribution screen 1010 ends, and the communication screen 810 (FIG. 8B) is displayed again.

The distribution screen 1010 includes the user output images 812a, 812b1, 812b2, and 812b3, including the respective character objects 811a, 811b1, 811b2, and 811b3. The user output images 812a, 812b1, 812b2, and 812b3 included in the distribution screen 1010 are the user output images 812a, 812b1, 812b2, and 812b3 included in the communication screen 810 with the display thereof altered. Alteration of display includes at least one of, for example, alteration of display form, alteration of display content, and alteration of display method.

Alternation in display form includes, for example, at least one of alteration of display size of the user output images 812a, 812b1, 812b2, and 812b3, alteration of the display position of the user output images 812a, 812b1, 812b2, and 812b3, alteration of at least one of the brightness, brilliance, and chromaticity of the user output images 812a, 812b1, 812b2, and 812b3, alteration of the transmissivity of the user output images 812a, 812b1, 812b2, and 812b3, alteration of the shape of the display frames of the user output images 812a, 812b1, 812b2, and 812b3 (e.g., altering from a rectangular shape to a rounded shape), setting whether or not a display frame is provided for the user output images 812a, 812b1, 812b2, and 812b3, blinking display of the user output images 812a, 812b1, 812b2, and 812b3, automatically moving the user output images 812a, 812b1, 812b2, and 812b3, in display, and so forth. For example, the user output images 812a, 812b1, 812b2, and 812b3, included in the distribution screen 1010 illustrated in FIG. 10B are the user output images 812a, 812b1, 812b2, and 812b3 included in the communication screen 810 that have been reduced in size and the display position altered.

Alteration of display content is at least one of, for example, alteration of the character objects 811a, 811b1, 811b2, and 811b3 (included in the user output images 812a, 812b1, 812b2, and 812b3) to still images, alteration of the character objects 811a, 811b1, 811b2, and 811b3 to deformed images, altering the character objects 811a, 811b1, 811b2, and 811b3 to the names of the corresponding users, and so forth. Note that the still images may be profile images of the users, icon images, or the like. The speech data of the users B1 to B3 may be output on the basis of output information of the users B1 to B3 received every predetermined time interval, even when the images in the user output images 812a, 812b1, 812b2, and 812b3 is still images and user names. Thus, communication among the user A and the users B1 to B3 by speech can be continued, while reducing the processing load of the terminal devices 2 by not using motion data.

Alteration of the display method is, for example, displaying the user output images 812a, 812b1, 812b2, and 812b3 in a case in which predetermined display conditions are satisfied. Also, alteration of the display method is, for example, ending display of the user output images 812a, 812b1, 812b2, and 812b3 in a case in which predetermined display conditions are satisfied. Examples of alteration of the display method include displaying the user output image 812 corresponding to speech data being output only while the speech data of the user is being output, displaying the user output images 812a, 812b1, 812b2, and 812b3 for a predetermined amount of time (e.g., 10 seconds) after detecting a predetermined operation (e.g., a swipe operation a flick operation, etc.) by the user of the terminal device 2, displaying the user output images 812a, 812b1, 812b2, and 812b3 after a predetermined amount of time (e.g., 10 seconds) elapsing after detecting an operation by the user of the terminal device 2 (in this case, the display of the user output images 812a, 812b1, 812b2, and 812b3 ends upon detection of some sort of operation by the user of the terminal device 2), or the like. Also, alteration of the display method may be, for example, displaying part of the distribution screen 1010. For example, alteration of the display method may be ending display of the user output images 812b1, 812b2, and 812b3 of the users B1 to B3 other than the user A operating the terminal device 2. Also, alteration of the display method may be reducing the display size of the distribution image 1012, and in this case, a display method may be used in which the user output images 812a, 812b1, 812b2, and 812b3 do not overlay the distribution image 1012. Also, alteration of the display method is displaying the user output images 812a, 812b1, 812b2, and 812b3 without displaying the distribution image 1012. Also, alteration of the display method is displaying the addition button 1014, the comment button 1015, and the response information display region 1016, without displaying the distribution image 1012 and the user output images 812a, 812b1, 812b2, and 812b3.

Note that at least two types of display forms out of the above-described various types of display forms may be controlled to be switched in accordance with operations of the user A with respect to a switching object or the like. In this case, information relating to a switching instruction may be transmitted to each of the terminal devices 2 of the users B1 to B3, via the server device 3, in accordance with a switching instruction performed by the user A. In the respective terminal devices 2 of the user B1 to B3 receiving information relating to the switching instruction, information relating to the switching instruction is referenced, and the user output images 812*a*, 812*b*1, 812*b*2, and 812*b*3 are displayed in the same display form as the display form at the terminal device 2 of the user A. Note that this switching operation is not limited to operation by the user A (the user that performed the watching start instruction), and the display form of the user output images 812*a*, 812*b*1, 812*b*2, and 812*b*3 may be switched by user operations performed by one of the users B1 to B3. In a case in which information relating to the switching instruction is not transmitted to the respective terminal devices 2 of the users B1 to B3, the individual users can optionally switch the display form of the user output images 812*a*, 812*b*1, 812*b*2, and 812*b*3 at the individual terminal devices 2. Also, the display form of the user output images 812*a*, 812*b*1, 812*b*2, and 812*b*3 including each of the above-described character objects 811*a*, 811*b*1, 811*b*2, and 811*b*3 is not limited to the distribution screen 1010, and application may be made to user output images 812*a*, 812*b*1, 812*b*2, and 812*b*3 in another screen. Also, a screen may be displayed in which at least one display form of the above-described various types of display forms is selected by the user at an optional timing before display of the distribution screen 1010. In a case in which at least one display form is selected by the user, the distribution screen 1010 is displayed in accordance with the display form selected by the user.

In the distribution screen 1010 displayed in FIG. 10B as well, the user output image 812*a* including the character object 811*a* of which corresponding parts act synchronously with facial expressions and body movements of the user A is displayed, and the user output images 812*b* (812*b*1 to 812*b*3) including the character objects 811*b* (811*b*1 to 811*b*3) of which corresponding parts act synchronously with facial expressions and body movements of the users B (users B1 to B3) are displayed. Also, speech data of the users B (users B1 to B3) is output during display of the distribution screen 1010 as well. Accordingly, the user A can listen to the speech of the users B (users B1 to B3) while viewing the character objects 811*b* (811*b*1 to 811*b*3) of the users B (users B1 to B3) that appear to be uttering speech in the distribution screen 1010. Thus, the user A can hear the speech of the distributing user and the speech of the users B (users B1 to B3). Note that the output information of the user A and the users B (users B1 to B3) is limited to exchange withing the communication group, and accordingly is not transmitted to the terminal devices 2 of other watching users and the distributing user. Note that user output images 812*a*, 812*b*1, 812*b*2, and 812*b*3 do not have to be included in the distribution screen 1010. In this case as well, the speech data of the users B (users B1 to B3) may be output.

Note that instead of the user output images 812*a*, 812*b*1, 812*b*2, and 812*b*3, a single output image including the character object 811*a* and the character objects 811*b* (811*b*1 to 811*b*3) may be included in the distribution screen 1010. Also, a switching button may be included in the distribution screen 1010. For example, upon the switching object being selected in accordance with the user A operating the input device 24, the input device 24 inputs a switching instruction to the terminal processing device 27. The display processing unit 274 ends the display of the distribution screen 1010, and displays the communication screen 810 (FIG. 8B) again. The transmitting unit 272 of the terminal device 2 then transmits information relating to the switching instruction, along with the user ID stored in the terminal storage device 22 and the transmission destination information, to the server device 3 via the terminal communication interface 21. Upon the server receiving unit 331 of the server device 3 receiving the information relating to the switching instruction, the user ID, and the transmission destination information transmitted from the terminal device 2 of the user, the server transmitting unit 332 transmits the information relating to the switching instruction to the terminal devices 2 of the users B1 to B3 indicated by the user IDs included in the transmission destination information. Accordingly, upon the switching instruction being received, display of the distribution screen 1010 ends, and display of the communication screen 810 (FIG. 8B) is performed again, at the terminal devices 2 of the users B1 to B3 as well. The switching button may also be included in the communication screen 810 that is displayed again in accordance with the switching instruction. For example, upon the switching object being selected in accordance with the user A operating the input device 24, the input device 24 inputs the switching instruction to the terminal processing device 27. The display processing unit 274 ends the display of the communication screen 810, and displays the distribution screen 1010 again. The transmitting unit 272 of the terminal device 2 then transmits information relating to the switching instruction, along with the user ID stored in the terminal storage device 22 and the transmission destination information, to the server device 3 via the terminal communication interface 21.

Upon the server receiving unit 331 of the server device 3 receiving the information relating to the switching instruction, the user ID, and the transmission destination information, which are transmitted from the terminal device 2 of the user, the server transmitting unit 332 transmits the information relating to the switching instruction to the terminal devices 2 of the users B1 to B3 indicated by the user IDs included in the transmission destination information. Accordingly, upon the switching instruction being received at the terminal devices 2 of the users B1 to B3, display of the communication screen 810 is ended, and the distribution screen 1010 is displayed again. Note that this switching instruction is not limited to a switching instruction by the user A (user that performed the watching start instruction), and processing corresponding to the above-described switching instruction may be executed by a user switching instruction performed by one of the users B1 to B3. Also, information relating to the switching instruction does not have to be transmitted to the terminal devices 2 of other users via the server device 3. Accordingly, the users can individually and optionally perform switching between the distribution screen 1010 and the communication screen 810 at their individual terminal devices 2. Also, while the communication screen 810 is being displayed again in accordance with the switching instruction, speech data of the distributing user may be output on the basis of output information of the distributing user received at predetermined time intervals. In this way, by switching functions being realized between the distribution screen 1010 and the communication screen 810 at the terminal devices 2 even when the display of a terminal device 2 is not a large display that can display a plurality of screens, an appropriate display form can be realized in accordance with the display content and situation of video chat at that time by enabling the display form of the screen to be switched even while watching a distribution image while displaying a communication screen.

Figure 11A:
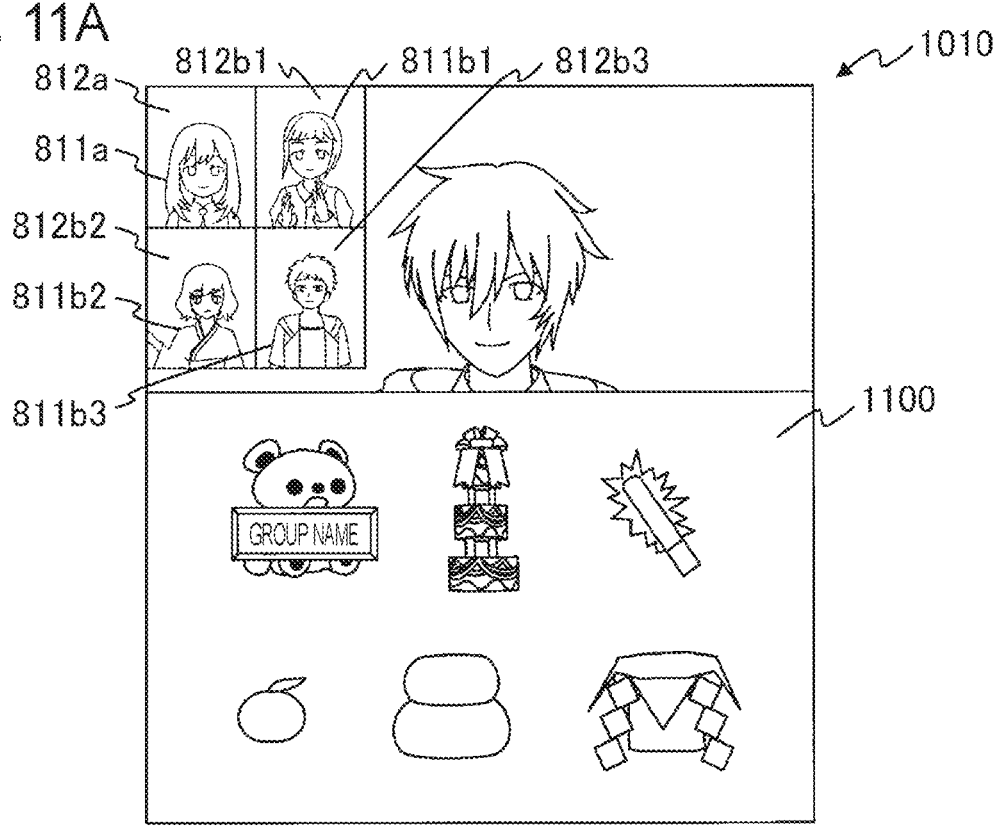
FIGS. 11A and 11B illustrate examples of screens displayed on the display device of the terminal device.

FIG. 11A is a diagram illustrating an example of the selection screen 1100 displayed on the display device 23. As illustrated in FIG. 11A, the selection screen 1100 is displayed overlaid on the distribution screen 1010. The selection screen 1100 may be displayed after display of the distribution screen 1010 has ended.

In the example illustrated in FIG. 11A, images representing six types of addition candidate objects are included in the display region of the selection screen 1100. Names representing the addition candidate objects may be placed near the images representing the addition candidate objects. The count of addition candidate objects included in the display region of the selection screen 1100 is not limited to six. In a case in which part of the images representing the plurality of addition candidate objects cannot be contained in the display region of the selection screen 1100, the display processing unit 274 of the terminal device 2 may display the image representing the addition candidate objects in a scrollable manner. In this case, images representing the addition candidate objects not currently included in the display region of the selection screen 1100 are scrolled and displayed in the display region of the selection screen 1100 in accordance with a swipe operation (e.g., an operation of a finger in contact with the screen moving leftward from the right of the screen) performed by the user A.

Each of the addition candidate objects represents an additional object. Images representing the addition candidate objects are, for example, icon images, thumbnail images, and so forth, representing gift objects that are a type of additional objects. Note that in the selection screen 1100, the images of the addition candidate objects may be display classified into types of additional objects (free gifts, paid gifts, accessories, cheering gifts, appeal, variety, cooperation gifts that require cooperation of included users of the group, and so forth). Note that additional objects belonging to paid gifts are additional objects that can be purchased by the user spending "coins" that is a virtual currency value. Additional objects belonging to free gifts are additional objects that can be obtained by spending points that can be acquired by viewing distributions, and so forth, instead of spending currency value. Note that additional objects may be objects that are held by the user A playing a predetermined mission executed at the terminal device 2 and clearing this predetermined mission.

Upon an addition candidate object being selected in accordance with the user A operating the input device 24, the input device 24 inputs an addition instruction, along with an object ID corresponding to the addition candidate object that is selected, to the terminal processing device 27. Hereinafter, an example of addition processing corresponding to the addition instruction will be described.

First, upon acquiring the input addition instruction and the object ID, the display processing unit 274 references the object table T2 and extracts a still image or moving image (image information) of the additional object associated with the acquired object ID from the terminal storage device 22. Next, the display processing unit 274 generates a new distribution image 1012 including the extracted still image or moving image in the distribution image 1012 including the character object 1011 of the distributing user. Also, the display processing unit 274 references the object table T2 and creates additional object information using the name associated with the object ID that is acquired. The additional object information is a type of response information, and is information to the effect that the user A has sent the additional object to the distributing user, for example.

Next, upon acquiring the addition instruction and object ID that are input, the transmitting unit 272 transmits information indicating the addition instruction, along with the object ID that is acquired and the user ID of the user A stored in the terminal storage device 22, to the server device 3 via the terminal communication interface 21. Next, the server receiving unit 331 of the server device 3 receives the information indicating the addition instruction, the object ID, and the user ID of the user A, via the server communication interface 31. Next, in a case in which the received user ID is a watching user ID, the server transmitting unit 332 of the server device 3 extracts the distributing user ID stored in association with the received user ID from the server storage device 32. The server transmitting unit 332 extracts, out of the watching user IDs associated with the distributing user ID that is extracted, the watching user IDs other than the user ID that is received. The server transmitting unit 332 then transmits the information indicating the addition instruction, the object ID, and the user ID of the user A, which have been received, to the terminal devices 2 of the users indicated by the watching user IDs that are extracted, via the server communication interface 31. The server transmitting unit 332 also transmits the information indicating the addition instruction, the object ID, and the user ID of the user A, which are received, to the terminal device 2 of the distributing user indicated by the distributing user ID that is extracted, via the server communication interface 31.

The receiving units 273 of the terminal devices 2 of the watching users (excluding the user A) and the distributing user receive the information indicating the addition instruction, the user ID of the user A, and the object ID, via the terminal communication interfaces 21. Next, the display processing units 274 of the terminal devices 2 reference the object table T2 and extract a still image or moving image (image information) of the additional object associated with the object ID that is received, from the terminal storage devices 22. The display processing units 274 then generates a new distribution image 1012 including the still image or moving image that is extracted, in the distribution image 1012 including the character object 1011 of the distributing user. Thus, the addition processing ends.

Figure 11B:
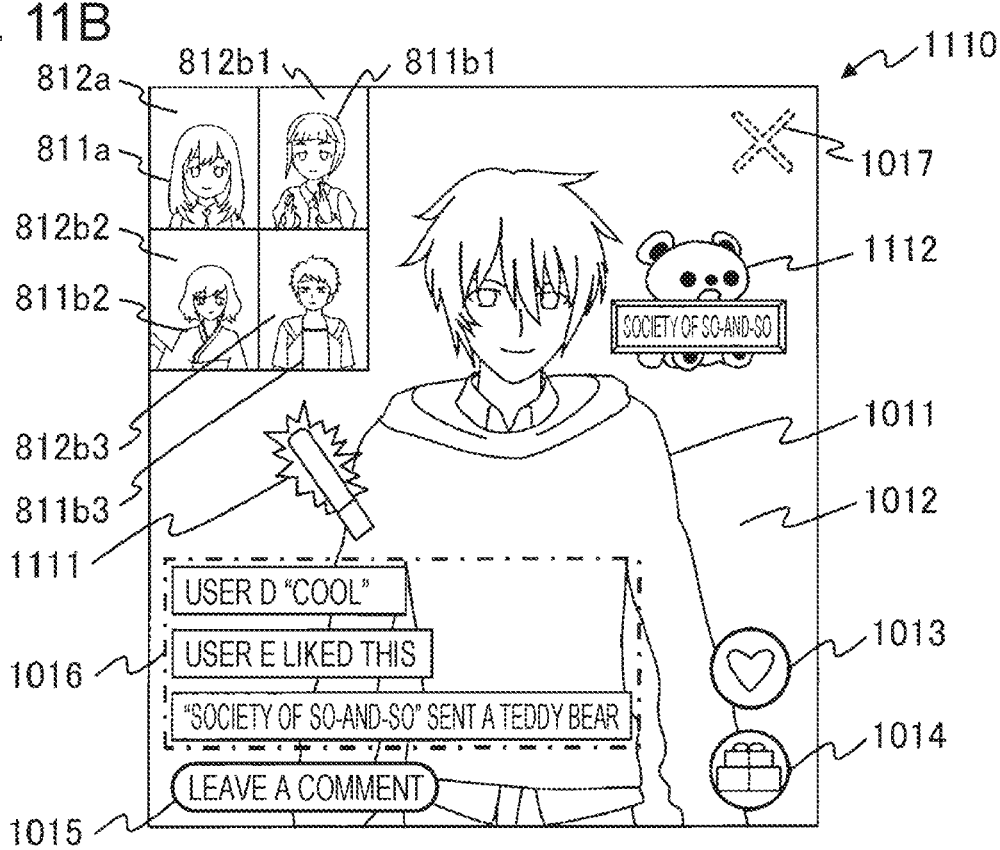

FIG. 11B is a diagram illustrating another example of a distribution screen 1110 displayed on the display device 23 of the terminal device 2. The distribution screen 1110 includes, in the same way as the distribution screen 1010, the distribution image 1012 including the character object 1011, the evaluation button 1013, the addition button 1014, the comment button 1015, the response information display region 1016, and the end-watching button 1017. Also, the distribution screen 1110 includes, in the same way as the distribution screen 1010, the user output images 812*a*, 812*b*1, 812*b*2, and 812*b*3, including the respective character objects 811*a*, 811*b*1, 811*b*2, and 811*b*3.

Unlike the distribution screen 1010, the distribution screen 1110 includes an additional object 1111 and an additional object 1112. Both the additional object 1111 and the additional object 1112 are still images or moving images representing additional objects. The additional object 1112 includes, along with a still image or moving image representing the additional object 1112, various types of information relating to the user that has performed addition instruction of the additional object 1112. An example of display processing of the additional object 1112 will be described below, by way of an example of a case in which the user that performed the addition instruction of the additional object 1112 is the user A.

Upon the addition candidate object (corresponding to the additional object 1112) being selected in accordance with the user A operating the input device 24, the input device 24 inputs an addition instruction, along with the object ID corresponding to the selected addition candidate object, to the terminal processing device 27. Upon acquiring the addition instruction and the object ID that are input, the display processing unit 274 references the object table T2, extracts the still image or moving image (image information) of the additional object associated with the acquired object ID from the terminal storage device 22, further references the group table T3, and extracts the name of the group associated with the user ID of the user A stored in the terminal storage device 22. The display processing unit 274 then generates a new distribution image 1012 in which the additional object 1112, made up of the extracted still image or moving image and the name of the group, is included in the distribution image 1012 including the character object 1011 of the distributing user.

The transmitting unit 272 of the terminal device 2 of the user A transmits the information indicating the addition instruction relating to the additional object 1112, the object ID that is acquired, and the user ID of the user A stored in the terminal storage devices 22 to the terminal devices 2 of the watching users (excluding the user A) and the distributing user, via the server device 3. Upon the information indicating the addition instruction relating to the additional object 1112, the user ID of the user A, and the object ID, being received by the receiving units 273 of the terminal devices 2 of the watching users (excluding the user A) and the distributing user, the display processing units 274 of the terminal devices 2 of the watching users (excluding the user A) and the distributing user reference the object table T2 and extract the still image or moving image (image information) of the additional object associated with the object ID that is received from the terminal storage device 22, and further reference the group table T3 and extract the name of the communication group associated with the user IDs that are received. The display processing units 274 of these terminal devices 2 then generate a new distribution image 1012 in which the additional object 1112, made up of the extracted still image or moving image and the name of the communication group, is included in the distribution image 1012 including the character object 1011 of the distributing user. The additional object 1112 is, for example, another object (object representing a sign or the like) on which a name is displayed, which is positioned near a predetermined additional object or overlaying a predetermined additional object. This ends the display processing of the additional object 1112. Note that various types of information relating to the user that has performed the addition instruction of the additional object 1112, displayed along with the still image or moving image representing the additional object 1112, are not limited to the name of the communication group to which the user that has performed the addition instruction belongs. The various types of information relating to the user that has performed the addition instruction may be the names of all users belonging to the communication group to which the user that has performed the addition instruction belongs. Also, the additional object 1112 may be a set of each character object of all users belonging to the communication group, to which the user that performed the addition instruction belongs. In this case, each character object may be controlled by the display processing unit 274 to automatically perform actions (waving, clapping, dancing, etc.) set in advance.

The shape, size, placement, color, brightness, and/or design of the additional object that is added to the distribution screen may change while being displayed in the distribution screen, when predetermined change conditions are satisfied. Note that the predetermined change conditions may be conditions related to a display request for the additional object. The predetermined change conditions may be that, for example, conditions relating to timing of an addition instruction performed by one of users belonging to the same communication group (e.g., user A, user B1, user B2, and user B3), and/or users belonging to the same communication group performing addition instructions for a plurality of particular types of additional objects that are different from each other, are satisfied. In this case, even if users belonging to another communication group (e.g., users other than user A, user B1, user B2, and user B3) perform addition instructions for a plurality of particular types of additional objects that are different from each other in a predetermined period, this does not satisfy the predetermined change conditions. Note that the predetermined change conditions may be that conditions relating to timing of addition instructions performed by one or all users watching the same distribution screen are satisfied, and/or performing addition instructions for a plurality of particular types of additional objects that are different from each other. Conditions relating to timing of addition instructions performed by a plurality of users being satisfied means that the difference in time between timings of addition instructions performed by a plurality of users is within a predetermined period. The users are imparted predetermined points by the server device 3 in accordance with the addition instructions performed by the users. In a case in which predetermined change conditions are satisfied, users performing the addition instructions satisfying the predetermined conditions may be imparted with more points than the predetermined points. The predetermined change conditions may be that conditions relating to timing of addition instructions performed by one of a plurality of users having a predetermined relation being satisfied, and/or a plurality of users having a predetermined relation performing addition instructions for a plurality of particular types of additional objects that are different from each other. In this case, users not having the predetermined relation performing satisfying conditions relating to timing of addition instructions does not satisfy the predetermined change conditions. The predetermined relation among a plurality of users is, for example, which one user of the plurality of users is a mutual follower with another user of the plurality of users. Note that in one user follows another user and the other user follows the first user (one user and another user are mutually following), the one user and the other user are mutual followers. Also, this may be that one user of the plurality of users is in a mutual following relation with a predetermined user that another user in the plurality of users is mutually following. Also, the predetermined relation among the plurality of users may be a friend relation with the user, or may be another user regarding which identifying information (telephone number, email address, predetermined ID or the like) is stored in the terminal device of the user. Also, the predetermined relation among the plurality of users may be that a count of times of the plurality of users participating in the same communication service and carrying out communication with each other is no less than a predetermined count, or the predetermined relation among the plurality of users may be that a count of times of the plurality of users participating in the same communication service and a different communication service are both no less than a predetermined count.

For example, in a case in which an addition instruction for an additional object 1201 representing a mikan fruit, an addition instruction for an additional object 1202 representing mochi, and an addition instruction for an additional object 1203 representing a stand, are performed by users belonging to the same communication group within a predetermined period (e.g., ten seconds), a distribution screen including an additional object 1211 representing decorative mochi may be displayed. For example, upon the addition instruction for the additional object 1202 and the addition instruction for the additional object 1203 being performed by the user B1 within ten seconds after the addition instruction for the additional object 1201 being performed by the user A, the predetermined change conditions are satisfied. Also, upon the addition instruction for the additional object 1201 and the addition instruction for the additional object 1203 being performed by the user B2 within ten seconds after the addition instruction for the additional object 1202 being performed by the user B2, the predetermined change conditions are satisfied. Also, upon the addition instruction for the additional object 1202 being performed by the user B1 and the addition instruction for the additional object 1201 is performed by the user A within ten seconds after the addition instruction for the additional object 1203 being performed by the user B3, the predetermined change conditions are satisfied. Also, upon the addition instruction for the additional object 1202 and the addition instruction for the additional object 1203 being performed by the user A within ten seconds after the addition instruction for the additional object 1201 being performed by the user A, the predetermined change conditions are satisfied. Note that determination processing regarding whether or not the predetermined change conditions are satisfied is executed by the server transmitting unit 332 of the server device 3 that receives the addition instructions transmitted by the terminal devices 2 of the users.

The display processing of the distribution screen including the additional object 1211 representing decorative mochi may include processing in which, following the display periods of display of the additional objects 1201, 1202, and 1203 elapsing, and display of the additional objects 1201, 1202, and 1203 ending, within the distribution screen, the distribution screen including the additional object 1211 representing decorative mochi is displayed. Alternatively, the display processing of the distribution screen including the additional object 1211 representing decorative mochi may include processing in which, at the point that addition instructions have been performed for all of the additional objects 1201, 1202, and 1203 (or a predetermined amount of time following all addition instructions being performed), display of the additional objects 1201, 1202, and 1203 is ended, the distribution screen including the additional object 1211 representing decorative mochi is displayed. Further, the display processing of the distribution screen including the additional object 1211 representing decorative mochi may include processing in which, at an optional timing during display of the additional objects 1201, 1202, and 1203, display of the additional objects 1201, 1202, and 1203 is ended, the distribution screen including the additional object 1211 representing decorative mochi is displayed.

Note that the plurality of particular types of additional objects that are different from each other may be, for example, additional objects that are of the same attribute as each other. Also, which the plurality of particular types of additional objects that are different from each other may be additional objects that are the same type as each other. Further, the plurality of particular types of additional objects that are different from each other may be additional objects that are each associated with the same identification information. Moreover, the plurality of particular types of additional objects that are different from each other may be a plurality of additional objects that are stored in a table or the like in advance, in a manner associated with each other. Note that conditions regarding display requests of additional objects include predetermined change conditions that users belonging to the same communication group perform addition instructions of a plurality of particular type of additional objects that are different from each other. Thus, in a case in which a plurality of additional objects that are of the same attribute as each other, a plurality of additional objects that are of the same type as each other, or a plurality of additional objects that are associated with the same ID as each other, are associated with each other in a table in advance, the conditions relating to the display requests of additional objects include the additional objects regarding which display requests are made satisfy predetermined change conditions, as described above. The conditions relating to the display requests of additional objects are not limited to the above-described example relating to predetermined change conditions, and may broadly include other conditions.

Note that a configuration may be made in which, instead of the additional objects 1201, 1202, and 1203 changing into the additional object 1211 representing decorative mochi, display control is performed such that, in accordance with an addition instruction for the additional object 1201 representing a mikan fruit, an addition instruction for the additional object 1202 representing mochi, and an addition instruction for the additional object 1203 representing a stand, the additional objects 1201, 1202, and 1203 are placed in predetermined relative positions, whereby the additional objects 1201, 1202, and 1203 integrally represent decorative mochi. The display control of being placed in predetermined relative positions is, for example, taking the additional object 1201 as a reference, automatically placing the additional object 1202 below the additional object 1201 by a first distance, and automatically placing the additional object 1203 below the additional object 1201 by a second distance (a distance longer than the first distance), and thus displaying the additional objects 1201, 1202, and 1203.

Figure 12A:
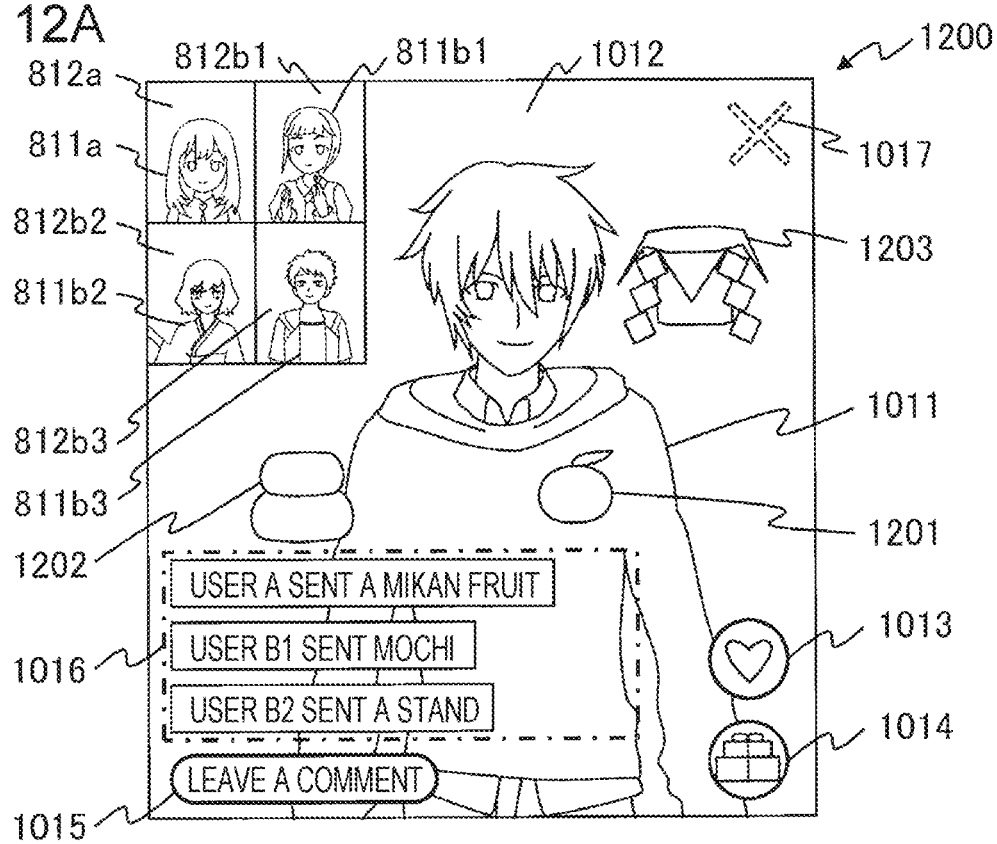
FIGS. 12A and 12B illustrate examples of screens displayed on the display device of the terminal device.
Figure 12B:
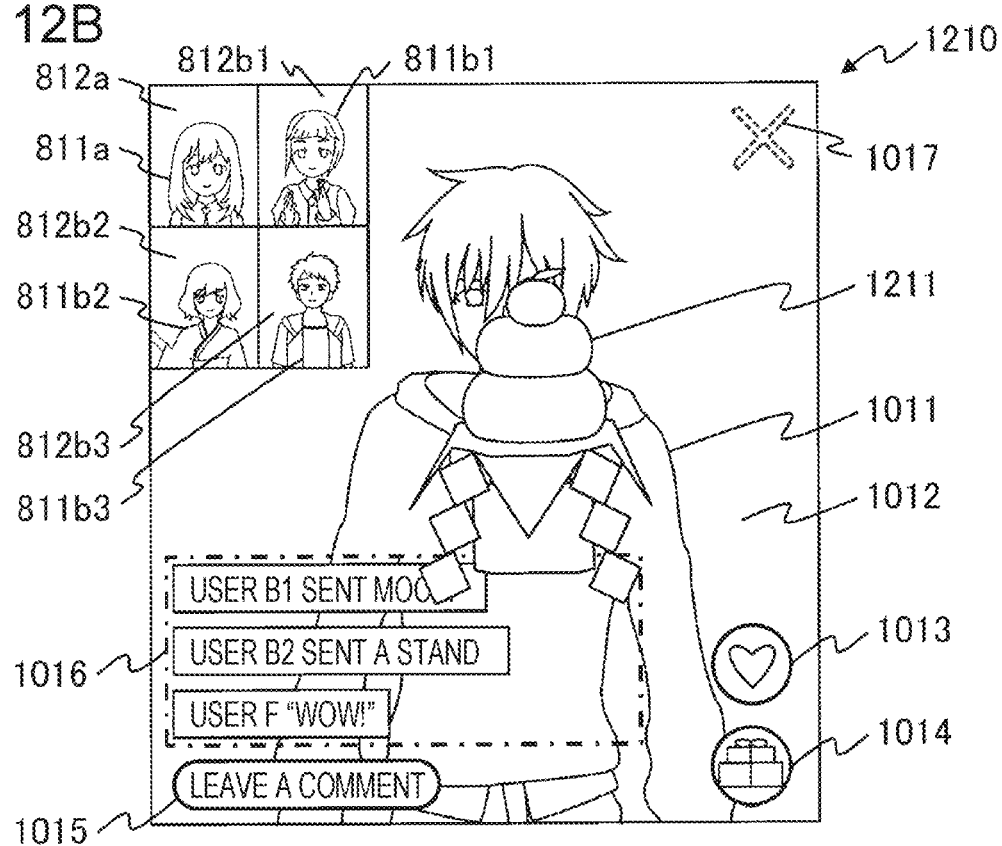

FIG. 12A is a diagram illustrating an example of a distribution screen 1200 displayed on the display device 23 of the terminal device 2, and FIG. 12B is a diagram illustrating another example of a distribution screen 1210 displayed on the display device 23 of the terminal device 2.

The distribution screen 1200 includes, in the same way as the distribution screen 1010, the distribution image 1012 including the character object 1011, the evaluation button 1013, the addition button 1014, the comment button 1015, the response information display region 1016, and the end-watching button 1017. Also, the distribution screen 1200 includes, in the same way as the distribution screen 1010, the user output images 812a, 812b1, 812b2, and 812b3, including the respective character objects 811a, 811b1, 811b2, and 811b3.

Unlike the distribution screen 1010, the distribution screen 1200 includes the additional object 1201, the additional object 1202, and the additional object 1203. The additional objects 1201 to 1203 are each still images or moving images representing additional objects. The additional objects 1201 to 1203 are additional objects of particular types that are different from each other, and are additional objects of a particular combination that is set in advance. Note that the combination of additional objects satisfying the change conditions may be two additional objects, or may be four or more additional objects. Also, the combination of additional objects satisfying the change conditions may be additional objects in which at least part thereof are the same particular type. For example, the change conditions may be satisfied in a case of a combination occurring of an additional object of type G, an additional object of type G, an additional object of type H, and an additional object of type K.

Upon determining that the predetermined change conditions are satisfied with regard to the additional object 1201, the additional object 1202, and the additional object 1203, the server transmitting unit 332 of the server device 3 transmits a display instruction for the additional object 1211, along with the object ID of the additional object 1211, to the terminal devices 2 of the watching users (including user A, user B1, user B2, and user B3) and the distributing user. Note that the combination of the object ID of the additional object 1201, the object ID of the additional object 1202, and the object ID of the additional object 1203, is stored in an associated manner with the object ID of the additional object 1211. Upon a display instruction for the additional object 1211 being received by the receiving unit 273, the display processing units 274 of the terminal devices 2 of the watching users and the distributing user extract the still image or moving image (image information) of the additional object associated with the object ID that is received at the same time from the terminal storage devices 22. Next, the display processing units 274 of the terminal devices 2 generate a new distribution image 1012 including the additional object 1211 that is the extracted still image or moving image, in the distribution image 1012 that includes the character object 1011 of the distributing user. Thus, upon the conditions relating to the display request for additional objects in accordance with addition instructions for a plurality of types of additional objects being satisfied, an additional object that is different from the additional objects corresponding to the addition instructions is displayed. Note that at least part of the images of the additional objects corresponding to the addition instructions may be used in the image of the additional object that is different from the additional objects corresponding to the addition instructions.

Determination processing regarding whether or not predetermined change conditions are satisfied may be executed by the terminal device 2 of the distributing user. Upon the terminal device 2 of the distributing user receiving an addition instruction for the additional object 1201, an addition instruction for the additional object 1202, and an addition instruction for the additional object 1203, from the terminal devices 2 of the watching users via the server device 3, the display processing unit 274 determines whether or not the predetermined change conditions are satisfied. Upon determination being made that the predetermined conditions are satisfied, the terminal device 2 of the distributing user extracts the object ID of the additional object 1211 that is stored in the terminal storage device 22 in a manner associated with the combination of the object ID of the additional object 1201, the object ID of the additional object 1202, and the object ID of the additional object 1203, and executes display processing of the additional object 1211. The transmitting unit 272 of the terminal device 2 of the distributing user then transmits a display instruction regarding the additional object 1211, along with the object ID of the additional object 1211, to the terminal devices 2 of the watching users, via the server device 3. Upon the display instruction regarding the additional object 1211 being received by the receiving units 273, the display processing units 274 of the terminal devices 2 of the watching users then extract a still image or moving image (image information) of the additional object associated with the object ID received at the same time from the terminal storage devices 22. Next, the display processing units 274 generate a new distribution image 1012 including the additional object 1211 that is the extracted still image or moving image in the distribution image 1012 including the character object 1011 of the distributing user, and display the distribution screen 1210 including the new distribution image 1012.

Note that before determining whether or not predetermined change conditions are satisfied, display of the additional object 1201 in accordance with the addition instruction for the additional object 1201, display of the additional object 1202 in accordance with the addition instruction for the additional object 1202, and display of the additional object 1203 in accordance with the addition instruction for the additional object 1203, are performed in the distribution screen 1200. An arrangement may be made in which display of the additional object 1201, the additional object 1202, and the additional object 1203 are not performed until before determining whether or not the predetermined change conditions are satisfied, and the additional object 1201, the additional object 1202, and the additional object 1203 may be displayed in a case that determination is not made that the predetermined change conditions are satisfied. In this case, when determination is made that the predetermined change conditions are satisfied, display of the additional object 1201, the additional object 1202, and the additional object 1203 are not performed, and display of the additional object 1211 is performed.

Also, the predetermined change conditions may be that a numerical value input within a predetermined period (e.g., ten seconds) by one of the users belonging to the same communication group (e.g., user A, user B1, user B2, and user B3) exceeds a predetermined value. Note that the predetermined change conditions may be that a numerical value input in a predetermined period by one of all of the users watching the same distribution screen exceeds a predetermined value.

For example, in a case in which the total count of coins input by each user belonging to the same communication group, out of the possessed coins of the user ("coins" that is a virtual currency value possessed by the user), exceeds a predetermined count within a predetermined period, the distribution screen including a particular additional object may be displayed. In a case in which the total count of coins input by each user belonging to the same communication group within the predetermined period does not exceed the predetermined count, the size of the particular additional object may be changed so as to become smaller, and a distribution screen including the particular additional object after changing may be displayed. Also, in a case in which the total count of coins input by each user belonging to the same communication group within the predetermined period does not exceed the predetermined count, a distribution screen not including the predetermined additional object may be displayed.

Upon an addition candidate object being selected in accordance with the user A operating the input device 24, the input device 24 inputs an addition instruction, along with the object ID corresponding to the selected addition candidate object, to the terminal processing device 27. In a case in which the input object ID is an object ID of a particular additional object, the display processing unit 274 displays an input screen 1300 on the display device 23. Next, the transmitting unit 272 transmits a display instruction for the input screen, along with the user ID of the user A stored in the terminal storage device 22 and/or the transmission destination information, to the server device 3 via the terminal communication interface 21. The server receiving unit 331 of the server device 3 receives the display instruction for the input screen and the user ID of the user A via the server communication interface 31. In a case in which the transmission destination information is transmitted along with the display instruction for the input screen, the server receiving unit 331 receives the transmission destination information. The server transmitting unit 332 of the server device 3 transmits the display instruction for the input screen and the user ID of the user A to the terminal devices 2 of the users B (user B1 to user B3) indicated by the user IDs included in the transmission destination information, via the server communication interface 31.

The receiving units 273 of the terminal devices 2 of the users B (user B1 to user B3) receive the display instruction for the input screen of the user A, and the user ID of the user A, from the server device 3. The display processing units 274 extract the name associated with the user ID of the user A that is received from the user table T1, and display an input screen 1310 on the display devices 23 on the basis of the extracted name. Note that the input screen 1310 does not have to be automatically displayed in accordance with reception of the display instruction. In this case, an icon, badge, or the like, indicating that there has been a call for "let's cooperate and send a gift" from another user may be displayed in the distribution screen, and the input screen 1310 may be displayed by a user tapping on the icon, badge, or the like.

Figure 13A:
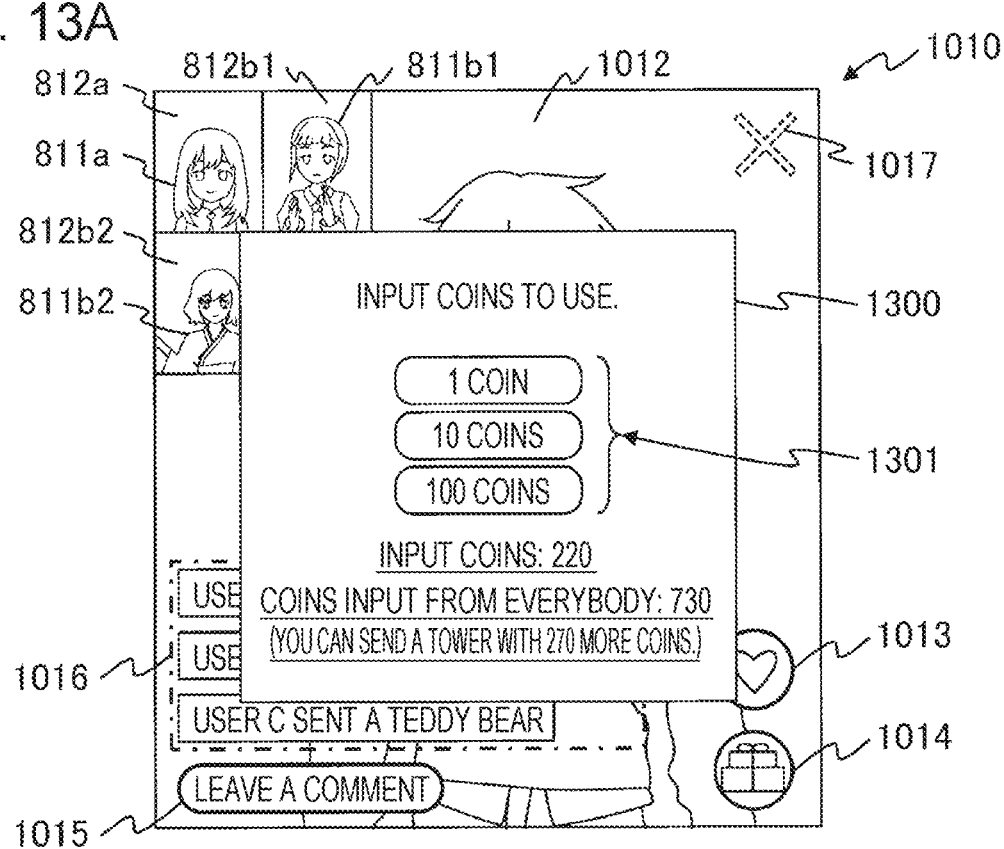
FIGS. 13A and 13B illustrate examples of screens displayed on the display device of the terminal device.

FIG. 13A is a diagram illustrating an example of the input screen 1300 displayed on the display device 23 of the terminal device 2 of the user A. The input screen 1300 is displayed overlaid on the distribution screen 1010. The input screen 1300 includes information prompting the user A to input coins, information indicating the count of coins input by the user A, and information indicating the total count of coins input by the users belonging to the same communication group. The input screen 1300 also includes numerical value input objects 1301 for inputting the count of coins.

The numerical value input objects 1301 are object images such as button objects or the like for inputting the count of coins. Although three types of button objects are included in the input screen 1300 in the example illustrated in FIG. 13A, two types or less of button objects may be included, or four types or more of button objects may be included. For example, upon a numerical value input object 1301 displaying "1 coin" being selected once by the user A, "1" is input as the input count of coins. Also, upon the numerical value input object 1301 displaying "1 coin" being selected five times by the user A, "1" is input five times as the input count of coins, and "5" is the count of coins input by the user A. Also, upon a numerical value input object 1301 displaying "10 coin" being selected twice by the user A, "10" is input twice as the input count of coins, and "20" is the count of coins input by the user A. Further, upon a numerical value input object 1301 displaying "100 coins" being selected three times by the user A, "100" is input three times as the input count of coins, and "300" is the count of coins input by the user A. In the example illustrated in FIG. 13A, the input count of coins by the user A is "220", and the total count of coins input by the users belonging to the same communication group is "730". Note that information, by which the user that input coins can be recognized, may be displayed in the input screen 1300. For example, the names of users that input coins are displayed as information by which the user that input coins can be recognized. Also, instead of names of users that input coins, or along with names of users that input coins, icon images representing the users may be displayed as the information by which the user that input coins can be recognized. Further, the count of coins input by each of the users may be displayed.

Figure 13B:
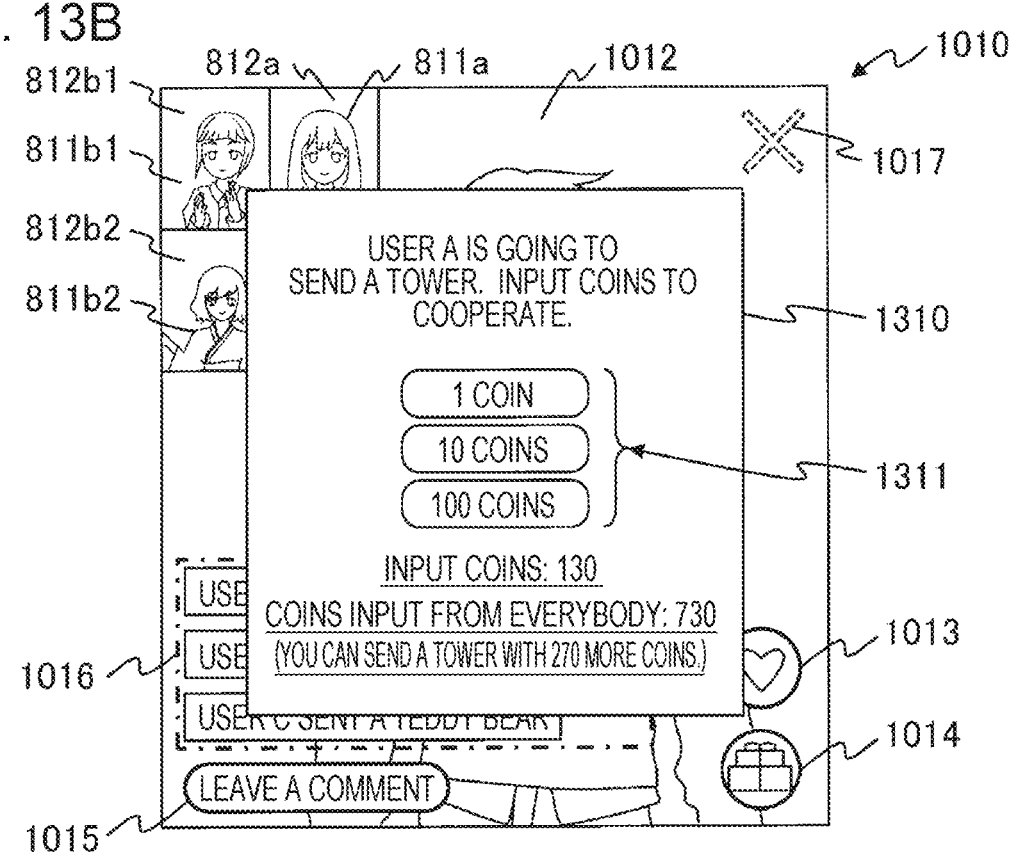

FIG. 13B is a diagram illustrating an example of the input screen 1310 displayed on the display device 23 of the terminal device 2 of the user B1. The input screen 1310 is displayed overlaid on the distribution screen 1010. The input screen 1310 includes information prompting the user B1 to input coins, information indicating the count of coins input by the user B1, and information indicating the total count of coins input by the users belonging to the same communication group. The input screen 1310 also includes numerical value input objects 1311 for inputting the count of coins.

The numerical value input objects 1311 are object images such as button objects for inputting the count of coins, and have the same function as the numerical value input objects 1301 illustrated in FIG. 13A. In the example illustrated in FIG. 13B, the input count of coins by the user B1 is "130", and the total count of coins input by the users belonging to the same communication group is "730". Each time the numerical value input objects 1311 are selected in accordance with the user B1 operating the input device 24, the input device 24 inputs a numerical value transmission instruction for transmitting the count of coins input by the user B1, and the input count of coins by the user B1, to the terminal processing device 27. The transmitting unit 272 of the terminal device 2 of the user B1 transmits the information indicating the numerical value transmission instruction input from the input device 24, and the input count of coins, along with the user ID of the user B1 stored in the terminal storage device 22, to the server device 3 via the terminal communication interface 21. Next, the server receiving unit 331 of the server device 3 receives the information indicating the numerical value transmission instruction, the input count of coins, and the user ID of the user B1, via the server communication interface 31.

Next, the server transmitting unit 332 of the server device 3 transmits the information indicating the numerical value transmission instruction, the input count of coins, and the user ID of the user B1, which are received, to the terminal device 2 of the user A (the user that performed the display instruction for the input screen), via the server communication interface 31. Next, the receiving unit 273 of the terminal device 2 of the user A receives the information indicating the numerical value transmission instruction, the input count of coins, and the user ID of the user B1, via the terminal communication interface 21. The display processing unit 274 of the terminal device 2 of the user A adds the received input count to the current total of coins input by the users belonging to the same communication group, thereby updating the total of the count of coins. The display processing unit 274 of the terminal device 2 of the user A then displays the input screen 1300 including the updated total of the count of coins, and the transmitting unit 272 transmits information indicating the updated total of the count of coins to the terminal devices 2 of the users B (user B1 to user B3) via the server device 3. Accordingly, the total of the count of coins can be updated at the input screen 1310 displayed at the terminal devices 2 of the users B (user B1 to user B3), as well. Note that the updating processing of the total count of coins may be executed by the server device 3. In this case, the update results (information indicating the updated total of count of coins) are transmitted to the terminal devices 2 of the user A and the users B (user B1 to user B3), along with the information indicating the numerical value transmission instruction, the input count of coins, and the user ID of the user B1.

Figure 14A:
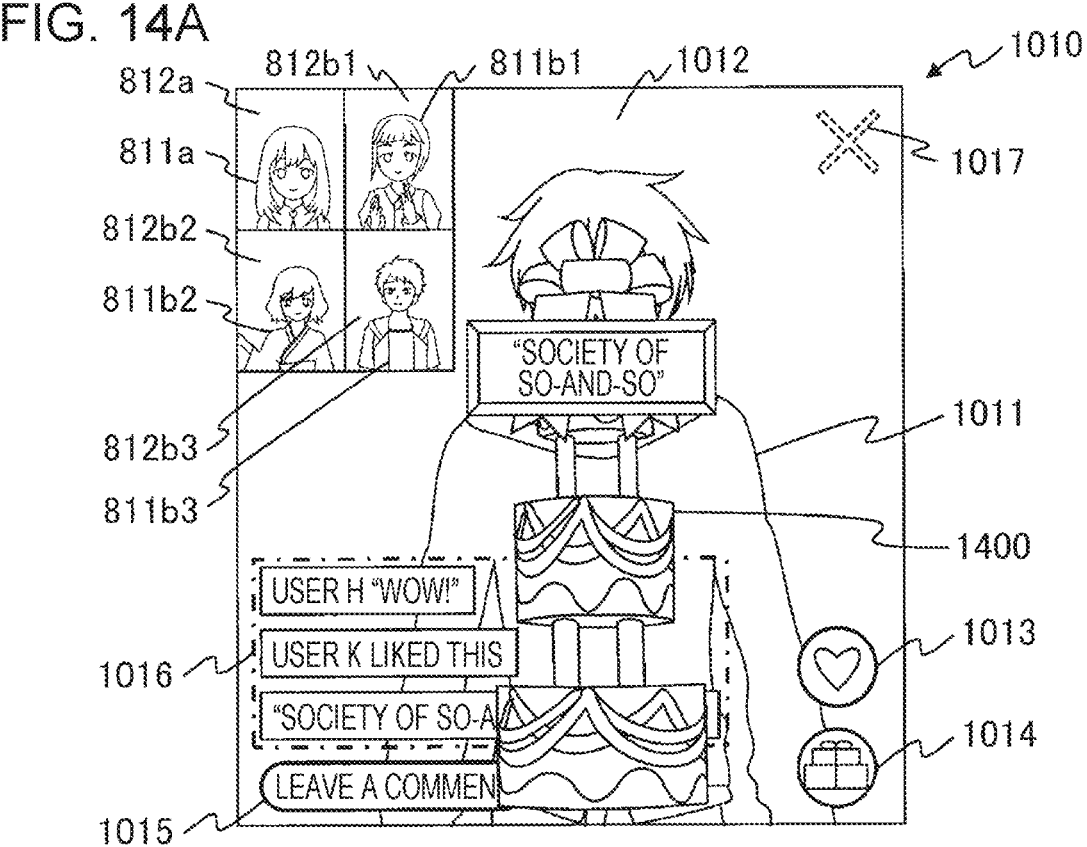
FIGS. 14A and 14B illustrate examples of screens displayed on the display device of the terminal device.

The display processing unit 274 of the terminal device 2 of the user A (the user that performed the display instruction for the input screen) displays the distribution screen 1010 including a particular additional object 1400, in a case in which the updated total of the count of coins exceeds a predetermined count F1 (e.g., "1000") within a predetermined period E1 (e.g., ten seconds) from the input screen 1300 being displayed. Also, in this case, the transmitting unit 272 of this terminal device 2 transmits an object ID representing the particular additional object 1400 to the terminal devices 2 of the watching users (including the users B (user B1 to user B3)) watching the distribution image 1012, via the server device 3. Accordingly, display of the distribution screen 1010 including the particular additional object 1400 can be displayed in the input screen 1310 displayed at the terminal devices 2 of the watching users watching the distribution image 1012, as well. FIG. 14A is a diagram illustrating an example of the distribution screen 1010 including the particular additional object 1400 displayed on the display device 23 of the terminal device 2 of the user A. In the example illustrated in FIG. 14A, the particular additional object 1400 is an additional object displayed along with various types of information relating to users that performed the addition instruction. Note that in a case in which the updated total of the count of coins exceeds a predetermined value F2 (e.g., "1500") in a predetermined period E2 (e.g., five seconds) from the time of the updated total of the count of coins exceeding the predetermined count F1, the distribution screen 1010 including the particular additional object 1400 of which the size has been altered (e.g., enlarged) may be displayed by the display processing unit 274.

Also, the predetermined change conditions may be that a numerical value corresponding to a total of a count of times of selection of a particular additional object input within a predetermined period (e.g., ten seconds) by one of users belonging to the same communication group (e.g., user A, user B1, user B2, and user B3) exceeding a predetermined value. Note that the predetermined change conditions may be that the count of times of selection of a particular additional object input by one user out of all users watching the same distribution screen exceeding a predetermined count of times within a predetermined period. Note that the shape, size, placement, color, brightness, and/or design of the additional object may continue to change each time the numerical value corresponding the count of times of selection increases. For example, the size of the additional object may be controlled to gradually increase as the numerical value corresponding the count of times of selection increases. Also, the design of the additional object may gradually change (e.g., the chroma or brightness gradually changes, or the external appearance changes in accordance with stages of growth of an animal) in accordance with the numerical value corresponding the count of times of selection increasing. Also, other objects (luxuriousness of the outer appearance changing, etc.) may be added to the additional object in accordance with the numerical value corresponding the count of times of selection increasing. Also, a number displayed along with the additional object may increase or decrease in accordance with the numerical value corresponding the count of times of selection increasing. Also, the predetermined change conditions may be that the count of users that input a particular additional object within a predetermined period (e.g., ten seconds), out of the users belonging to the same communication group (e.g., user A, user B1, user B2, and user B3), exceeds a predetermined count. Note that the predetermined change conditions may be that the count of users inputting a particular additional object, out of all users watching the same distribution screen, exceeding a predetermined count of times within a predetermined period (e.g., ten seconds). Note that the shape, size, placement, color, brightness, and/or design of the additional object may continue to change each time the count of users inputting the particular additional object increases. For example, the size of the additional object may be controlled to gradually increase as the count of users inputting the particular additional object increases. Also, the design of the additional object may gradually change (e.g., the chroma or brightness sequentially changes, or the external appearance changes in accordance with stages of growth of an animal) in accordance with the count of users inputting the particular additional object increasing. Also, other objects (luxuriousness of the outer appearance changing, etc.) may be added to the additional object in accordance with the count of users inputting the particular additional object increasing. Also, a number displayed along with the additional object may increase or decrease in accordance with the count of users inputting the particular additional object increasing.

Note that in a case in which addition conditions that a numerical value corresponding to a total of a count of times of selection of a particular additional object input within a predetermined period (e.g., ten seconds) by one of users belonging to the same communication group (e.g., user A, user B1, user B2, and user B3) exceeds a predetermined value, are satisfied, an image representing an addition candidate object corresponding to a new additional object corresponding to the conditions may be added to the selection screen 1100. Also, in a case in which addition conditions that the count of users that input a particular additional object within a predetermined period (e.g., ten seconds), out of the users belonging to the same communication group (e.g., user A, user B1, user B2, and user B3), exceeds a predetermined count, are satisfied, an image representing an addition candidate object corresponding to a new additional object corresponding to the conditions may be added to the selection screen 1100. In this way, the information system 1 can prepare additional objects that are not added to the distribution screen of the distributing user unless the above-described addition conditions are satisfied, and accordingly, the motivation of users participating in the communication service to contribute to the distribution event can be raised.

Upon the addition candidate object (in the selection screen 1100) being selected in accordance with the user A operating the input device 24, addition processing is executed in accordance with the addition instruction at the terminal device 2 of the user A, the watching users (excluding the user A), and the distributing user, and at the server device 3. In the same way, upon the addition candidate object being selected in accordance with each of the users B (users B1 to B3) operating the input devices 24, addition processing is executed in accordance with the addition instruction at the terminal devices 2 of the users B, the terminal devices 2 of the watching users (excluding the users B) and the distributing user, and at the server device 3.

Now, in a case in which an object ID corresponding to the addition candidate object selected in accordance with users belonging to the communication group (e.g., user A and users B1 to B3) operating the input devices 24 is an object ID corresponding to a particular additional object, the display processing units 274 of the terminal devices 2 of the users alter a counting parameter value stored in the terminal storage device 22. For example, altering of the counting parameter value is processing of increasing the value by "1" each time determination is made that the object ID corresponding to the addition candidate object selected by the users is an object ID of a particular additional object.

For example, in a case in which an addition candidate object is selected in accordance with the user A operating the input device 24, and the object ID corresponding to the selected addition candidate object is an object ID of a particular additional object, the display processing unit 274 of the terminal device 2 of the user A changes the counting parameter value stored in the terminal storage device 22 before the addition processing in accordance with the addition instruction. In the addition processing in accordance with the addition instruction performed by the user A, the receiving units 273 of the terminal devices 2 of the users B receive information indicating the addition instruction, the user ID of the user A, and the object ID, via the terminal communication interfaces 21. Now, the received object ID is an object ID of a particular additional object, and accordingly the display processing units 274 of the terminal devices 2 alter the counting parameter value stored in the terminal storage devices 22.

In a case in which the counting parameter value exceeds a predetermined value, or in a case in which the counting parameter value falls below a predetermined value, the display processing units 274 of the terminal devices 2 of the users belonging to the communication group execute altering processing in the display processing of the particular additional object thereafter. For example, in a case in which the object ID corresponding to the addition candidate object selected in accordance with the user A operating the input device 24 is an object ID of a particular additional object, the display processing unit 274 references the object table T2 and extracts a still image or moving image (image information) of the additional object associated with this object ID. Next, the display processing unit 274 alters the extracted still image or moving image, and generates a new distribution image 1012 including the altered still image or moving image (image of particular additional object following alteration) in the distribution image 1012 that includes the character object 1011 of the distributing user. Also, in the addition processing in accordance with the addition instruction performed by the user A, the receiving units 273 of the terminal devices 2 of the watching users (excluding the user A) and of the distributing user receive the information indicating the addition instruction, the user ID of the user A, and the object ID, via the terminal communication interface 21. Next, in a case in which the received object ID is an object ID of a particular additional object, the display processing units 274 of the terminal device 2 of the users B references the object table T2 and extract a still image or moving image (image information) of the additional object associated with the received object ID. Next, the display processing units 274 alter the extracted still image or moving image, and generate a new distribution image 1012 including the altered still image or moving image (image of particular additional object following altering) in the distribution image 1012 that includes the character object 1011 of the distributing user.

Figure 14B:
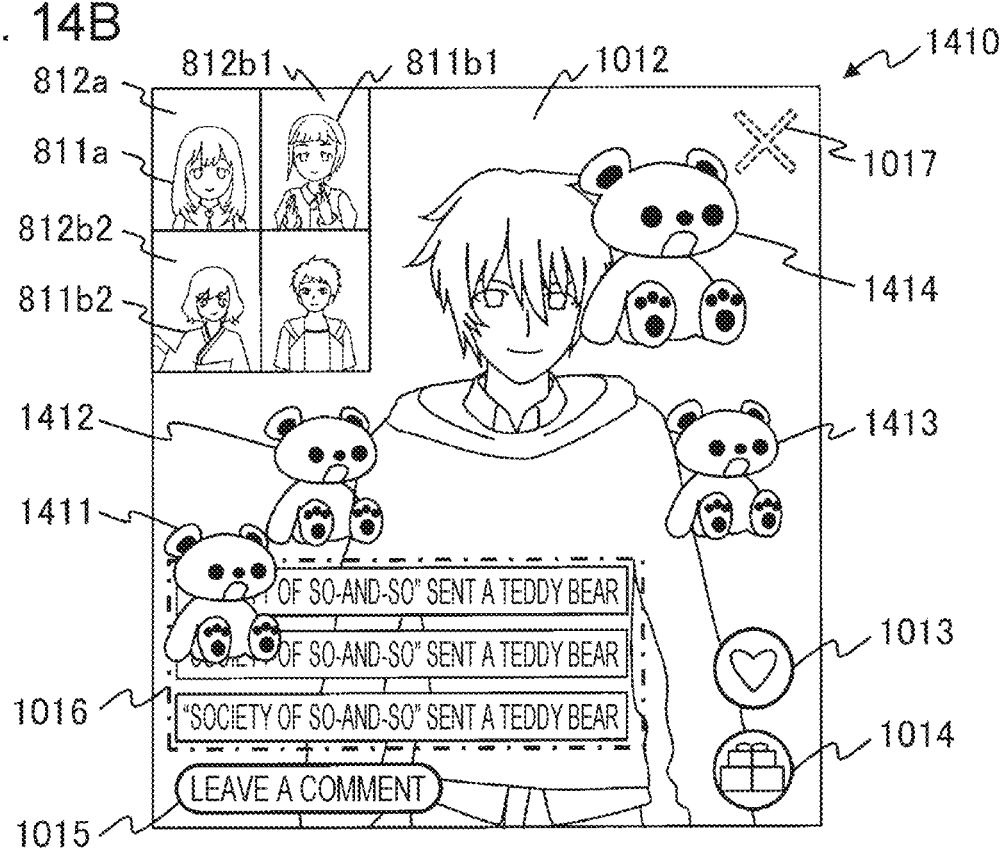

FIG. 14B is a diagram illustrating another example of a distribution screen 1410 including a particular additional object 1414 following alteration, which is displayed on the display device 23 of the terminal device 2. Additional objects 1411 to 1413 included in the distribution screen 1410 are particular additional objects before alteration, and the particular additional object 1414 following alteration is larger in size than the sizes of the particular additional objects 1411 to 1413 before alteration. In this way, upon a particular additional object being selected in accordance with an addition instruction operation being performed following predetermined change conditions being satisfied relating to the count of times of selection of a particular additional object being selected in accordance with the addition instruction operation performed by a user belonging to the communication group using the input device 24, this particular additional object is displayed in an altered manner. Note that if at least one of the predetermined change conditions exemplified above is satisfied, the shape, size, placement, color, brightness, and/or design of the additional object added to the distribution screen changes while being displayed in the distribution screen.

Action Sequence of Information System 1

Figure 15:
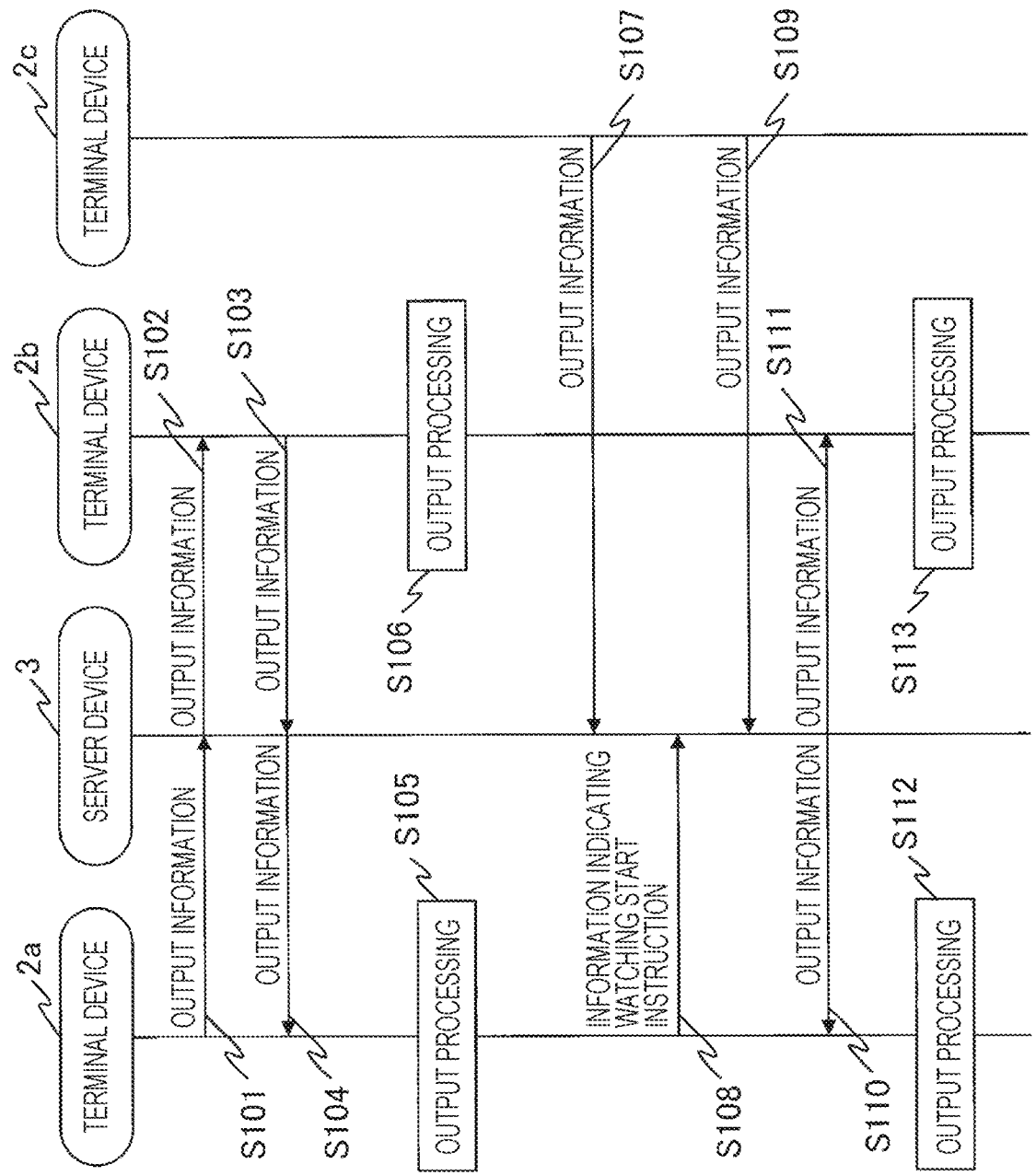
FIG. 15 illustrates an example of an action sequence of the information system.

FIG. 15 is a diagram illustrating an example of an action sequence of the information system 1. This action sequence is executed primarily by the terminal processing device 27 and the server processing device 33 operating in collaboration with the components of the terminal devices 2 and the server device 3, on the basis of control programs stored in the terminal storage devices 22 and the server storage device 32 in advance. Description will be made below with the understanding that a user A operates a terminal device 2a, a user B operates a terminal device 2b, and a distributing user C operates a terminal device 2c.

First, the transmitting unit 272 of the terminal device 2a transmits output information including character video data including motion data of the user A generated by the generating unit 271 on the basis of imaged data that is consecutively output by the imaging apparatus 25, speech data of the user A output from the microphone 26, and the user ID of the user A, along with transmission destination information, to the server device 3 via the terminal communication interface 21 (step S101). Note that transmission destination information does not have to be included in the transmission processing performed by the transmitting unit 272. The processing of step S101 is consecutively executed every predetermined time interval until the distribution event ends (e.g., at two-second intervals), and accordingly the processing relating to steps S101 to S110 is executed intermittently.

Next, the server transmitting unit 332 of the server device 3 references the transmission destination information, and transmits the output information received from the terminal device 2a to the terminal device 2b via the server communication interface 31 (step S102).

Also, the transmitting unit 272 of the terminal device 2b transmits output information including the character video data of the user B, the speech data of the user B, and the user ID of the user B, along with transmission destination information, to the server device 3 via the terminal communication interface 21 (step S103). Next, the server transmitting unit 332 of the server device 3 transmits the output information received from the terminal device 2b, to the terminal device 2a via the server communication interface 31, referencing the transmission destination information (step S104).

The display processing unit 274 of the terminal device 2a performs display output of a communication screen including a user output image that includes the character object of the user A and a user output image that includes the character object of the user B on the basis of output information of each of user A and user B, on the display device 23 of the terminal device 2a, and outputs the speech of the user B (step S105).

In the same way as in step S105, the display processing unit 274 of the terminal device 2b performs display output of a communication screen including a user output image that includes the character object of the user A and a user output image that includes the character object of the user B on the basis of output information of each of user A and user B, on the display device 23 of the terminal device 2b, and outputs the speech of the user A (step S106).

The transmitting unit 272 of the terminal device 2c transmits output information including character video data of the distributing user C and speech data of the distributing user C to the server device 3 via the terminal communication interface 21, to be distributed to the terminal devices 2 of the watching users (step S107).

The transmitting unit 272 of the terminal device 2a transmits information indicating a watching start instruction, input in accordance with the user A operating the input device 24, along with the user ID of the distributing user C, the user ID of the user A, and transmission destination information (user ID of user B) to the server device 3 via the terminal communication interface 21 (step S108). Next, the server transmitting unit 332 of the server device 3 references the user ID of the user A and the transmission destination information (user ID of user B) that are received, transmits output information received from the terminal device 2c of the distributing user C (step S109) to the terminal device 2a (step S110), and also transmits the output information to the terminal device 2b, via the server communication interface 31 (step S111).

The display processing unit 274 of the terminal device 2a performs display output of a distribution screen including a distribution image that includes a character object of the distributing user C on the display device 23 of the terminal device 2a, on the basis of the output information of the distributing user C, and outputs speech of the distributing user C (step S112).

The display processing unit 274 of the terminal device 2b performs display output of a distribution screen including a distribution image that includes a character object of the distributing user C on the display device 23 of the terminal device 2b, on the basis of the output information of the distributing user C, and outputs speech of the distributing user C (step S113).

As described above in detail, in the information system 1 according to the present embodiment, the terminal device 2 of the user A receives output information transmitted from the terminal device 2 of the distributing user via the server device 3, in accordance with an instruction performed by the user A or an instruction performed by the user B, which are participating in the communication service. Accordingly, the terminal device 2 of the user A can watch the distribution image of the distributing user. Thus, the information system 1 according to the present embodiment enables the output from the terminal devices 2 to be altered by the user A or at least one user B during the communication service, which enables the motivation of users to continue using the communication to be improved. Also, a plurality of users (one user and other users) participating in the communication service can watch the same distribution image at the same time due to a watching start instruction being performed by one user participating in the communication service, enabling intensifying of watching distribution images. Also, users can send additional objects, such as gifts that one user alone cannot send, to a character object of a distributing user, by sending along with other users. Thus, a sense of unity among user participating in the communication service can be fostered, i.e., motivation to watch distribution images during the communication service can be raised. Further, users can seamlessly start shared watching of contents such as distribution images and so forth while continuing the communication service, and accordingly, communication among users through avatars can be continued while watching the same contents.

Modification 1

Note that the disclosure is not limited to the present embodiment. For example, the information system 1 may have a function of enabling a user in communication with another user to start a distribution event. For example, in the communication screen 810 illustrated in FIG. 8B, a start-distribution button may be included along with the start-watching button 813. The start-distribution button is an object image such as a button object or the like, for inputting a distribution start instruction for the user to instruct starting distribution of a distribution image.

For example, in a case in which the start-distribution button is selected by the user A operating the input device 24, the input device 24 inputs the distribution start instruction to the terminal processing device 27. The transmitting unit 272 of the terminal device 2 of the user A (the user that input the distribution start instruction) transmits information relating to the distribution start instruction for instructing starting of a distribution event by the user, along with the user ID of the user A stored in the terminal storage device 22, to the server device 3 via the terminal communication interface 21, in accordance with the distribution start instruction performed by the user A.

Next, the server receiving unit 331 of the server device 3 receives information relating to the distribution start instruction and the user ID transmitted from the terminal device 2 of the user, via the server communication interface 31. The server receiving unit 331 stores the received user ID as a distributing user ID indicating a distributing user that is distributing, in the server storage device 32. Thus, the user A is registered in the server device 3 as a distributing user. Thereafter, the server receiving unit 331 receives output information of the user A transmitted from the terminal device 2 of the user A along with the user ID of the user A, via the server communication interface 31, as output information of the distributing user.

Note that the server receiving unit 331 extracts a model ID of the character object associated with the user ID of the user A that is the distributing user, and object IDs of used objects, from the user table T1, at a predetermined timing (e.g., immediately after reception of the distribution start instruction, or after a predetermined amount of time elapses from the distribution start instruction). Next, the server receiving unit 331 generates a thumbnail image of the user character object of the user A, on the basis of the model data associated with the model ID that is extracted, and image information and placement location associated with the object IDs of the used objects that are extracted. The server receiving unit 331 stores the thumbnail image that is generated in the server storage device 32 in a manner associated with the user ID of the user A (distributing user), as a selection image of the user A that is the distributing user. Any image will suffice as the thumbnail stored as a selection image, as long as it is an image representing the character object of the distributing user that is created in advance. For example, a profile image of the character object of the distributing user may be stored as a thumbnail image.

The display processing unit 274 of the terminal device 2 of the user A displays a distribution screen including a distribution image of the user A him/herself. That is to say, the display processing unit 274 of the terminal device 2 of the user A displays an image drawn on the basis of the motion data (character video data) of the user A generated by the generating unit 271 on the display device 23 as a distribution image. Note that unlike the distribution screen 1010, the distribution screen displayed on the terminal device 2 of the user A that is the distributing user does not include the evaluation button 1013, the addition button 1014, and the comment button 1015. Also, in the distribution screen displayed at the terminal device 2 of the user A, the user output images 812*a*, 812*b*1, 812*b*2, and 812*b*3 are displayed in a case in which a watching start instruction is performed by one of the users B1 to B3.

Also, the distribution screen displayed on the terminal device 2 of the user A that is the distributing user displays an end-distribution button, in the same way as the end-watching button 1017 in the distribution screen 1010. The end-distribution button is an object image such as a button object or the like, for ending display of the distribution screen and ending distribution of the distribution image. Upon the end-distribution button being selected by the user A operating the input device 24, the display processing unit 274 ends display of the distribution screen, and displays the communication screen 810 (FIG. 8B) again. Next, the transmitting unit 272 of the terminal device 2 transmits information relating to the distribution end instruction, along with the user ID stored in the terminal storage device 22, to the server device 3 via the terminal communication interface 21.

The server receiving unit 331 of the server device 3 receives information relating to the distribution end instruction and the user ID of the user A (distributing user ID) transmitted from the terminal device 2 of the user A, via the server communication interface 31. The server receiving unit 331 then deletes the user ID of the user A that is received, and the watching user IDs associated with the user ID of the user A, from among the distributing user IDs stored in the server storage device 32. Thus, distribution of the distribution image of the user A that selected the end-distribution button ends.

Thus, the information system 1 enables output from a terminal device of a user to be altered by the user or other users during the communication service, by a simple interface, thereby enabling motivation of users to continue using the communication to be raised.

Also, in conventional information systems, when communication with another user is being performed by a user with another user, the user needs to interrupt or end the communication service in order to start another service during this communication. Thereafter, the user and the other user can receive provision of the other service by instructing the server device or the like to start the other service. In this way, in order for the user and another user to receive provision of another service while receiving provision of a service in a conventional information system, multiple types of communication are generated, such as communication relating to interrupting or ending service, and starting another service. Thus, there has been a problem in that the processing load on the terminal devices and/or the load of communication between the terminal devices and the server device increase. In contrast with this, in the information system 1, the user receiving the communication service can start distribution of a distribution image of the character object of him/herself, by a simple operation of just selecting the start-distribution button. Also, in the information system 1, distribution can be ended, and the communication service can be easily returned to by the user distributing the distribution image just performing a distribution end instruction. Thus, the user and other users can receive provision of various types of service with less communication occurring as compared to conventional information systems, and the processing load on the terminal devices and/or the load of communication between the terminal devices and the server device can be reduced.

Modification 2

Figure 16A:
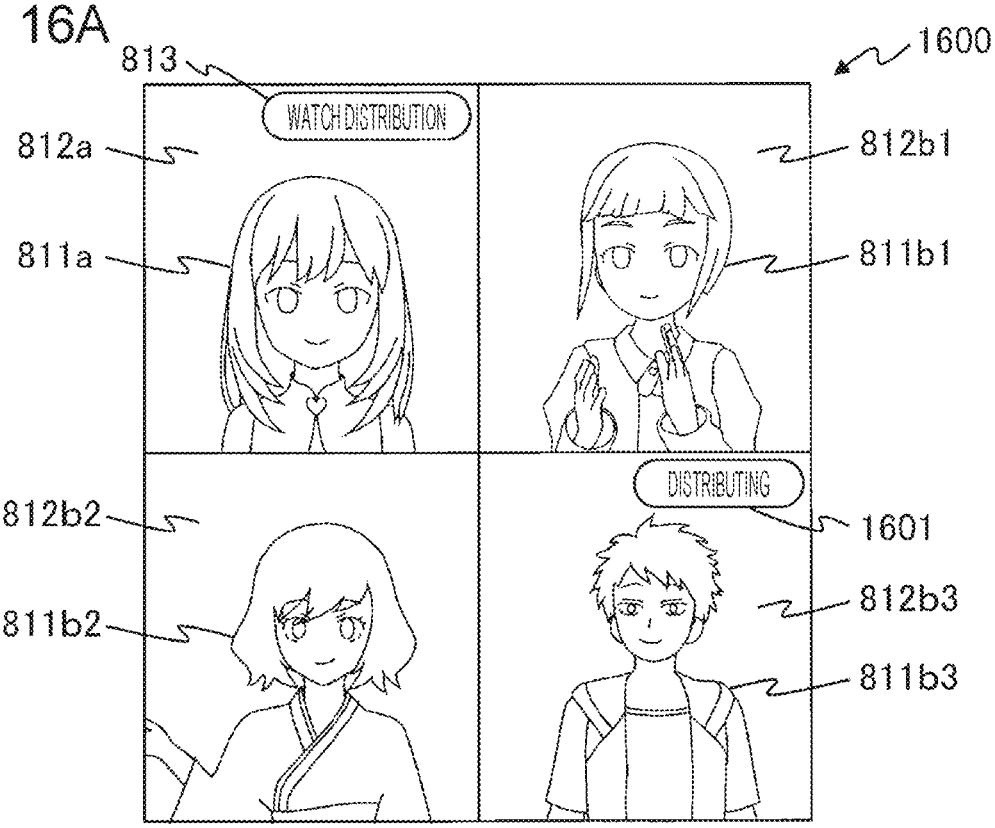
FIGS. 16A and 16B illustrate examples of screens displayed on the display device of the terminal device.

Also, the information system 1 may have a function in which, in a case of another user starting a distribution event while the user is in communication therewith, the user can watch the distribution event. FIG. 16A is a diagram illustrating another example of a communication screen 1600 displayed on the display device 23 of the terminal device 2 of the user A.

The communication screen 1600 includes the user output image 812*a* of the user A, the user output image 812*b*1 of the user B1, the user output image 812*b*2 of the user B2, and the user output image 812*b*3 of the user B3, and the start-watching button 813, in the same way as the communication screen 810. Unlike the communication screen 810, a distributing mark 1601 indicating a user that has started a distribution event is displayed in the communication screen 1600.

In the example illustrated in FIG. 16A, the distributing mark 1601 is included in the display region of the user output image 812*b*3 of the user B3, and accordingly visual recognition can be made that the user B3 has started a distribution event. Note that although the user output image 812*b*3 of the user B3 is the same as the distribution image that the user B3 is distributing in the distribution event, a thumbnail image of the character object of the user B3 may be displayed in the display region of the user output image 812*b*3 of the user B3 instead of the user output image 812*b*3 being displayed. Also, text information or the like indicating that distribution is ongoing may be displayed in the display region of the user output image 812*b*3 of the user B3 instead of the user output image 812*b*3 being displayed. Also, an arrangement may be made in which, when the communication screen 1600 is being displayed, speech data of the user B3 is not output. In the communication screen 1600 illustrated in FIG. 16A, upon the start-watching button 813 being selected by the user A operating the input device 24, a selection screen 1610 is displayed.

Figure 16B:
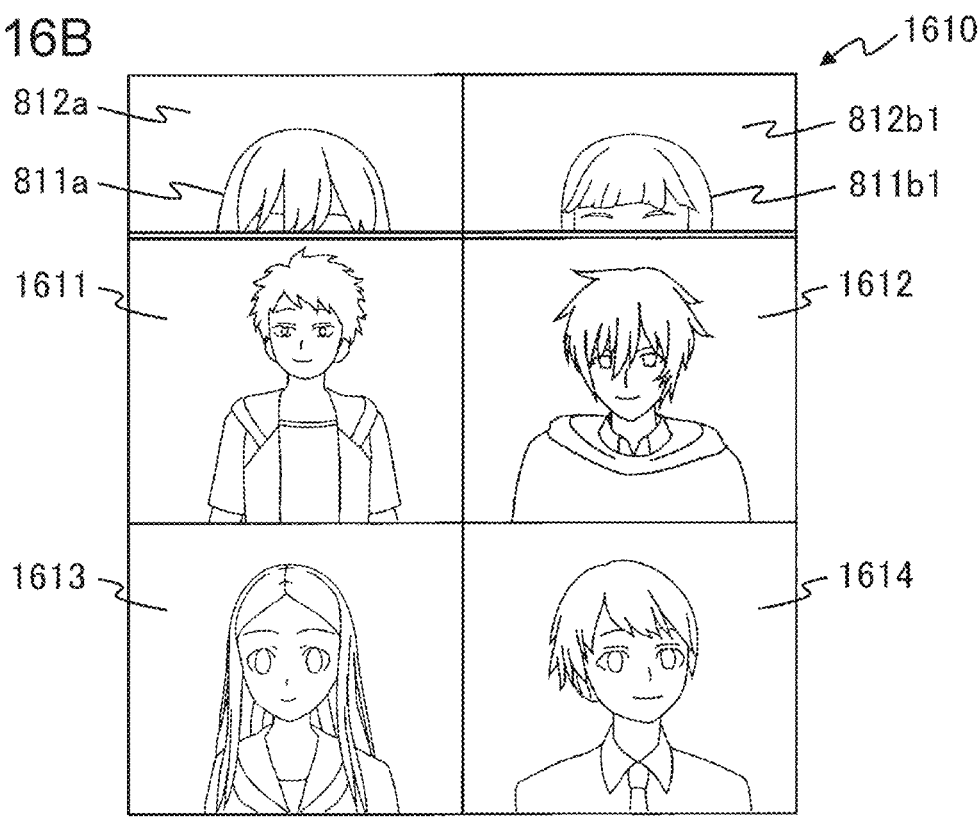

FIG. 16B is a diagram illustrating an example of the selection screen 1610 displayed on the display device 23 of the terminal device 2 of the user A. The selection screen 1610 displays, in the communication screen 1600, selection images 1611, 1612, 1613, and 1614 relating to distribution images currently being distributed. The selection images 1611, 1612, 1613, and 1614 are each images for selecting distribution images to watch, in the same way as the selection images 901, 902, 903, and 904 included in the selection screen 900.

The selection image 1611 is a selection image for selecting a distribution image of the user B3 that was carrying out communication with the user A. Upon the selection image 1611 being selected by the user A operating the input device 24, the input device 24 inputs a watching start instruction for the distribution image of the user B3 to the terminal processing device 27. Thereafter, various types of processing for starting to watch, the same as in the selection screen 900 and the confirmation screen 910 are executed, and a distribution screen 1700 is displayed.

Figure 17A:
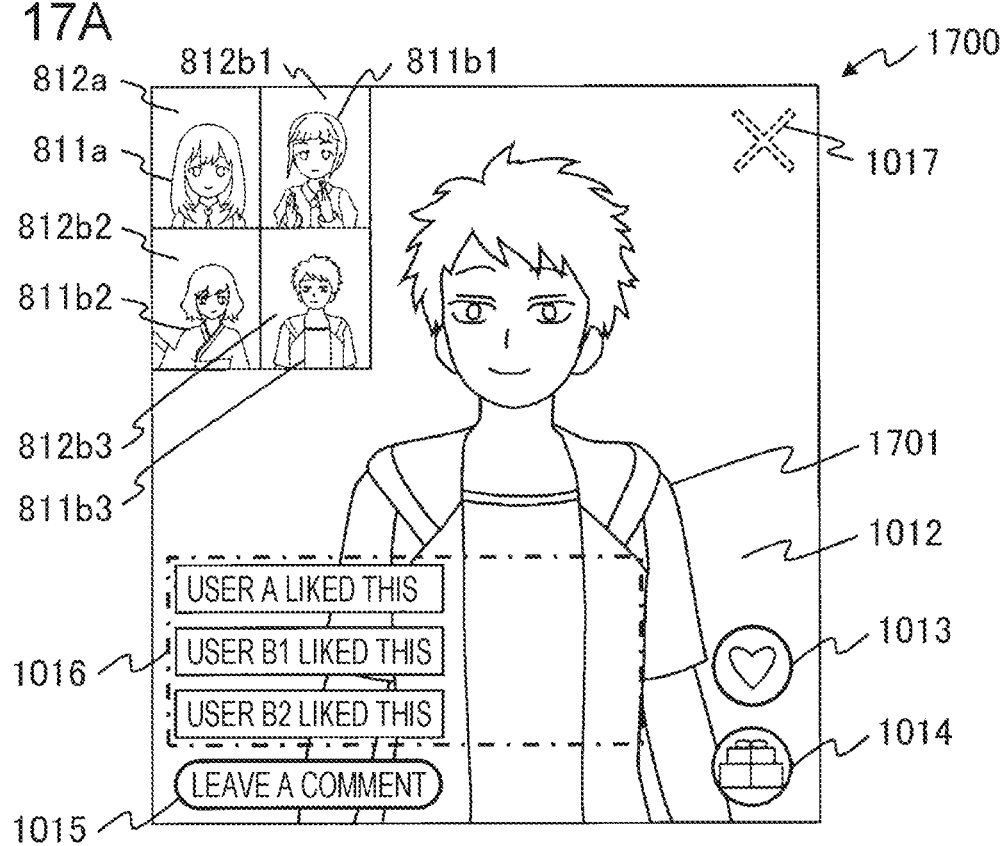
FIGS. 17A and 17B illustrate examples of screens displayed on the display device of the terminal device.

FIG. 17A is a diagram illustrating an example of the distribution screen 1700 displayed on the display device 23 of the terminal device 2 of the user A. Various types of objects that are the same as those in the distribution screen 1010, except for the character object being different, are displayed in the distribution screen 1700. Note that a character object 1701 of the user B3 is included in the distribution screen 1700, and accordingly, the user output image 812b3 of the user B3 does not have to be included.

Upon the end-watching button 1017 being selected by the user A operating the input device 24, the display processing unit 274 ends display of the distribution screen 1700, and displays the communication screen 1600 (FIG. 16A) again.

Modification 3

Figure 17B:
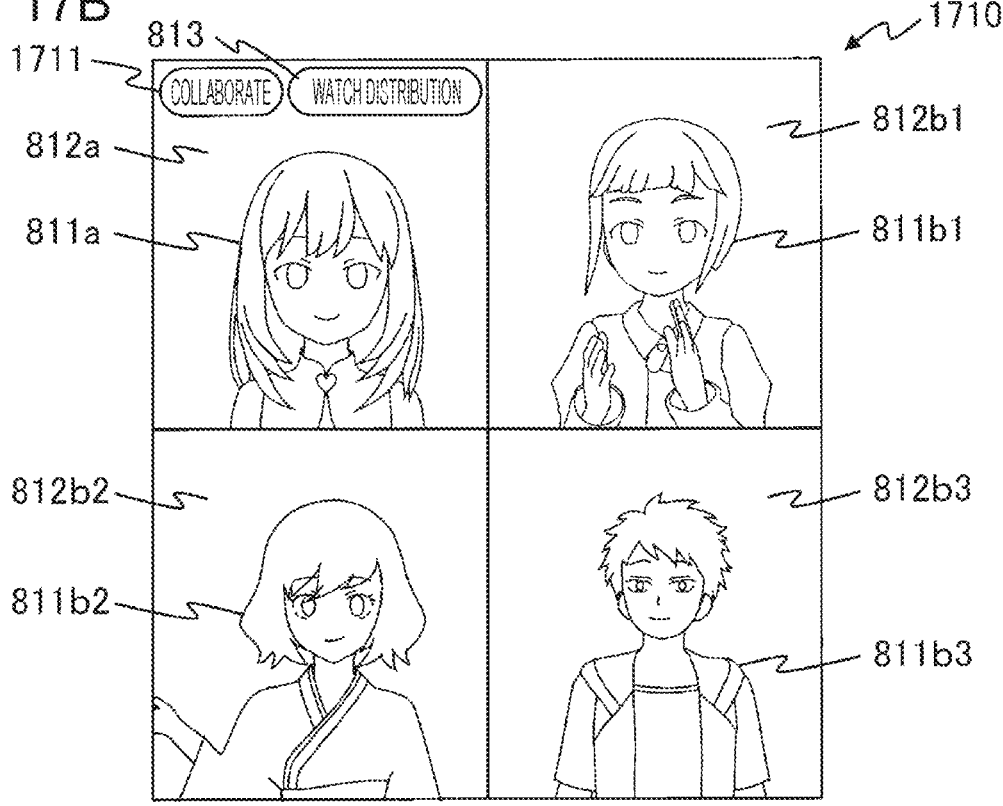

Also, the information system 1 may have a function of enabling a user in communication with other users to start a distribution event by all or part of the users in communication. FIG. 17B is a diagram illustrating another example of a communication screen 1710 displayed on the display device 23 of the terminal device 2 of the user A.

The communication screen 1710 includes the user output image 812a including the character object 811a of the user A, the user output image 812b1 including the character object 811b1 of the user B1, the user output image 812b2 including the character object 811b2 of the user B2, and the user output image 812b3 including the character object 811b3 of the user B3, and the start-watching button 813, in the same way as the communication screen 810. Unlike the communication screen 810, the communication screen 1710 further includes a start-distribution button 1711.

The start-distribution button 1711 is an object image such as a button object or the like, for instructing start of distribution of a distribution image including the character objects of the user A, and of each of all users performing communication with the user A (users B1 to B3).

For example, in a case in which the start-distribution button 1711 is selected by the user A operating the input device 24, the input device 24 inputs a distribution start instruction to the terminal processing device 27. The transmitting unit 272 of the terminal device 2 of the user A (the user that input the distribution start instruction) transmits information relating to the distribution start instruction for instructing the start of a distribution event by the users, along with the user ID of the user A stored in the terminal storage device 22 and the user IDs of each of the users B1 to B3, to the server device 3 via the terminal communication interface 21, in response to a distribution start instruction performed by the user A.

Next, the server receiving unit 331 of the server device 3 receives information relating to the distribution start instruction, the user ID of the user A, and the user IDs of each of the users B1 to B3, transmitted from the terminal device 2 of the user, via the server communication interface 31. The server receiving unit 331 stores the user IDs of the four users that are received in the server storage device 32, as distributing user IDs indicating distributing users that are distributing. Accordingly, the user A and the users B1 to B3 are registered in the server device 3 as distributing users of a common distribution image. Thereafter, the server receiving unit 331 receives output information of the user A and the users B1 to B3 transmitted from the terminal device 2 of the user A along with the user ID of the user A as output information of the distributing users, via the server communication interface 31.

Note that the server receiving unit 331 extracts model IDs of the character objects associated with each of the user IDs of the user A and the users B1 to B3 that are the distributing users, and object IDs of used objects, from the user table T1, at a predetermined timing (e.g., immediately after reception of the distribution start instruction, or after a predetermined amount of time elapses from the distribution start instruction). Next, the server receiving unit 331 generates thumbnail images of the character objects of each of the user A and the users B1 to B3, on the basis of the model data associated with each of the model IDs extracted, and image information and placement location associated with the object IDs of the used objects that are extracted. The server receiving unit 331 stores the thumbnail image that is generated in the server storage device 32 in a manner associated with the user ID of the user A (distributing user), as a selection image of the user A that is one of distributing users. Any image will suffice as the thumbnail image stored as a selection image, as long as it is an image representing the character object of the distributing user that is created in advance. For example, a profile image of the character object of the distributing user may be stored as a thumbnail image.

The server transmitting unit 332 of the server device 3 transmits output images of each of the user A and the users B1 to B3 to the terminal device 2 of the watching users. The display processing units 274 of the terminal devices 2 of the watching users display the distribution screen including the distribution image common to the four users. That is to say, the display processing units 274 of the terminal devices 2 of the watching users display the image that is drawn on the display devices 23 as a distribution image, on the basis of the motion data (character video data) of each of the user A and the users B1 to B3 that is received.

Figure 18A:
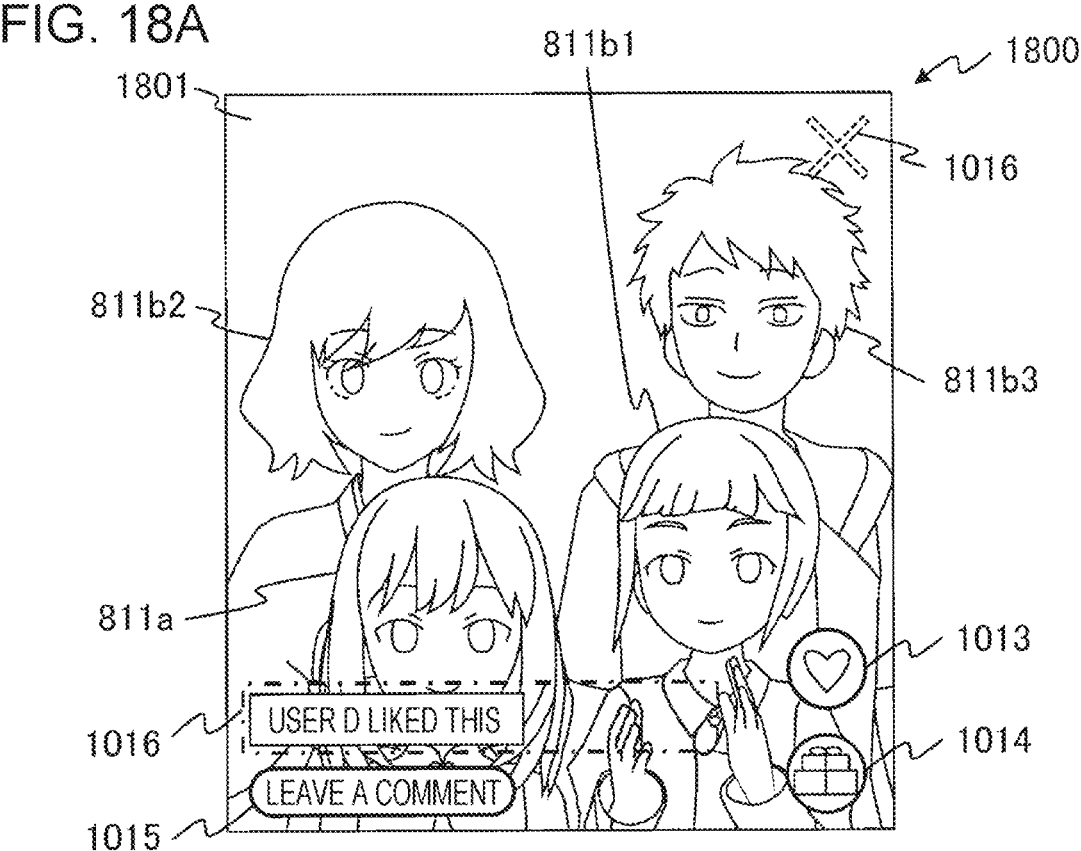
FIGS. 18A and 18B illustrate examples of screens displayed on the display device of the terminal device.

FIG. 18A is a diagram illustrating an example of a distribution screen 1800 displayed on the display devices 23 of the terminal devices 2 of the watching users. The distribution screen 1800 includes, in the same way as the distribution screen 1010, the evaluation button 1013, the addition button 1014, and the comment button 1015. Also, unlike the distribution screen 1010, the distribution screen 1800 displays a distribution image 1801 including the character objects 811a, 811b1, 811b2, and 811b3 of the respective user A and users B1 to B3.

The display processing units 274 of the terminal devices 2 of each of the user A and the users B1 to B3 display a distribution screen including the distribution image 1801 that is common to the four users. Note that unlike the distribution screen 1800, the distribution screen displayed on the terminal devices 2 of each of the user A and the users B1 to B3 that are distributing users does not include the evaluation button 1013, the addition button 1014, or the comment button 1015.

Also, the distribution screen displayed at the terminal device 2 of the user A that is the distributing user displays an end-distribution button, in the same way as the end-watching button 1017 of the distribution screen 1010. The end-distribution button is an object image such as a button object or the like for ending display of the distribution screen and ending distribution of the distribution image. Upon the end-distribution button being selected by the user A operating the input device 24, the display processing unit 274 displays an end confirmation screen 1810.

Figure 18B:
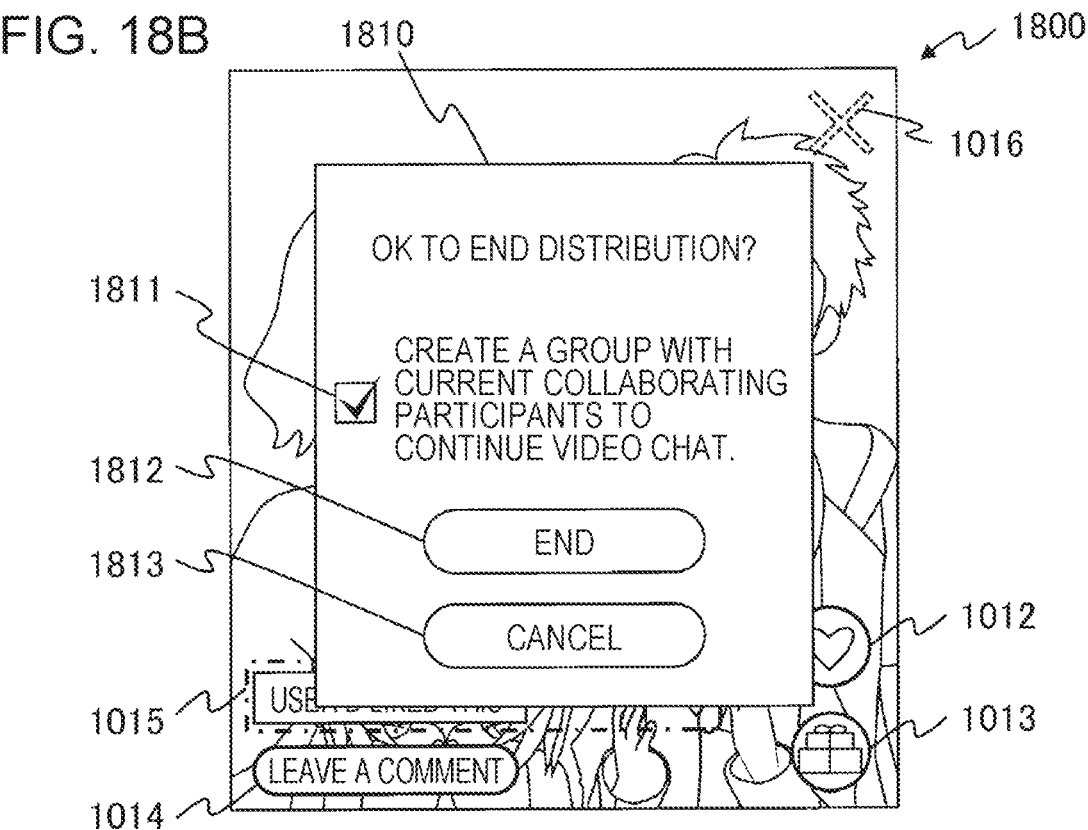

FIG. 18B is a diagram illustrating an example of the end confirmation screen 1810 displayed on the display device 23 of the terminal device 2 of the distributing user. The end confirmation screen 1810 is displayed overlaid on the distribution screen 1800. The end confirmation screen 1810 includes an option object 1811 for selecting whether or not to transition to the communication service, an end-distribution button 1812, and a continue-distribution button 1813.

Selection of the option object 1811 by the user A toggles between a display indicating a selected state of the option object 1811 and a display indicating a non-selected state of the option object 1811. When the user A selects the option object 1811 in a non-selected state, the option object 1811 changes to a selected state, and when the user A selects the option object 1811 in a selected state, the option object 1811 changes to a non-selected state.

The end-distribution button 1812 is an object image such as a button object or the like, for ending display of the distribution screen 1800, and ending distribution of the distribution image 1801. Upon the end-distribution button being selected by the user A operating the input device 24, the display processing unit 274 ends display of the distribution screen 1800. In a case in which the option object 1811 is in a selected state, the display processing unit 274 displays the communication screen 1710 (FIG. 17B) again. A screen regarding whether or not to participate in the communication service may be displayed at the terminal devices 2 of each of the users B1 to B3 that are the other distributing users, before displaying the communication screen 1710 again. In this case, the communication screen 1710 is not displayed again at terminal devices 2 that have rejected participation in the communication service. Note that in a case in which the option object 1811 is in a non-selected state at the time which the end-distribution button is selected by the user A operating the input device 24, display of the distribution screen 1800 is ended without the communication screen 1710 (FIG. 17B) being displayed again. Next, the transmitting unit 272 of the terminal device 2 transmits information relating to a distribution end instruction, along with the user ID stored in the terminal storage device 22, to the server device 3 via the terminal communication interface 21. Note that upon information relating to the selection made by the user A with regard to the option object 1811 being transmitted to the terminal devices 2 of each of the users B1 to B3 that are the other distributing users via the server device 3, a message regarding whether or not to transition to the communication service may be displayed at the terminal devices 2 of each of the users B1 to B3. The communication screen 1710 is then displayed again at the terminal devices 2 that input an instruction to the effect of transitioning to the communication service.

The server receiving unit 331 of the server device 3 receives information relating to the distribution end instruction, and the user IDs (distributing user IDs) of the user A and the users B1 to B3, transmitted from the terminal device 2 of the user A, via the server communication interface 31. The server receiving unit 331 then deletes, from the distributing user IDs stored in the server storage device 32, the user IDs of the user A and the users B1 to B3 that are received, and the watching user IDs associated with the user IDs of the user A and the users B1 to B3. Thus, distribution of the distribution image of the user A that selected the end-distribution button ends.

Upon the end-distribution button being selected by the user A operating the input device 24, the display processing unit 274 ends display of the end confirmation screen 1810, and display of the distribution screen 1800 ends.

Thus, the information system 1 enables output from a terminal device of a user to be altered by the user or other users during the communication service, by a simple interface, thereby enabling motivation of users to continue using the communication to be raised. Note that a configuration may be made in which, in accordance with operation of a terminal device 2 of one or a plurality of users not participating in the communication service, the plurality of user become distributing users, and a distribution screen including the distribution image that is common to the plurality of users (a distribution image including the character objects of each of the plurality of users) can be displayed. In this case, an arrangement may be made in which a button instructing starting of the communication service is displayed in the distribution screen including the distribution image that is common to the plurality of users, and upon this button being operated by one of the plurality of users, a communication group to which the plurality of users belongs is configured, and a communication service regarding this communication group is started.

Modification 4

In a case of a user belonging to each of a plurality of communication groups watching a distribution image of the same distributing user, a ranking for each communication group may be displayed at the time of ending distribution of the distribution image. For example, each time an addition instruction for an additional object is transmitted from a user belonging to a communication group to the server device 3, group points corresponding to the communication group that the user performing the addition instruction belongs to are increased at the server device 3. At the time of ending distribution of the distribution image, the server device 3 creates ranking information corresponding to the group points for each communication group that watched the distribution image, and transmits the ranking information to the terminal devices 2 of the watching users. Thus, the watching users can view the rankings of the communication groups with respect to the distribution image that they were watching. Also, the server device 3 may transmit ranking information to the terminal devices 2 in response to display requests from the terminal devices 2. Note that in a case in which the total of group points of a communication group generated in a predetermined period during distribution of a distribution image of a particular distributing user are no less than a predetermined value, an item relating to the particular distributing user may be imparted to each user belonging to this communication group.

Modification 5

A function may be provided by the information system 1 in which, a communication service of a watching user not participating in a communication group and another user watching a distribution image by the same distributing user can be created after distribution of the distribution image ends. For example, the server transmitting unit 332 of the server device 3 transmits display data of a screen, inquiring whether or not to create a group, to the terminal device 2 of a watching user of the distribution image of which distribution has ended. Upon the server receiving unit 331 of the server device 3 receiving an instruction to create a group from the terminal device 2, the server transmitting unit 332 transmits display data for displaying the group creating screen 600 (FIG. 6A) to the terminal device 2. The display processing unit 274 of the terminal device 2 receiving the display data displays the group creating screen 600. Other-user information indicating watching users excluding the user of the terminal device 2 is displayed in the other-user display region 601 within the group creating screen 600. Thus, by the group creating screen 600 that displays other-user information indicating watching users being provided from the server device 3, the user of the terminal device 2 can create a communication group and start the communication service by operating the group creating screen 600. Note that providing of the group creating screen 600 displaying the other-user information indicating watching users may be executed during distribution of the distribution image.

Modification 6

Also, in a case in which distribution of a distribution image by a particular distributing user is started, a notification object may be displayed in the communication screen 810 illustrated in FIG. 8B. The notification object is a pop-up object, a so-called "badge" that is overlaid on the start-watching button 813, or the like. The particular distributing user is a user belonging to a group to which the user performing communication in the communication screen 810 belongs (a group shown in the group table T3), which is not communicating in the communication screen 810. The selection screen 900 or 1000 is displayed in accordance with selection of the notification object by the user. Note that the selection screen 900 or 1000 includes a selection image of the particular distributing user. Accordingly, the user can watch the distribution image of the particular distributing user. Alternatively, the distribution screen 1010 relating to the distribution image 1012 of the particular distributing user may be displayed in accordance with selection of the notification object by the user. Also, in a case in which the communication group is selected by the particular distributing user before distribution of the distribution image, or at the time of starting distribution thereof, at the terminal device 2 of a particular distributing user, upon distribution of this distribution image being started, the above-described notification object may be automatically displayed on the communication screen 810 relating to the communication group that is selected. Realizing the above-described watching start method at the terminal devices 2 enables users to efficiently select distributions they desire to watch, i.e., the number of user operations can be reduced, and usability can be improved. Thus, the processing load at the terminal device 2 can be reduced.

Modification 7

In a case in which a character object is generated on the basis of three-dimensional model data for generating a three-dimensional animation, the user output image of each user may be an image in which the character object that is a three-dimensional object placed within virtual space set for each user, is viewed from a particular viewpoint in the virtual space. For example, the display processing unit 274 places a two-dimensional screen in the direction of line of sight of the predetermined viewpoint, projects three-dimensional coordinates of various types of three-dimensional objects placed in the virtual space on the two-dimensional screen, and displays the image of the two-dimensional screen on which the various types of objects are projected, as the user output image. Note that the direction of the line of sight of the predetermined viewpoint is the direction in which the character object faces, and the two-dimensional screen moves and rotates in accordance with movement of the predetermined viewpoint and rotation of the direction of the line of sight.

Also, the display processing unit 274 may control the movement of the predetermined viewpoint and/or the rotation of the direction of the line of sight of the predetermined viewpoint in accordance with predetermined operations performed with respect to the communication screen. Also, the display processing unit 274 may include an automatic movement button for automatically moving the predetermined viewpoint in the communication screen. In this case, upon the automatic movement button being selected by the user A operating the input device 24, for example, the display processing unit 274 may automatically move the predetermined viewpoint in accordance with a movement rule that is set in advance.

Modification 8

In a case in which a character object is generated on the basis of three-dimensional model data for generating a three-dimensional animation, the user output image of each user may be an image viewing virtual space from the user viewpoint placed in a predetermined position of the character object (e.g., the position of the eyes of the character object) that is a three-dimensional object placed within virtual space common to all users. Note that the user viewpoint may be moved from the predetermined position of the character object, in accordance with user operations and/or automatically, and be positioned rearward, upward, forward, or the like, of the character object.

Figure 19:
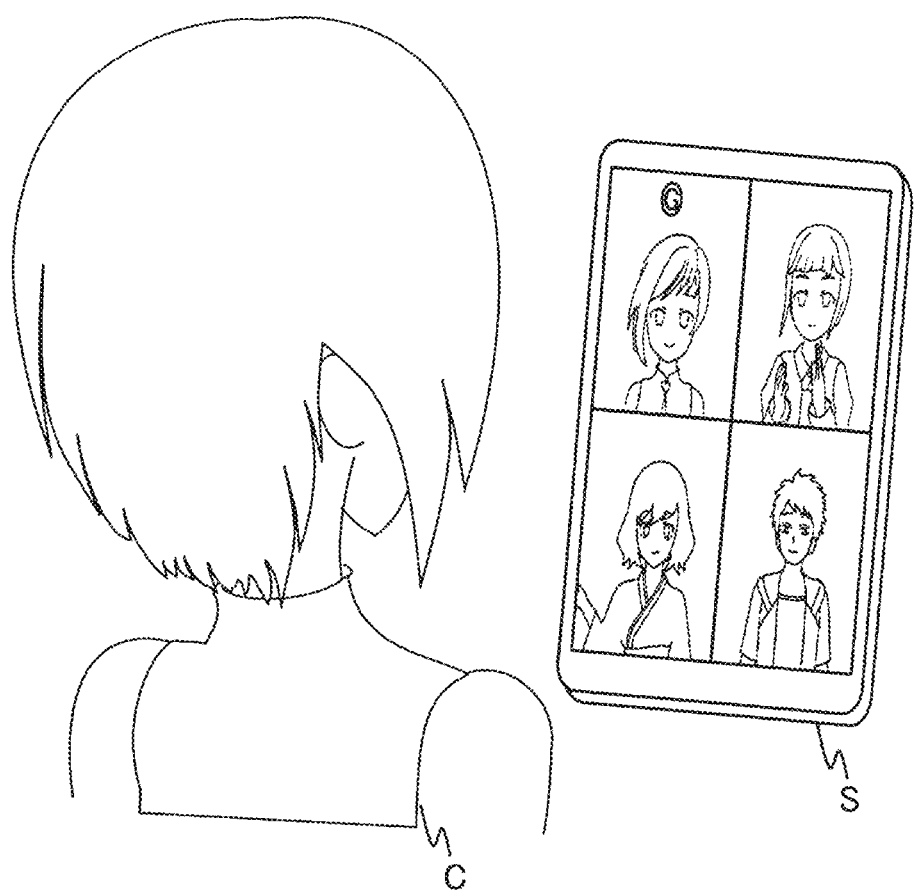
FIG. 19 is a schematic diagram showing an inside of a virtual space.

An example of a usage method of the communication service in virtual space common to each user will be described. For example, as illustrated in FIG. 19, the display processing unit 274 brings up a device object S such as a virtual table PC or the like in the virtual space, within the range of view from the user viewpoint of a character object C of the user A. The various types of screens described with reference to FIGS. 6A to 15 and 17 are displayed in a display device portion of this device object S. In this case, the user output image of the user A displayed in the display device portion of the device object S is a two-dimensional image, viewing inside of the virtual space from a virtual camera provided at a predetermined position of the device object S. Speech data of the user A is speech data acquired by the microphone 26 of the terminal device 2.

The transmitting unit 272 of the terminal device 2 transmits the user output image of the user A, the speech data of the user A, and the user ID of the user A, to the terminal devices 2 of all users B, via the server device 3. Note that the transmitting unit 272 may transmit the position of the camera and the line of view direction in the virtual space, the position of the character object of the user A and orientation of the body in the virtual space, and motion data of the user A, instead of the user output image of the user A. Also, the terminal device 2 of the user A receives the user output image of each user B, the speech data of each user B, and the user ID of each user B, from the terminal device 2 of each user B, via the server device 3. The display processing unit 274 of the terminal device 2 of the user A then displays the user output image of each user B in the display device portion of the device object S, and outputs the speech data of each user B from the terminal device 2. Accordingly, the communication service can be realized using the virtual device object S.

Modification 9

At least part of the functions realized by the terminal processing device 27 of the terminal device 2 may be realized by a processor other than the terminal processing device 27 of the terminal device 2. The at least part of the functions realized by the terminal processing device 27 may be realized by the server processing device 33 of the server device 3, for example. Specifically, part of the functions of the generating unit 271 and the display processing unit 274 may be executed at the server device 3. For example, the terminal device 2 transmits imaged data and speech data that is consecutively acquired, along with the user ID of the user operating the terminal device 2, to the server device 3. The server device 3 then uses the functions of the generating unit 271 and the display processing unit 274 to generate the character video data, and generates display information for displaying a communication screen including the user output images of all users, to be displayed on the display device 23. The server device 3 then transmits the display information, along with speech information (speech data), to the terminal devices 2 of all users. Each terminal device 2 outputs each piece of information received from the server device 3 (so-called "server rendering").

Modification 10

The terminal device 2 has a function of displaying the communication screen and so forth by executing various types of commands included in the control program stored in the terminal device 2. However, an arrangement may be made in which, in order to realize the communication service, the terminal device 2 calls up a browser function embedded into a Web application, uses this browser function to receive a Web page (a document written in a markup language such as HyperText Markup Language (HTML) or the like from a server device, and a control program embedded in this Web page executes the control program (so-called "browser rendering"). For example, the terminal device 2 can easily execute new information processing by using HTML5 as a markup language. Employing such a Web application for realizing the communication service at the terminal device enables program producers to provide new information processing to the client side (terminal device side) simply by embedding a new program in the Web page transmitted from the server device, and the manhours involved in producing now programs can be markedly suppressed. Also, provision of new services can be received at the client side simply by receiving the Web page, without downloading a new control program. Thus, reduction in load on the communication network, communication costs, and/or communication time as compared to downloading control programs is enabled, and simplification of the user interface can be realized as well.

Modification 11

The generating unit 271 of the terminal device 2 of the user A may generate output information including face motion data without using imaged data. For example, an arrangement may be made in which the terminal storage device 22 of the terminal device 2 stores face motion data corresponding to speech data, and the generating unit 271 extracts face motion data corresponding to the speech data of the user A that is acquired from the terminal storage device 22, and generates output information including the face motion data that is extracted, the speech data, and the user ID of the user A. Also, the generating unit 271 of the terminal device 2 of the user A may generate output information including the speech data of the user A that is output from the microphone 26 and the user ID stored in the terminal storage device 22, without including the face motion data. In this case, the display processing unit 274 of the terminal device 2 of the user B may extract the face motion data corresponding to the speech data of the user A included in the output information of the user A received via the server device 3, and generate animation of the character object of the user A. Note that the processing of generating face motion data corresponding to the speech data of the user may be processing using a known lip synch algorithm.

Thus, at the terminal device 2 of the user A using an HMD as the display device 23, communication with the user B through character objects can be performed without acquiring imaged data of the user A.

What is claimed is:

1. A control method, comprising:
 receiving information, from a terminal device of a distributing user via a network, relating to display of a distributing user image including a distributing user animation object representing an animation of the distributing user, the information having been transmitted to terminal devices of a plurality of audience users;
 displaying the distributing user image; and
 conducting a group communication service, based on an instruction to join the group communication service from a terminal device of a first audience user and a terminal device of a second audience user, by:
  displaying, by the terminal device of the first audience user, a first image and a second image both in a same display as display of the distributing user image, wherein the first image includes a first animation object representing an animation of the first audience user, and the second image includes a second animation object representing an animation of the second audience user that is different from the animation of the first audience user;
  transmitting, to the terminal device of the second audience user via the network, information relating to display of the first image;
  in a case that first audio data of the first audience user is obtained, transmitting the first audio data to the terminal device of the second audience user via the network;
  displaying, in the same display as display of the distributing user image, the first image including the first animation object as being changed in accordance with an action of the first audience user or the first audio data;
  in a case that second audio data of the second audience user is received via the network, outputting the second audio data; and
  displaying, in the same display as display of the distributing user image, the second image including the second animation object as being changed in accordance with an action of the second audience user or the second audio data, wherein
 in the conducting the group communication service, the first image, the first audio data, the second image and the second audio data are transmitted to only terminal devices which have transmitted the instruction to join the group communication service.

2. The control method according to claim 1, further comprising, during the displaying of the distributing user image:
 in a case that the second audio data of the second audience user is received via the network, outputting the second audio data; and
 in a case that third audio data of the distributing user is received via the network, outputting the third audio data, wherein
 the first audio data is not transmitted to the terminal device of the distributing user.

3. The control method according to claim 1, further comprising:
 altering a display of the first image and the second image in accordance with a display of the distributing user image;
 ending display of the distributing user image in accordance with a second instruction by the first audience user or the second audience user; and
 returning display of the first image and the second image to a display of the first image and the second image before the altering.

4. The control method according to claim 3, wherein the altering the display of the first image and the second image includes altering a size or a position of the first image and the second image, or altering the first image and the second image into a fourth image including the first animation object and the second animation object.

5. The control method according to claim 1, wherein the displaying the distributing user image includes displaying the distributing user image including a third animation object corresponding to a third instruction by the first audience user or the second audience user.

6. The control method according to claim 5, wherein the displaying the distributing user image includes, in a case that a condition relating to a display request of the third instruction by the first audience user or the third instruction by the second audience user is satisfied, displaying the distributing user image including a fourth animation object.

7. The control method according to claim 6, wherein the condition relating to the display request is that the third animation object corresponding to the third instruction by the first audience user and the third animation object corresponding to the third instruction by the second audience user are animation objects of a particular type that are different from each other, or that a time difference between timing of the third instruction by the first audience user and timing of the third instruction by the second audience user is within a predetermined time.

8. The control method according to claim 6, wherein the displaying the distributing user image including the fourth animation object includes, in a case that the condition relating to the display request is satisfied, displaying the distributing user image including the fourth animation object, and without displaying the third animation object corresponding to the third instruction by the first audience user and the third animation object corresponding to the third instruction by the second audience user.

9. The control method according to claim 5, wherein the third animation object, of which a display form is changed in accordance with a count of times of the third instruction by the first audience user or the second audience user, is included in the distributing user image.

10. The control method according to claim 1, wherein the displaying the distributing user image includes, in a case that a condition relating to a total of a count corresponding to a fourth instruction by the first audience user or the second audience user is satisfied, displaying the distributing user image including a third animation object.

11. The control method according to claim 10, wherein the displaying the distributing user image including the third animation object includes displaying an image relating to the first audience user and the second audience user, the image being positioned near the third animation object or overlaid on the third animation object.

12. The control method according to claim 10, further comprising:
displaying a first input animation object for the first audience user to select the third animation object; and
in a case that the first input animation object is specified by the first audience user,
displaying a second input animation object for the first audience user to input the fourth instruction, and
transmitting, via the network, information relating to selection of the third animation object to the terminal device of the second audience user, wherein
the information relating to selection of the third animation object is used for displaying, at the terminal device of the second audience user that receives the information, a second input animation object for the second audience user to input the fourth instruction.

13. The control method according to claim 1, wherein the information relating to the display of the first image is not transmitted to the distributing user.

14. The control method according to claim 1, wherein the terminal device of the distributing user cannot function as a terminal device of an audience user during the group communication service.

15. The control method according to claim 1, further comprising:
after completion of the group communication service, conducting another group communication service in which a first terminal device, which is the terminal device of the distributing user of the group communication service, functions as a terminal device of an audience user in the another group communication service and does not function as a terminal device of a distributing user in the another group communication service.

16. The control method according to claim 1, further comprising:
after completion of the group communication service, conducting another group communication service in which a first terminal device, which is the terminal device of an audience user of the group communication service, functions as a terminal device of a distributing user in the another group communication service and does not function as a terminal device of an audience user in the another group communication service.

17. A control method, comprising:
receiving, by a server device, information from a terminal device of a distributing user via a network, the information relating to display of a distributing user image including a distributing user animation object representing an animation of the distributing user; and
transmitting the information to a plurality of terminal devices, the plurality of terminal devices including a terminal device of a first audience user, a terminal device of a second audience user different from the first audience user, and a terminal device of another audience user different from the first audience user and the second audience user;
conducting a group communication service, based on an instruction to join a group communication service from the terminal device of the first audience user and the terminal device of the second audience user, by:
receiving, by the server device, information relating to display of a first image from the terminal device of the first audience user, the first image including a first animation object representing an animation of the first audience user;
receiving, by the server device, information relating to display of a second image from the terminal device of the second audience user, the second image including a second animation object representing an animation of the second audience user different from the animation of the first audience user;
transmitting first information for displaying the first image, the second image and the distributing user image in a same display to the terminal device of the second audience user;
transmitting second information for displaying the first image, the second image and the distributing user image in a same display to the terminal device of the first audience user;
transmitting third information for displaying the distributing user image to the terminal device of the another user;

in a case that first audio data of the first audience user is received, transmitting the first audio data to the terminal device of the second audience user;

transmitting first change information to the terminal device of the second audience user for displaying, in the same display as display of the distributing user image, the first image including the first animation object as being changed in accordance with an action of the first audience user or the first audio data;

in a case that second audio data of the second audience user is received, transmitting the second audio data to the terminal device of the first audience user; and transmitting second change information to the terminal device of the first audience user for displaying, in the same display as display of the distributing user image, the second image including the second animation object as being changed in accordance with an action of the second audience user or the second audio data, wherein in the conducting the group communication service, the first image, the first audio data, the second image and the second audio data are transmitted to only terminal devices which have transmitted the instruction to join the group communication service.

18. A non-transitory computer readable medium storing computer executable instructions which, when executed by circuitry of a terminal device of a first audience user, cause the terminal device to:

receiving information, from a terminal device of a distributing user via a network, relating to display of a distributing user image including a distributing user animation object representing an animation of the distributing user, the information having been transmitted to terminal devices of a plurality of audience users;

displaying the distributing user image; and conducting a group communication service, based on an instruction to join the group communication service by the terminal device of the first audience user and a terminal device of a second audience user, by:

display a first image and a second image both in a same display as display of the distributing user image, wherein the first image includes a first animation object representing an animation of the first audience user, and the second image includes a second animation object representing an animation of the second audience user that is different from the first audience user;

transmit, to the terminal device of the second audience user via the network, information relating to display of the first image;

in a case that first audio data of the first audience user is obtained, transmit the first audio data to the terminal device of the second audience user via the network;

display, in the same display as display of the distributing user image, the first image including the first animation object as being changed in accordance with an action of the first audience user or the first audio data;

in a case that second audio data of the second audience user is received via the network, output the second audio data; and display, in the same display as display of the distributing user image, the second image including the second animation object as being changed in accordance with an action of the second audience user or the second audio data, wherein to conduct the group communication service, the first image, the first audio data, the second image and the second audio data are transmitted to only terminal devices which have transmitted the instruction to join the group communication service.

19. The non-transitory computer readable medium according to claim 18, wherein the terminal device is further caused to, during the display of the distributing user image:

in a case that the second audio data of the second audience user is received, output the second audio data; and in a case that third audio data of the distributing user is received, output the third audio data, and the first audio data is not transmitted to the terminal device of the distributing user.

20. A non-transitory computer readable medium storing computer executable instructions which, when executed by circuitry of a server device that is communicable with a terminal device of a first audience user and a terminal device of a second audience user that is different from the first audience user, cause the server device to:

receive information from the terminal device of the distributing user via a network, the information relating to display of a distributing user image including a distributing user animation object representing an animation of the distributing user; and transmit the information to a plurality of terminal devices, the plurality of terminal devices including the terminal device of the first audience user, the terminal device of the second audience user different from the first audience user, and a terminal device of another audience user different from the first audience user and the second audience user;

conduct a group communication service, based on an instruction to join a group communication service from the terminal device of the first audience user and the terminal device of the second audience user, by:

receiving information relating to display of a first image from the terminal device of the first audience user, the first image including a first animation object representing an animation of the first audience user;

receiving information relating to display of a second image from the terminal device of the second audience user, the second image including a second animation object representing an animation of the second audience user different from the animation of the first audience user;

transmitting first information for displaying the first image, the second image and the distributing user image in a same display to the terminal device of the second audience user;

transmitting second information for displaying the first image, the second image and the distributing user image in a same display to the terminal device of the first audience user;

transmitting third information for displaying the distributing user image to the terminal device of the another user;

in a case that first audio data of the first audience user is received, transmitting the first audio data to the terminal device of the second audience user;

transmitting first change information to the terminal device of the second audience user for displaying, in the same display as display of the distributing user image, the first image including the first animation object as being changed in accordance with an action of the first audience user or the first audio data;

in a case that second audio data of the second audience user is received, transmitting the second audio data to the terminal device of the first audience user; and transmitting second change information to the terminal device of the first audience user for displaying, in the same display as display of the distributing user image, the second image including the second animation object as being changed in accordance with an action of the second audience user or the second audio data, wherein to conduct the group communication service, the first image, the first audio data, the second image and the second audio data are transmitted to only terminal devices which have transmitted the instruction to join the group communication service.

* * * * *